(12) United States Patent
Michel

(10) Patent No.: US 7,483,040 B2
(45) Date of Patent: Jan. 27, 2009

(54) INFORMATION PROCESSING APPARATUS, INFORMATION PROCESSING METHOD, RECORDING MEDIUM, AND PROGRAM

(75) Inventor: Xavier Michel, Chiba (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 11/281,578

(22) Filed: Nov. 18, 2005

(65) Prior Publication Data

US 2006/0115184 A1    Jun. 1, 2006

(30) Foreign Application Priority Data

Nov. 29, 2004    (JP)    ............................ P2004-344079

(51) Int. Cl.
G09G 5/00    (2006.01)
G06K 9/40    (2006.01)

(52) U.S. Cl. ........................ 345/606; 345/582; 382/266

(58) Field of Classification Search ................. 345/606, 345/582; 382/266
See application file for complete search history.

(56) References Cited

U.S. PATENT DOCUMENTS

| | | | | |
|---|---|---|---|---|
| 5,949,428 A * | 9/1999 | Toelle et al. | ................. | 345/589 |
| 6,005,582 A * | 12/1999 | Gabriel et al. | ............... | 345/586 |
| 6,008,820 A * | 12/1999 | Chauvin et al. | ............. | 345/502 |
| 6,133,957 A * | 10/2000 | Campbell | .................... | 348/458 |
| 6,292,194 B1 * | 9/2001 | Powell, III | ................... | 345/582 |
| 6,424,343 B1 * | 7/2002 | Deering et al. | .............. | 345/419 |
| 6,717,578 B1 * | 4/2004 | Deering | ....................... | 345/428 |
| 6,778,181 B1 * | 8/2004 | Kilgariff et al. | ............. | 345/582 |
| 6,782,143 B1 | 8/2004 | Dube et al. | | |
| 6,795,081 B2 * | 9/2004 | Lavelle et al. | ............... | 345/557 |
| 6,856,704 B1 * | 2/2005 | Gallagher et al. | ........... | 382/263 |

(Continued)

FOREIGN PATENT DOCUMENTS

EP    1 113 389    7/2001

(Continued)

OTHER PUBLICATIONS

Lukac R, et al., "Bayer pattern based digital zooming approach," Circuits and Systems, 2004, ISCAS '04, Proceedings of the 2004 International Symposium on Vancouver, BC, Canada 23-36 May 2004, Piscataway, NJ, USA, IEEE, May 23, 2004, pp. III-253 to III-256.

Primary Examiner—Xiao M Wu
Assistant Examiner—David T Welch
(74) Attorney, Agent, or Firm—Finnegan, Hendrson, Farabow, Garrett & Dunner, L.L.P.

(57) ABSTRACT

In an image processing apparatus for converting resolution of an image, a weight for a statistical diagonal interpolation pixel is set based on a slope having the statistically highest confidence level, the statistical diagonal interpolation pixel is combined with a different pixel interpolated by a different interpolation so as to generate a combined interpolated pixel based on the set weight, information is generated for quantitatively evaluating the strength of an edge and the strength of texture, a texture mixed pixel is generated by combining the combined interpolated pixel with a texture pixel generated by performing texture filtering on the pixel of interest based on the texture strength information, and an edge mixed pixel is generated as a pixel at the position of interest by combining an edge pixel generated by performing filtering on the pixel of interest with the generated texture mixed pixel based on the edge strength information.

8 Claims, 33 Drawing Sheets

U.S. PATENT DOCUMENTS

| | | |
|---|---|---|
| 2002/0093587 A1 | 7/2002 | Xavier |
| 2004/0109004 A1* | 6/2004 | Bastos et al. ................ 345/587 |
| 2004/0160439 A1 | 8/2004 | Xavier |

FOREIGN PATENT DOCUMENTS

| | | |
|---|---|---|
| EP | 1113389 A2 * | 7/2001 |
| JP | 2001-201729 | 7/2001 |
| JP | 2002-215121 | 7/2002 |

* cited by examiner

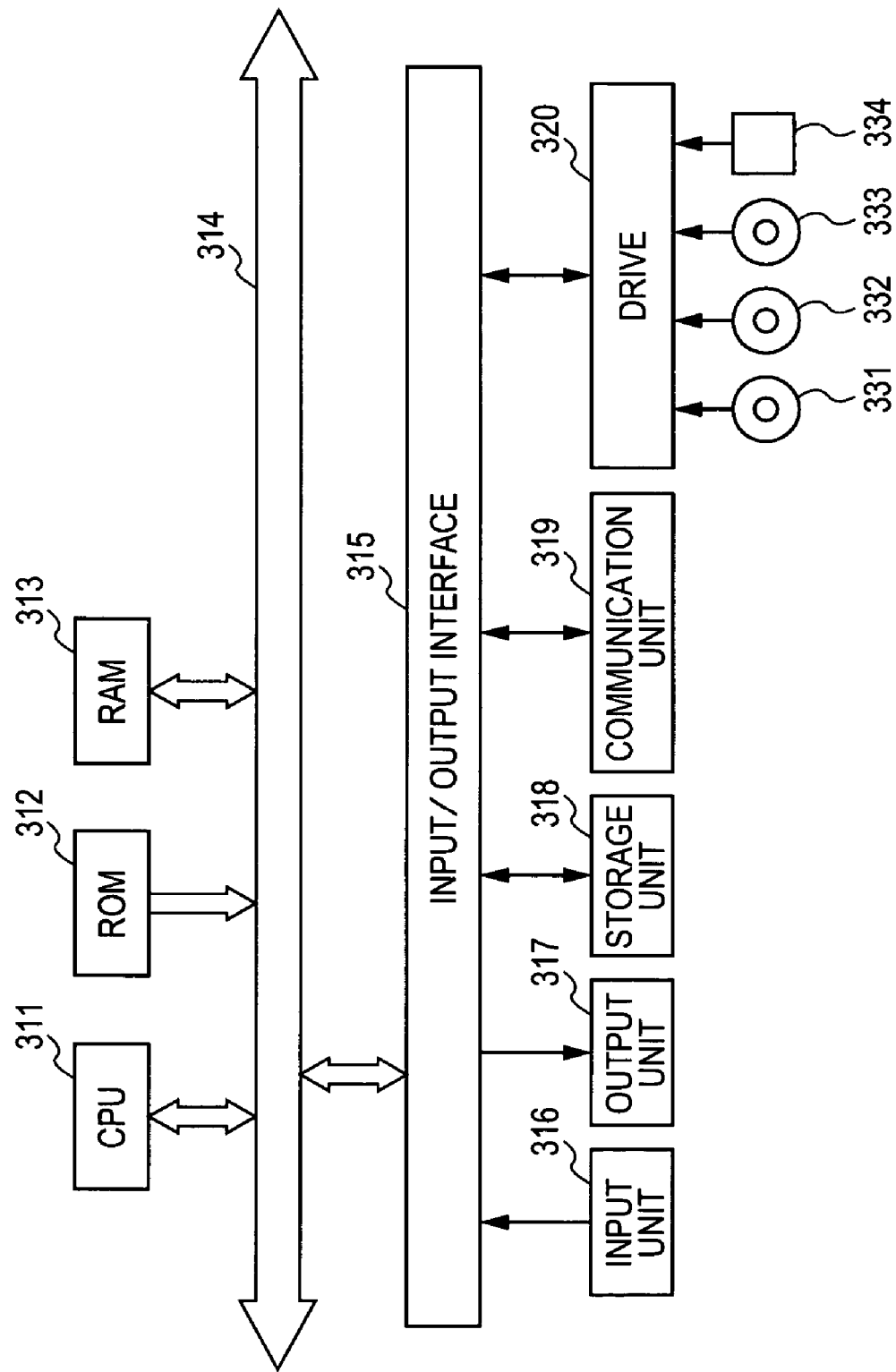

INFORMATION PROCESSING APPARATUS, INFORMATION PROCESSING METHOD, RECORDING MEDIUM, AND PROGRAM

CROSS REFERENCES TO RELATED APPLICATIONS

The present invention contains subject matter related to Japanese Patent Application JP 2004-344079 filed in the Japanese Patent Office on Nov. 29, 2004, the entire contents of which are incorporated herein by reference.

BACKGROUND OF THE INVENTION

1. Field of the Invention

The present invention generally relates to an information processing apparatus, an information processing method, a recording medium, and a program and, in particular, to an information processing apparatus, an information processing method, a recording medium, and a program for obtaining a high-quality and high-resolution image by redrawing a clear and natural edge and texture using a method matched to human visual characteristics.

2. Description of the Related Art

The need for a process known as digital zooming has been growing as the digital image based apparatuses (e.g., digital cameras and video tape recorders with a camera) have become widespread. Accordingly, a variety of methods for increasing the resolution of a digital image has been developed. Examples of known methods include the following three methods: (1) zero-order-hold interpolation in which the closest pixels are directly used. This is a simple interpolation especially from a hardware point of view; (2) bilinear interpolation in which an average of the closest two pixel values is computed and new pixels are inserted in the vertical and horizontal directions. This is a superior method for interpolating adjacent pixels; (3) B-spline interpolation. This method is not affected by noise and does not generate a mosaic pattern.

In addition, there is provided a method that converts an interlace screen to a progressive screen by enhancing the edge (refer to, for example, Japanese Unexamined Patent Application Publication No. 2002-215121).

SUMMARY OF THE INVENTION

However, the first method provides little effect for highly enlarged images. In addition, a well-known "mosaic pattern" appears in the enlarged image. The edge of the enlarged image is significantly destroyed and noticeable jaggies appear. The second method has a disadvantage in that the whole image is blurred. Thus, the resolution of the image is not improved. In addition, many mosaic effects occur when the image is highly enlarged. In the third method, an image is considerably blurred and the hardware becomes relatively complicated.

To resolve the above-described problems, Japanese Patent Application No. 2001-201729 discloses a technology in which an image is enlarged while edges in the image are being enhanced by interpolating a pixel of interest using pixels which are in some diagonal line passing through the pixel of interest and which are in neighboring rows above and under the pixel of interest or in the neighboring left and right columns of the pixel of interest. However, in order to interpolate a pixel of interest, this method acquires correlation between the pixel of interest and a pixel above or under the pixel of interest or correlation between the pixel of interest and a pixel at the left or right of the pixel of interest. If the correlation is not found, the pixel of interest is interpolated with a linear interpolation using the upper and lower pixels or using the left and right pixels. Accordingly, a proper interpolation is not always performed. For example, there is a possibility that a pixel adjacent to a pixel of interest in a diagonal direction cannot be used for interpolation. In such a case, it is difficult to generate a clear enlarged image.

Consequently, to perform interpolation when an edge exists in a diagonal direction, a technology is proposed in which edge directions of a plurality of pixels near a pixel of interest is detected and, at the same time, the confidence levels of the edge directions are determined. The edge direction is determined on the basis of the confidence levels to perform the interpolation. However, the edge direction is determined on the basis of the confidence levels even when the confidence levels are spatially uneven. Therefore, the proper direction of the edge is not always detected, and thus, a pixel for the interpolation is not properly generated.

Accordingly, there is provided an information processing method, a recording medium, and, a program that efficiently and simply reduce an error of an image with a small amount of computing when the resolution of a variety of still and moving images in categories from photo pictures to computer graphics is changed.

According to an embodiment of the present invention, an image processing apparatus includes diagonal weight setting means for setting a weight for a statistical diagonal interpolation pixel generated by interpolation on the basis of a slope at a position of a pixel of interest having the statistically highest confidence level; combining interpolation means for combining the statistical diagonal interpolation pixel with a different pixel interpolated by a different interpolation so as to generate a combined interpolated pixel as a pixel at the position of a pixel of interest on the basis of the weight of the statistical diagonal interpolation pixel set by the diagonal weight setting means; edge strength information generation means for generating information used for quantitatively evaluating the strength of an edge at the position of the pixel of interest; texture strength information generation means for generating information used for quantitatively evaluating the strength of texture at the position of the pixel of interest; texture-adaptive mixing means for generating a texture mixed pixel by combining the combined interpolated pixel at the position of the pixel of interest with a texture pixel generated by performing texture filtering on the pixel of interest on the basis of the texture strength information generated by the texture strength information generation means; and edge-adaptive mixing means for generating an edge mixed pixel as a pixel at the position of the pixel of interest by combining an edge pixel generated by performing filtering on the pixel of interest with the generated texture mixed pixel on the basis of the edge strength information generated by the edge strength information generation means.

The image processing apparatus can further include slope selection means for selecting a slope at the position of the pixel of interest having the highest confidence level on the basis of a directional distribution of slopes of a plurality of pixels corresponding to the position of the pixel of interest and the confidence level; and statistical diagonal interpolation means for generating the statistical diagonal interpolation pixel at the position of the pixel of interest by interpolation on the basis of the slope selected by the slope selection means. The diagonal weight setting means sets a weight of the statistical diagonal interpolation pixel generated by the statistical diagonal interpolation means on the basis of a slope having the statistically highest confidence level at the position of the pixel of interest.

In the different interpolation, a pixel can be generated by interpolating a pixel at the position of the pixel of interest using pixels above and beneath the position of the pixel of interest or at the left and right of the position of the pixel of interest.

The image processing apparatus can further include direction determination means for determining edge directions at a plurality of pixel positions including and corresponding to the position of the pixel of interest on the basis of the presence of the edge; and edge direction interpolation means for generating edge direction interpolated pixels at a plurality of pixel positions corresponding to the position of the pixel of interest on the basis of the edge directions at the plurality of pixel positions corresponding to the position of the pixel of interest.

The image processing apparatus can further include confidence level rating means for rating confidence levels of the edge direction interpolated pixels generated by the edge direction interpolation means. The edge strength information generation means generates information for quantitatively evaluating the strength of an edge at the position of the pixel of interest on the basis of the confidence level rated by the confidence level rating means, and the texture strength information generation means generates information used for quantitatively evaluating the strength of texture at the position of the pixel of interest on the basis of the confidence level rated by the confidence level rating means.

The confidence level rating means can determine the consistency of the local structure of the edge direction interpolated pixels interpolated by the edge direction interpolation means and rates the confidence levels of the edge direction interpolated pixels interpolated by the edge direction interpolation means on the basis of the determination result of the consistency.

The combining interpolation means can generate a combined interpolated pixel as the pixel of interest by computing a linear sum of the pixel generated by the different interpolation and the statistical diagonal interpolation pixel generated by statistical slope means using a coefficient corresponding to the weight set by the diagonal weight setting means.

According to an embodiment of the present invention, an image processing method controls an image processing apparatus for converting a spatial resolution of an original image by multiplying the spatial resolution by a factor of a real value Z in one of a vertical direction and a horizontal direction or in both of the directions. The method includes the steps of (a) setting a weight for a statistical diagonal interpolation pixel generated by interpolation on the basis of a slope at a position of a pixel of interest having the statistically highest confidence level, (b) combining the statistical diagonal interpolation pixel with a different pixel interpolated by a different interpolation so as to generate a combined interpolated pixel as a pixel at the position of a pixel of interest on the basis of the weight of the statistical diagonal interpolation pixel set in step (a), (c) generating information used for quantitatively evaluating the strength of an edge at the position of the pixel of interest, (d) generating information used for quantitatively evaluating the strength of texture at the position of the pixel of interest, (e) generating a texture mixed pixel by combining the combined interpolated pixel at the position of the pixel of interest with a texture pixel generated by performing texture filtering on the pixel of interest on the basis of the texture strength information generated by step (d), and (f) generating an edge mixed pixel as the pixel at the position of the pixel of interest by combining an edge pixel generated by performing filtering on the pixel of interest with the texture mixed pixel on the basis of the edge strength information generated by step (c).

According to an embodiment of the present invention, a computer readable recording medium stores a program for causing a computer to control an image processing apparatus for converting a spatial resolution of an original image by multiplying the spatial resolution by a factor of a real value Z in one of a vertical direction and a horizontal direction or in both of the directions. The program includes the steps of (a) setting a weight for a statistical diagonal interpolation pixel generated by interpolation on the basis of a slope at a position of a pixel of interest having the statistically highest confidence level, (b) combining the statistical diagonal interpolation pixel with a different pixel interpolated by a different interpolation so as to generate a combined interpolated pixel as a pixel at the position of a pixel of interest on the basis of the weight of the statistical diagonal interpolation pixel set in step (a), (c) generating information used for quantitatively evaluating the strength of an edge at the position of the pixel of interest, (d) generating information used for quantitatively evaluating the strength of texture at the position of the pixel of interest, (e) generating a texture mixed pixel by combining the combined interpolated pixel at the position of the pixel of interest with a texture pixel generated by performing texture filtering on the pixel of interest on the basis of the texture strength information generated by step (d), and (f) generating an edge mixed pixel as the pixel at the position of the pixel of interest by combining an edge pixel generated by performing filtering on the pixel of interest with the texture mixed pixel on the basis of the edge strength information generated by step (c).

According to an embodiment of the present invention, a program causes a computer to control an image processing apparatus for converting a spatial resolution of an original image by multiplying the spatial resolution by a factor of a real value Z in one of a vertical direction and a horizontal direction or in both of the directions. The program includes the steps of (a) setting a weight for a statistical diagonal interpolation pixel generated by interpolation on the basis of a slope at a position of a pixel of interest having the statistically highest confidence level, (b) combining the statistical diagonal interpolation pixel with a different pixel interpolated by a different interpolation so as to generate a combined interpolated pixel as a pixel at the position of a pixel of interest on the basis of the weight of the statistical diagonal interpolation pixel set in step (a), (c) generating information used for quantitatively evaluating the strength of an edge at the position of the pixel of interest, (d) generating information used for quantitatively evaluating the strength of texture at the position of the pixel of interest, (e) generating a texture mixed pixel by combining the combined interpolated pixel at the position of the pixel of interest with a texture pixel generated by performing texture filtering on the pixel of interest on the basis of the texture strength information generated by step (d), and (f) generating an edge mixed pixel as the pixel at the position of the pixel of interest by combining an edge pixel generated by performing filtering on the pixel of interest with the texture mixed pixel on the basis of the edge strength information generated by step (c).

According to an embodiment of the present invention, in an image processing apparatus, an image processing method, and a program, a weight for a statistical diagonal interpolation pixel generated by interpolation is set on the basis of a slope at a position of a pixel of interest having the statistically highest confidence level; the statistical diagonal interpolation pixel is combined with a different pixel interpolated by a different interpolation so as to generate a combined interpolated pixel as a pixel at the position of a pixel of interest on the basis of the set weight of the statistical diagonal interpolation pixel; information used for quantitatively evaluating the strength of an edge at the position of the pixel of interest is generated; information used for quantitatively evaluating the strength of texture at the position of the pixel of interest is generated; a texture mixed pixel is generated by combining the combined interpolated pixel at the position of the pixel of interest with a texture pixel generated by performing texture filtering on the pixel of interest on the basis of the generated texture strength information; and an edge mixed pixel is generated as a pixel at the position of the pixel of interest by combining an edge pixel generated by performing filtering on the pixel of interest with the generated texture mixed pixel on the basis of the generated edge strength information.

An image processing apparatus according to an embodiment of the present invention may be an independent apparatus or may be a functional block for performing image processing.

According to the embodiments of the present invention, an edge direction of an interpolated pixel can be accurately acquired, and therefore, a more precise interpolated pixel can be produced. In addition, the edge can be precisely separated from texture. As a result, a more appropriate adaptive enhancement process can be performed.

BRIEF DESCRIPTION OF THE DRAWINGS

FIG. 34 is a diagram for illustrating a recording medium.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment(s) supporting the claimed invention are described in this specification. Thus, even if an element in the following embodiment(s) is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment(s) are described in the claims. That is, the description does not deny the existence of aspects of the present invention that are described in the embodiment(s) but not claimed in the invention of this application, i.e., the existence of aspects of the present invention that in future may be claimed by a divisional application, or that may be additionally claimed through amendments.

Figure 2:
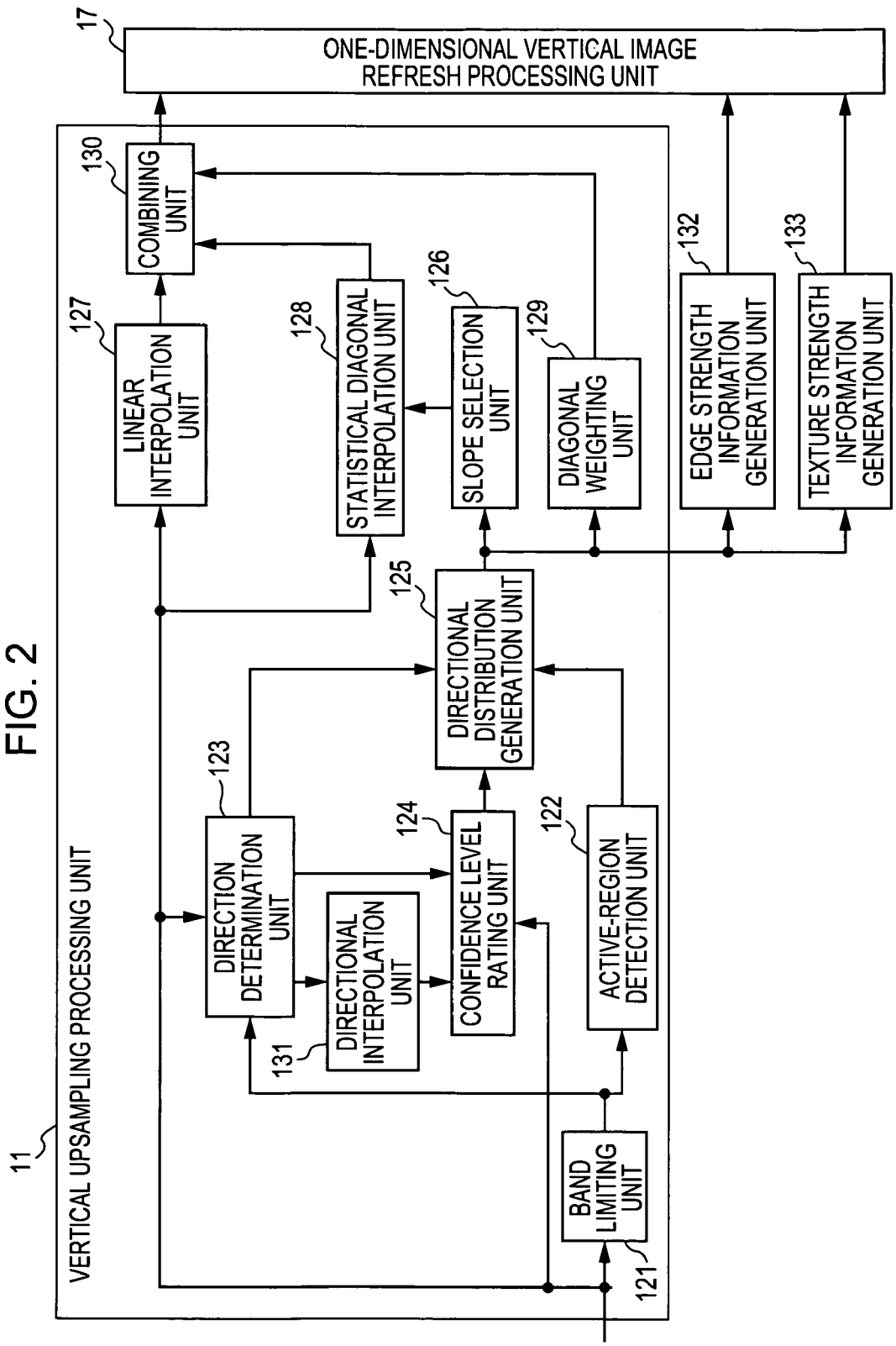
FIG. 2 is a block diagram of an exemplary configuration of a vertical upsampling processing unit shown in FIG. 1.
Figure 3:
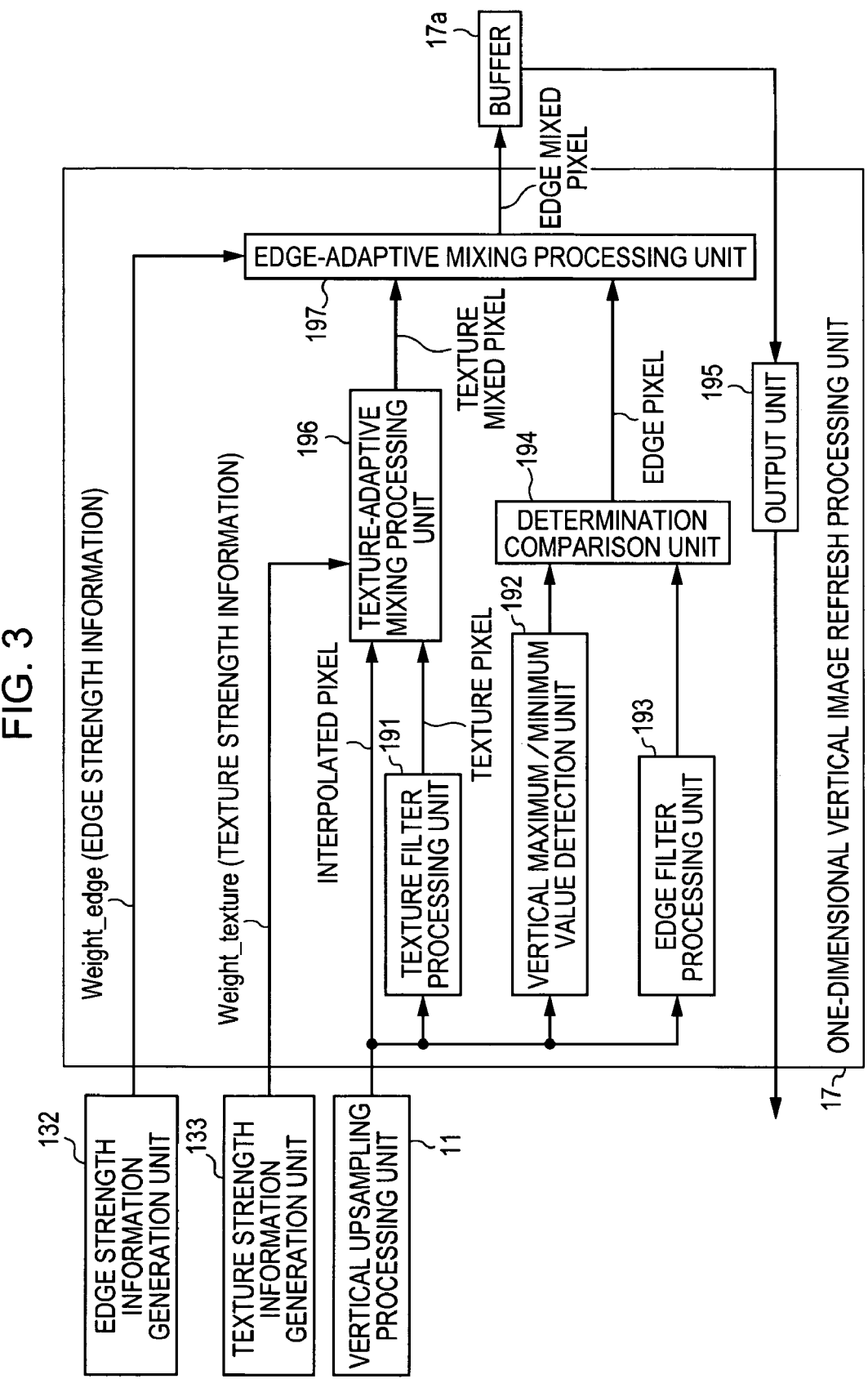
FIG. 3 is a block diagram of an exemplary configuration of a one-dimensional vertical image refresh processing unit shown in FIG. 1.

That is, according to an embodiment of the present invention, an image processing apparatus includes diagonal weight setting means (e.g., a diagonal weighting unit 129 shown in FIG. 2) for setting a weight for a statistical diagonal interpolation pixel generated by interpolation on the basis of a slope at a position of a pixel of interest having the statistically highest confidence level; combining interpolation means (e.g., a combining unit 130 shown in FIG. 2) for combining the statistical diagonal interpolation pixel with a different pixel interpolated by a different interpolation so as to generate a combined interpolated pixel as a pixel at the position of a pixel of interest on the basis of the weight of the statistical diagonal interpolation pixel set by the diagonal weight setting means; edge strength information generation means (e.g., a edge strength information generation unit 132 shown in FIG. 2) for generating information used for quantitatively evaluating the strength of an edge at the position of the pixel of interest; texture strength information generation means (e.g., a texture strength information generation unit 133 shown in FIG. 2) for generating information used for quantitatively evaluating the strength of texture at the position of the pixel of interest; texture-adaptive mixing means (e.g., a texture-adaptive mixing processing unit 196 shown in FIG. 3) for generating a texture mixed pixel by combining the combined interpolated pixel at the position of the pixel of interest with a texture pixel generated by performing texture filtering on the pixel of interest on the basis of the texture strength information generated by the texture strength information generation means; and edge-adaptive mixing means (e.g., an edge-adaptive mixing processing unit 197 shown in FIG. 3) for generating an edge mixed-pixel as a pixel at the position of the pixel of interest by combining an edge pixel generated by performing filtering on the pixel of interest with the generated texture mixed pixel on the basis of the edge strength information generated by the edge strength information generation means.

Figure 27:
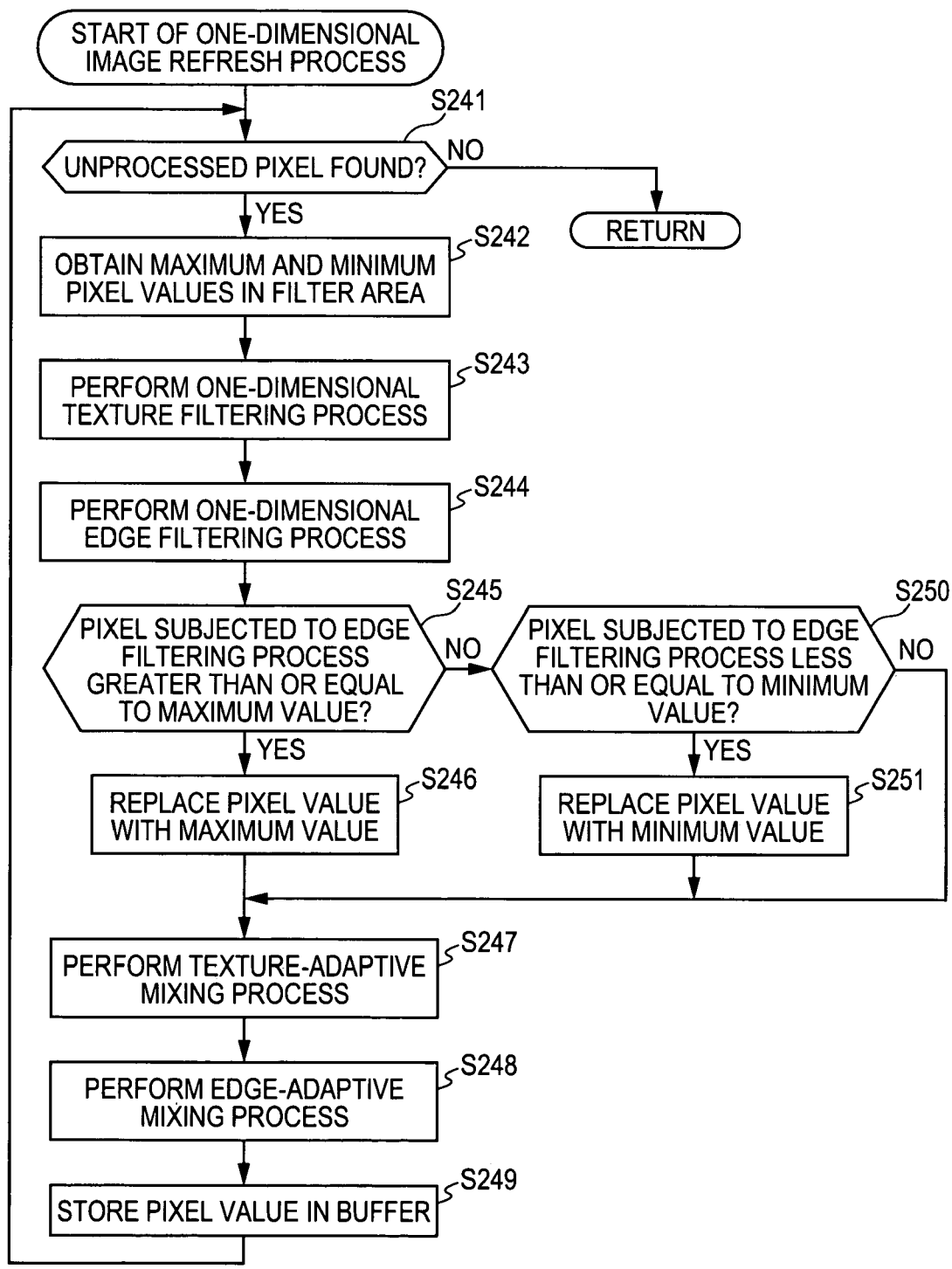
FIG. 27 is a flow chart of a one-dimensional vertical image refresh process at step S22 shown in FIG. 5.

According to an embodiment of the present invention, an image processing method includes the steps of (a) setting a weight for a statistical diagonal interpolation pixel generated by interpolation on the basis of a slope at a position of a pixel of interest having the statistically highest confidence level (e.g., a process of step S67 in a flow chart shown in FIG. 6), (b) combining the statistical diagonal interpolation pixel with a different pixel, interpolated by a different interpolation so as to generate a combined interpolated pixel as a pixel at the position of a pixel of interest on the basis of the weight of the statistical diagonal interpolation pixel set in step (a) (e.g., a process of step S68 in a flow chart shown in FIG. 6), (c) generating information used for quantitatively evaluating the strength of an edge at the position of the pixel of interest (e.g., a process of step S63 in a flow chart shown in FIG. 6), (d) generating information used for quantitatively evaluating the strength of texture at the position of the pixel of interest (e.g., a process of step S64 in a flow chart shown in FIG. 6), (e) generating a texture mixed pixel by combining the combined interpolated pixel at the position of the pixel of interest with a texture pixel generated by performing texture filtering on the pixel of interest on the basis of the texture strength information generated by step (d) (e.g., a process of step S247 in a flow chart shown in FIG. 27), and (f) generating an edge mixed pixel as the pixel at the position of the pixel of interest by combining an edge pixel generated by performing filtering on the pixel of interest with the texture mixed pixel on the basis of the edge strength information generated by step (c) (e.g., a process of step S248 in a flow chart shown in FIG. 27).

A recording medium and a program according to an embodiment of the present invention are similar to the image processing method, and therefore, the descriptions are not repeated.

Figure 1:
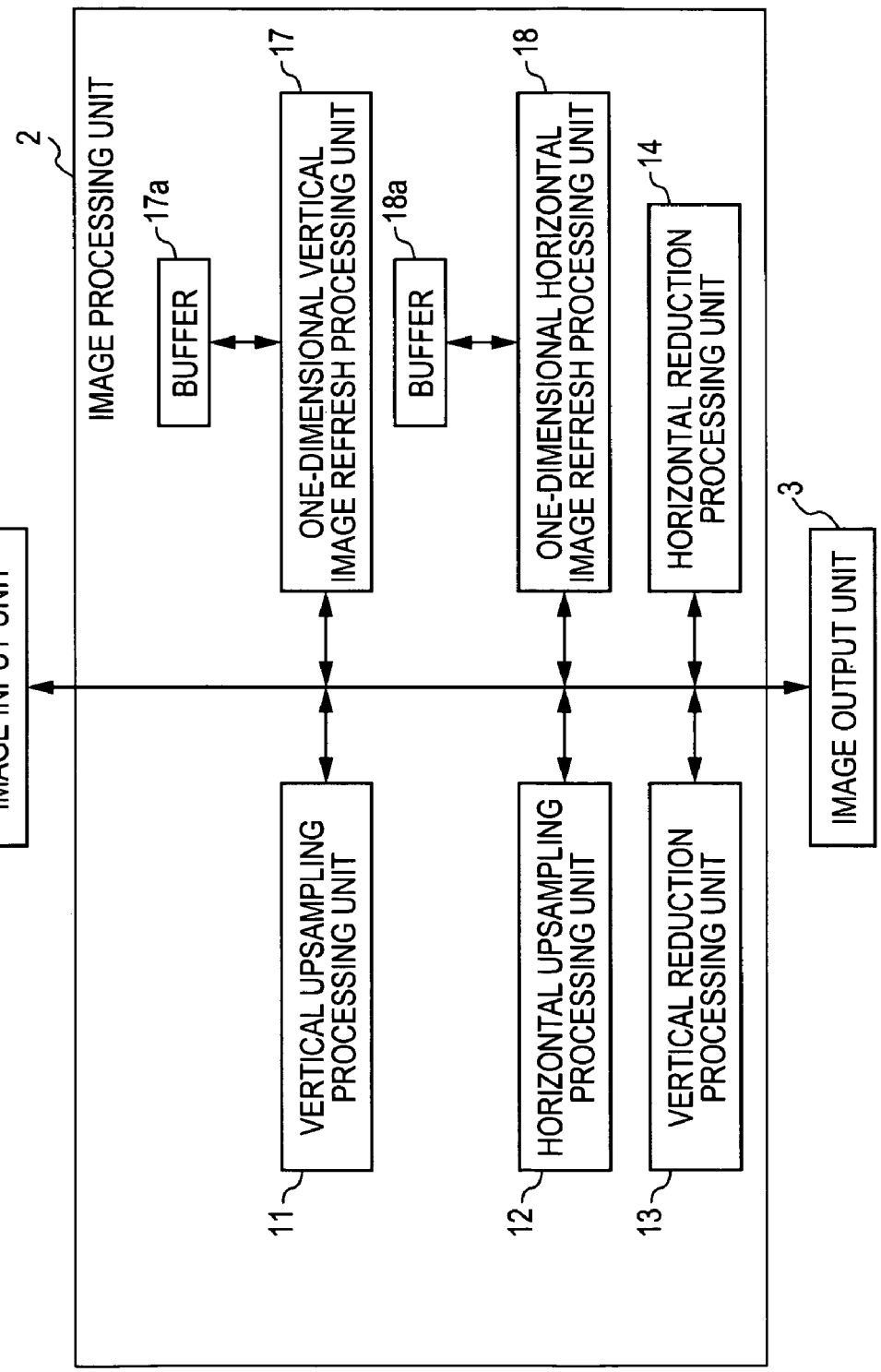
FIG. 1 is a block diagram of an exemplary configuration of an image processing apparatus according to an embodiment of the present invention.

FIG. 1 illustrates the configuration of an image processing apparatus according to an embodiment of the present invention. In the image processing apparatus, an image input unit 1 reads out image data to be processed from a recording medium or from a network, and outputs the image data to an image processing unit 2. The image processing unit 2 changes the resolution of the image input from the image input unit 1. That is, the image processing unit 2 enlarges and reduces the image and outputs it to an image output unit 3. The image output unit 3 displays the image data delivered from the image processing unit 2 on a display unit, records the image data in a recording medium, or transmits the image data to another unit via a transmission medium.

Each of a vertical upsampling processing unit 11 and a vertical reduction processing unit 13 of the image processing unit 2 multiplies the resolution of an original image by Z (Z: real number) in a vertical direction using a known method (e.g., linear expansion or linear reduction). When Z is greater than zero and is less than one (0<Z<1), the vertical reduction processing unit 13 performs the processing. When Z is equal to two (Z=2), the vertical upsampling processing unit 11 performs the processing.

Each of a horizontal upsampling processing unit 12 and a horizontal reduction processing unit 14 multiplies the resolution of an original image by Z in a horizontal direction. When Z is greater than zero and is less than one (0<Z<1), the horizontal reduction processing unit 14 performs the processing. When Z is equal to two (Z=2), the horizontal upsampling processing unit 12 performs the processing.

A one-dimensional vertical image refresh processing unit 17 and a one-dimensional horizontal image refresh processing unit 18 performs a one-dimensional filter process on the image data in a vertical direction and in a horizontal direction appropriately using buffers 17a and 18a, respectively, to naturally enhance the edge and texture for human eyes. That is, when image data is recorded in a recording medium, a high-frequency component may be removed due to a physical effect of the recording medium, and therefore, the edge portion and texture portion of an image may be blurred. Accordingly, the one-dimensional vertical image refresh processing unit 17 and the one-dimensional horizontal image refresh processing unit 18 obtain the central pixel energy of each pixel and perform the corresponding filtering operation. The one-dimensional vertical image refresh processing unit 17 and the one-dimensional horizontal image refresh processing unit 18 also determine whether each pixel belongs to the edge or the texture on the basis of the central pixel energy. If the pixel belongs to the edge, the one-dimensional vertical image refresh processing unit 17 and the one-dimensional horizontal image refresh processing unit 18 further perform a clipping process to reduce distortion caused by the filter process.

Two types of filters are provided to each of the one-dimensional vertical image refresh processing unit 17 and the one-dimensional horizontal image refresh processing unit 18. A user can select either one of the two types of filters as needed. A first one has a characteristic that can precisely control its frequency range, whereas a second one cannot precisely control its frequency range. However, the second one can reduce an amount of processing. The two types of filters have the same structure and the same operation except that their filter components are different. Hereinafter, the first type of filter and the second type of filter are referred to an "A-type" filter and a "B-type" filter, respectively.

The configuration of the vertical upsampling processing unit 11 is described below with reference to a block diagram shown in FIG. 2.

A band limiting unit 121 includes, for example, a low-pass filter (LPF). The band limiting unit 121 smoothes a pixel value of each pixel of an input image and limits its frequency band. The band limiting unit 121 then delivers the pixel value to a direction determination unit 123 and an active-region detection unit 122.

The active-region detection unit 122 computes the local energy from the band-limited image signal to detect an edge. The active-region detection unit 122 outputs the detection result to the direction determination unit 123.

The direction determination unit 123 determines the direction of the edge on the basis of the active region detection result from the active-region detection unit 122 and outputs information about the determined edge direction to a confidence level rating unit 124 and a directional distribution generation unit 125. At the same time, the direction determination unit 123 outputs pixel information to a directional interpolation unit 131. The confidence level rating unit 124 determines a confidence level of the edge direction information on the basis of information about the input image and the edge direction information delivered from the direction determination unit 123 and outputs the confidence level to the directional distribution generation unit 125. The directional interpolation unit 131 interpolates a pixel using pixel values in the direction based on information received from the direction determination unit 123.

The directional distribution generation unit 125 generates a directional distribution on the basis of the edge direction information input from the direction determination unit 123 and the corresponding confidence level information from the confidence level rating unit 124 and delivers the directional distribution to a slope selection unit 126, an edge strength information generation unit 132, a texture strength information generation unit 133, and a diagonal weighting unit 129. The slope selection unit 126 selects an edge slope having the highest confidence level for a pixel of interest on the basis of the directional distribution from the directional distribution generation unit 125 and outputs information about the selected edge slope to a statistical diagonal interpolation unit 128. The diagonal weighting unit 129 computes a weight of an edge in an oblique direction and outputs it to a combining unit 130.

The edge strength information generation unit 132 quantitatively evaluates the edge strength on the basis of the directional distribution and outputs the result to the one-dimensional vertical image refresh processing unit 17.

The texture strength information generation unit 133 quantitatively evaluates the texture strength on the basis of the directional distribution and outputs the result to the one-dimensional vertical image refresh processing unit 17.

A linear interpolation unit 127 generates a pixel to be interpolated from a plurality of pixels in the input image using, for example, a known linear interpolation method. The linear interpolation unit 127 then outputs the generated pixel to the combining unit 130. The statistical diagonal interpolation unit 128 generates a weighted average pixel value according to a slope distribution of average pixel value of pixels in all directions including the slope direction delivered from the slant selection unit 126 and outputs the weighted average pixel value to the combining unit 130. The combining unit 130 assigns weights to the pixel value of a pixel interpolated using a linear interpolation and the pixel value of a pixel generated by the statistical diagonal interpolation unit 128 using a statistical diagonal interpolation on the basis of weight information in a diagonal direction delivered from the diagonal weighting unit 129. The combining unit 130 then adds the two values. That is, the combining unit 130 computes a linear sum using the weights as coefficients and outputs the linear sum as an interpolated pixel.

The diagonal weighting unit 129 assigns a weight to a diagonal line (i.e., slope) in the directional distribution delivered from the directional distribution generation unit 125 and delivers information about the weight of the diagonal line to the combining unit 130.

The horizontal upsampling processing unit 12 performs processing of pixels in a horizontal direction in the same way as the vertical upsampling processing unit 11 described with reference to FIG. 2. That is, the horizontal upsampling processing unit 12 performs the similar processing on pixels in a horizontal direction in response to the process of the vertical upsampling processing unit 11 shown in FIG. 2. Since the basic operation of the horizontal upsampling processing unit 12 is identical to that of the vertical upsampling processing unit 11, the description is not repeated here.

The configuration of the one-dimensional vertical image refresh processing unit 17 is described next with reference to a block diagram shown in FIG. 3.

A texture filter processing unit 191 performs a vertical filtering operation on a plurality of pixels corresponding to a pixel of interest in the input image and outputs the result to a texture-adaptive mixing processing unit 196.

The texture-adaptive mixing processing unit 196 assigns a weight to a value of each pixel filtered in the vertical direction by the texture filter processing unit 191 and a value of the pixel of interest in the input image using a control signal delivered to the texture strength information generation unit 133 and combines the two values. The texture-adaptive mixing processing unit 196 then outputs the combined value to an edge-adaptive mixing processing unit 197.

A vertical maximum/minimum value detection unit 192 extracts a minimum pixel value and a maximum pixel value from among pixel values of a plurality of pixels corresponding to the pixel of interest in the input image in the vertical direction, and outputs the minimum and maximum pixel values to a determination comparison unit 194.

An edge filter processing unit 193 filters the plurality of pixels corresponding to the pixel of interest in the input image in the vertical direction and outputs the filtered pixel values to the determination comparison unit 194.

The determination comparison unit 194 compares the values filtered by the edge filter processing unit 193 in the vertical direction with the maximum value or minimum value input from the vertical maximum/minimum value detection unit 192 to clip the values. The determination comparison unit 194 then outputs the clipped values to the edge-adaptive mixing processing unit 197.

The edge-adaptive mixing processing unit 197 assigns a weight to the pixel value output from the determination comparison unit 194 and a pixel value output from the texture-adaptive mixing processing unit 196 using a control signal delivered to the edge strength information generation unit 132 and combines the two values. The edge-adaptive mixing processing unit 197 then outputs the combined value to the buffer 17a. An output unit 195 appropriately reads an image signal stored in the buffer 17a and outputs it.

The one-dimensional horizontal image refresh processing unit 18 performs processing of pixels in a horizontal direction in the same way as the one-dimensional vertical image refresh processing unit 17 shown in FIG. 1 described with reference to FIG. 3. That is, the one-dimensional horizontal image refresh processing unit 18 performs the similar processing on pixels in a horizontal direction corresponding to the process of the one-dimensional vertical image refresh processing unit 17 shown in FIG. 3. Since the basic operation of the one-dimensional horizontal image refresh processing unit 18 is identical to that of the one-dimensional vertical image refresh processing unit 17, the description is not repeated here.

The zooming process of the image processing unit 2 is described next with reference to a flow chart shown in FIG. 4. At step S1, the image processing unit 2 sets a variable z to a multiplication factor Z.

Subsequently, at step S2, the image processing unit 2 determines whether the value of the variable z is greater than or equal to 1. If it is determined that the value is less than 1, the process proceeds to step S3. At step S3, it is determined whether the value of the variable z is greater than 0 and less than 1.

If it is determined at step S3 that the value of the variable z is greater than 0 and less than 1, the process proceeds to step S4. At step S4, the vertical reduction processing unit 13 and the horizontal reduction processing unit 14 perform a standard reduction process. Thereafter, at step S5, an output display process is performed. That is, a generated image is displayed on a display unit by the image output unit 3.

In contrast, if it is determined at step S3 that the value of the variable z is not greater than 0 and less than 1, that is, if it is determined that the value of the variable z is greater than 1, the process proceeds to step S5. This is because it was determined at step S2 that the variable z was greater than 1 and the process proceeded to step S6, where the zooming process was performed a predetermined number of times, and therefore, it can be determined that an enlargement process has already been completed. At step S5, an output display process is performed.

If it is determined at step S2 that the value of the variable z is greater than or equal to 1, the process proceeded to step S6, where the zooming-in process is performed. The zooming-in process is described in detail below with reference to a flow chart shown in FIG. 5.

After the zooming-in process at step S6 is completed, the process proceeds to step S7, where the image processing unit 2 divides the value of the variable z by a value of 2. Thereafter, the process returns to step S2. Subsequently, the above-described processes are repeated.

That is, if the value of the variable z is greater than 1, the process at step S6 is repeated until the value of the variable z becomes less than 1. When the value of the variable z becomes less than 1 and is within the range of 0 to 1, a standard reduction process is performed at step S4. Examples of the standard reduction process include a linear interpolation and a process using a bicubic filter. Hereinafter, the linear interpolation is used as a standard interpolation. However, it should be appreciated that the standard interpolation may be another method.

The zooming-in process at step S6 is described next with reference to a flow chart shown in FIG. 5.

At step S21, a vertical upsampling process is performed.

The vertical upsampling process is described next with reference to a flow chart shown in FIG. 6.

Figure 7:
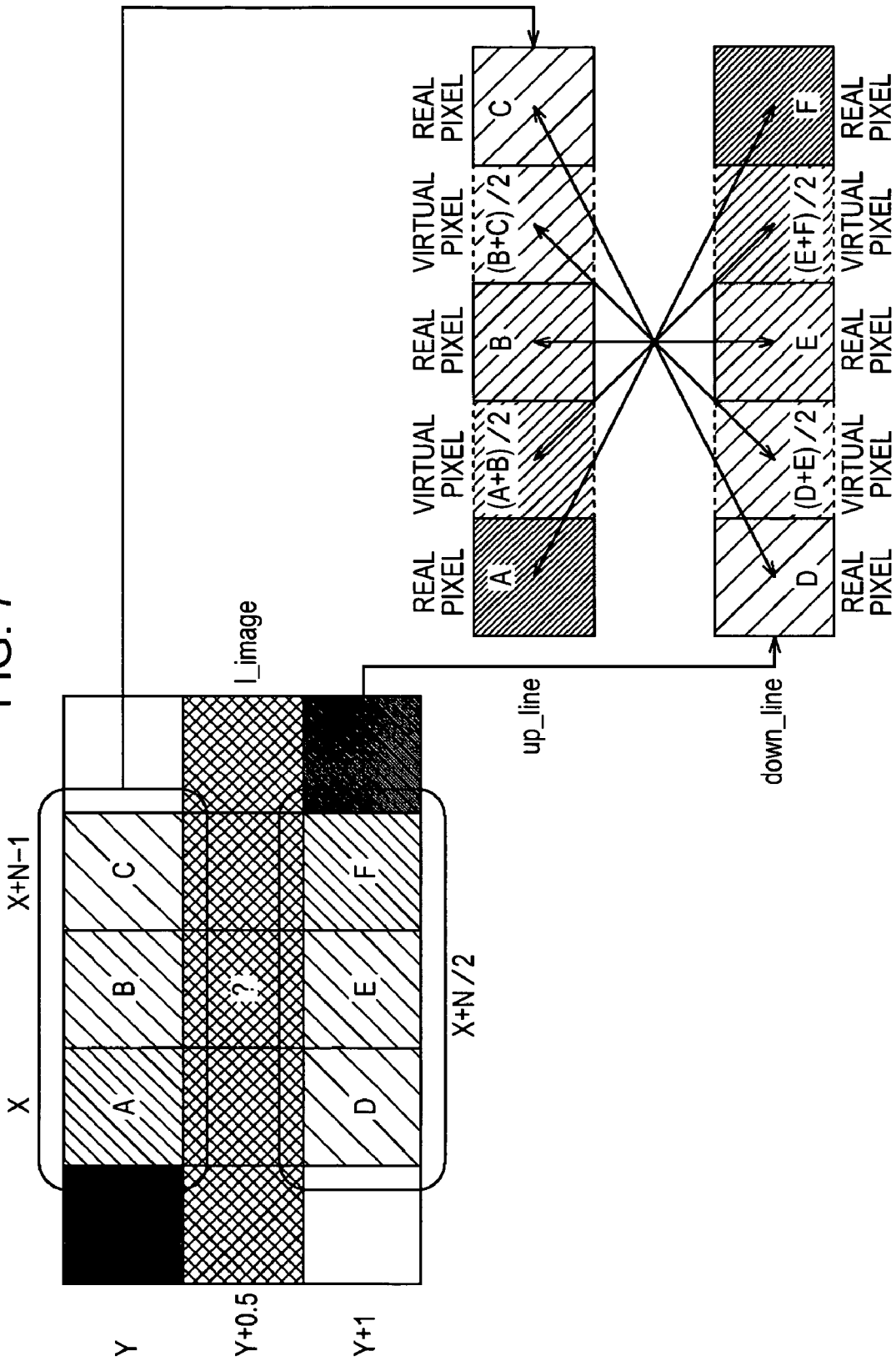
FIG. 7 is a diagram for illustrating an extraction process of a region of interest in an original image at step S51 shown in FIG. 6.

At step S51, as shown in FIG. 7, the vertical upsampling processing unit 11 extracts real pixels in an upper line and a lower line in a predetermined region (N pixels) of an original image I_image and virtual pixels (i.e., pixels virtually generated from the real pixels). The vertical upsampling processing unit 11 stores them in two buffers up_line and down_line having the width of 2N. The value N is variable. Accordingly, the center coordinates of the upper line in i_image is (X+N/2, Y) whereas the center coordinates of the lower line in i_image is (X+N/2, Y+1). That is, the pixel values of the real pixels and the virtual pixels are expressed by the following equations (1) to (4):

$$\text{up\_line}(2*I)=I\_\text{image}(X+I,Y)(I=0,1,\ldots N-1)(\text{real pixel}) \quad (1)$$

$$\text{up\_line}(2*I+1)=0.5*(I\_\text{image}(X+I,Y)+I\_\text{image}(X+I+1,Y))(I=0,1,\ldots N-2)(\text{virtual pixel}) \quad (2)$$

$$\text{down\_line}(2*I)=I\_\text{image}(X+I,Y+1)(I=0,1,\ldots N-1) \text{ (real pixel)} \quad (3)$$

$$\text{down\_line}(2*I+1)=0.5*(I\_\text{image}(X+I,Y+1)+I\_\text{image}(X+I+,Y+1))(I=0,1,\ldots N-2)(\text{virtual pixel}) \quad (4)$$

Subsequently, at step S52, the active-region detection unit 122 of the vertical upsampling processing unit 11 computes local energy E(N) on the basis of the signal whose band is limited by the band limiting unit 121 using the following equation (5):

$$E(N)=\Sigma(I=0,\ldots N-1)\text{Coef}(I)*ABS(\text{up\_line}(2*I)-\text{down\_line}(2*I)) \quad (5)$$

In equation (5), an absolute difference value between a real pixel in up_line and a real pixel in down_line immediately beneath the real pixel in up_line is obtained for I=0 to N−1. The sum of the absolute difference value multiplied by a weight Coef(I) is then computed.

Figure 8:
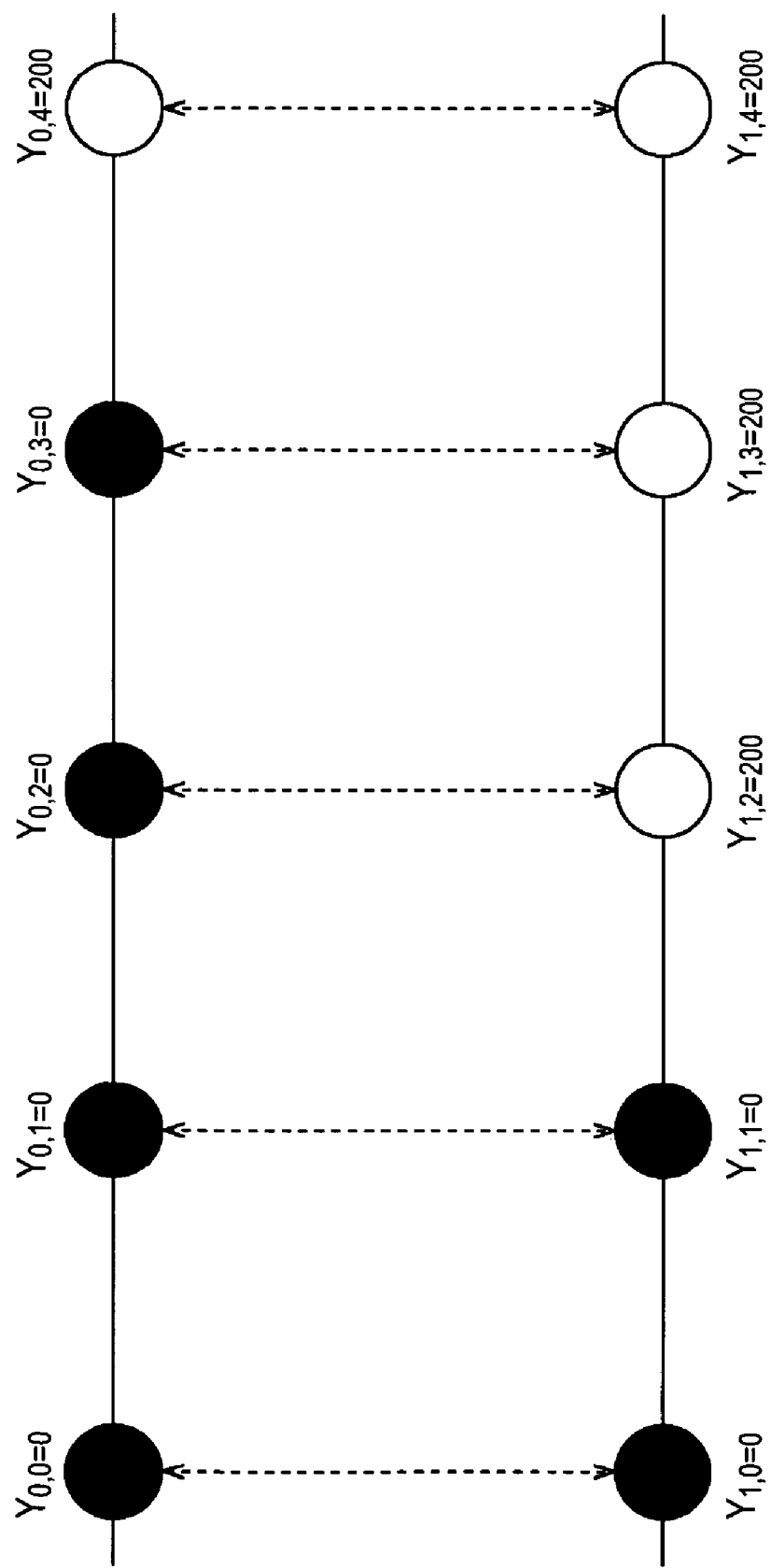
FIG. 8 is a diagram for illustrating computation of local energy at steps S52 and S53 shown in FIG. 6.

FIG. 8 illustrates an example of computing the local energy E(N). As shown in FIG. 8, an absolute difference value between the pixel value of a real pixel in an upper line up_line and the pixel value of a real pixel in a lower line down_line immediately beneath the real pixel in the upper line up_line is calculated. Each of the absolute difference value is multiplied by a weight, and all the absolute difference values are summarized to obtain the local energy E(N). In the example shown in FIG. 8, the value 0 of pixel $Y_{1,0}$ is subtracted from the value 0 of pixel $Y_{0,0}$. The value 0 of pixel $Y_{1,1}$ is subtracted from the value 0 of pixel $Y_{0,1}$. Similarly, the value 200 of pixel $Y_{1,2}$ is subtracted from the value 0 of pixel $Y_{0,2}$. The value 200 of pixel $Y_{1,3}$ is subtracted from the value 0 of pixel $Y_{0,3}$. The value 200 of pixel $Y_{1,4}$ is subtracted from the value 200 of pixel $Y_{0,4}$. Thereafter, each computed value is multiplied by its weight and all the resultant values are summarized. Thus, the value of the local energy can be obtained.

At step S53, the active-region detection unit 122 determines whether the local energy E(N) is greater than a predetermined threshold value T. If it is determined that the local energy E(N) is less than or equal to a predetermined threshold value T, the area is considered to be a flat low-energy area that contains no edge. In this case, the active-region detection unit 122 does not need to compute a direction of a possible edge, and therefore, the process proceeds to step S54.

At step S54, on the basis of the determination result of the active-region detection unit 122, the direction determination unit 123 outputs directional information indicating a vertical direction mid_dir (i.e., a direction L4 shown in FIG. 18 described below) to the directional interpolation unit 131, the confidence level rating unit 124, and the directional distribution generation unit 125. Additionally, the confidence level rating unit 124 outputs a value of 2, which indicates that the confidence level for the interpolated pixel is undetermined, to the directional distribution generation unit 125.

However, if it is determined at step S53 that the local energy E(N) is greater than the predetermined threshold value T, the direction determination unit 123 of the vertical upsampling processing unit 11, at step S55, experimentally computes a direction of the edge on the basis of the image signal subjected to band limiting by the band limiting unit 121 and the original image signal. The direction determination unit 123 then outputs the detected directional information to the confidence level rating unit 124 and the directional distribution generation unit 125. The direction determination unit 123 also outputs the detected pixel information to the directional interpolation unit 131. More specifically, the direction determination unit 123 performs computation represented by the following equations (6) and (7) and outputs the computation result.

Figure 18:
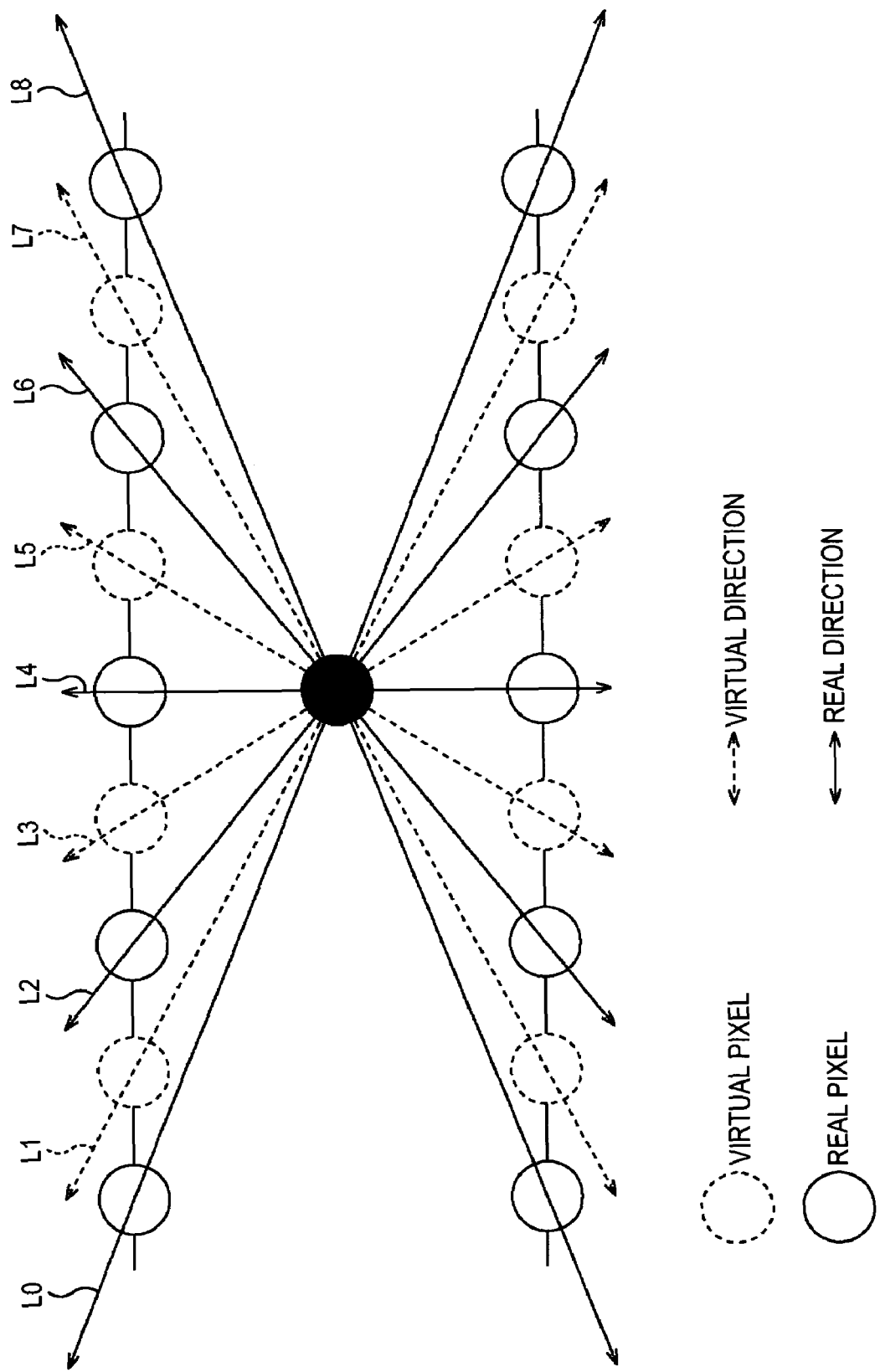
FIG. 18 is a diagram for illustrating an edge direction defined in the slope selection process at step S62 shown in FIG. 6.

Here, "dir" is a variable denoting direction. As shown in FIG. 18 described below, a value of "dir" is assigned to a diagonal direction passing through pixels the middle one of which is a pixel of interest (a black circle shown in FIG. 18). Accordingly, in FIG. 18, as described below, the value of dir for a direction L0 is 0. The value of dir for a direction L1 is 1. Additionally, N represents the number of sets of real pixels used to define a direction. For example, in FIG. 18, five sets of real pixels (white circles shown in FIG. 18) are shown. Consequently, if the number of sets of real pixels is N and if a virtual pixel is present between any two real pixels and a direction is defined in the same manner, $0 \leq dir \leq (2N-2)$. As a result, the following computation is repeated while dir is less than or equal to $2N-2$ and dir is incremented by 1 starting from dir=0.

$$E(dir)=ABS(\text{band\_limit}[\text{up\_line}(dir)]-\text{band\_limit}[\text{down\_line}(2N-2-dir)]) \quad (6)$$

$$\text{diff}(dir)=ABS(\text{up\_line}(dir)-\text{down\_line}(2N-2-dir)) \quad (7)$$

At step S55, the edge direction determination process is carried out.

Figure 9:
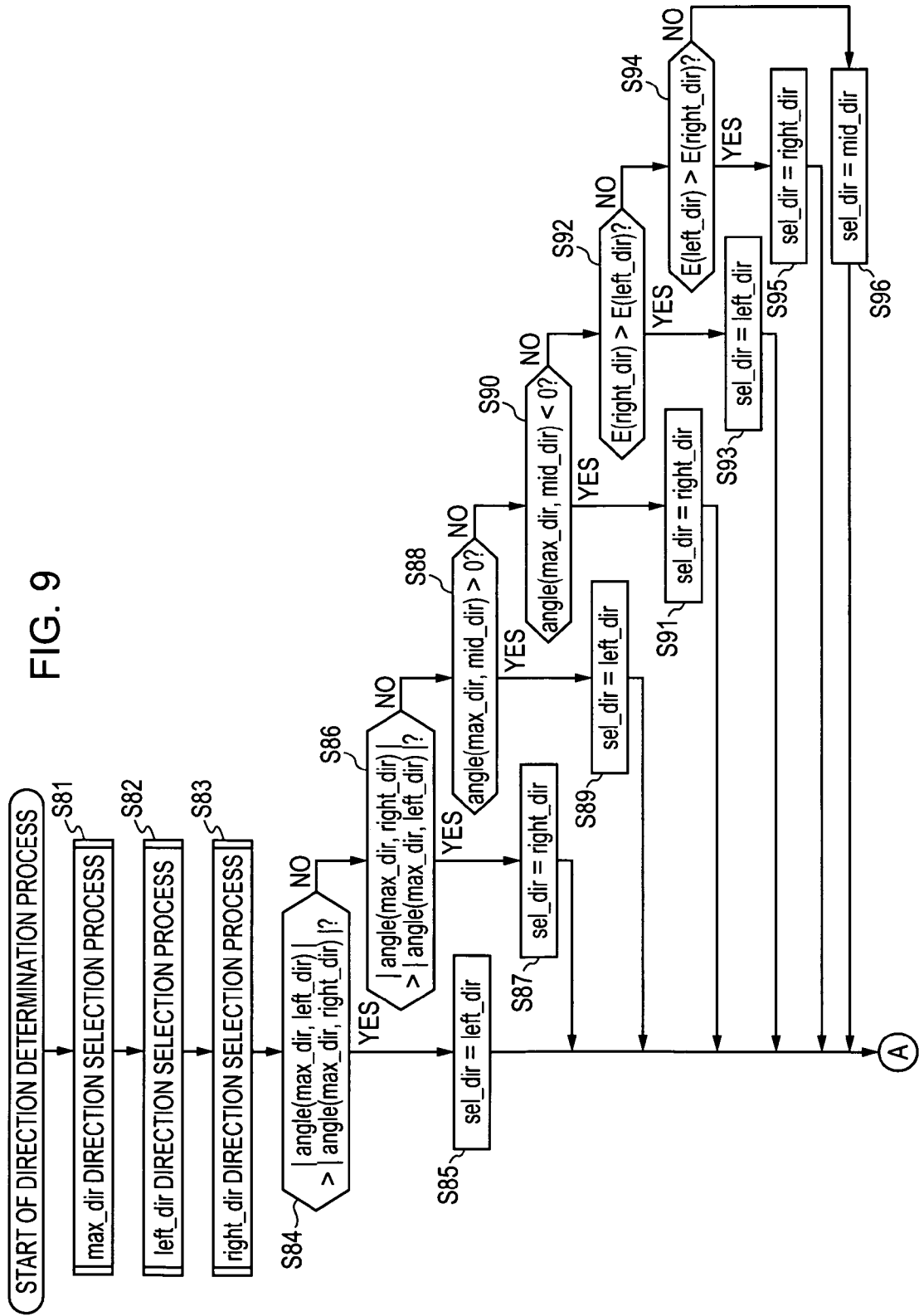
FIG. 9 is a flow chart of a direction determination process at step S55 shown in FIG. 6.
Figure 10:
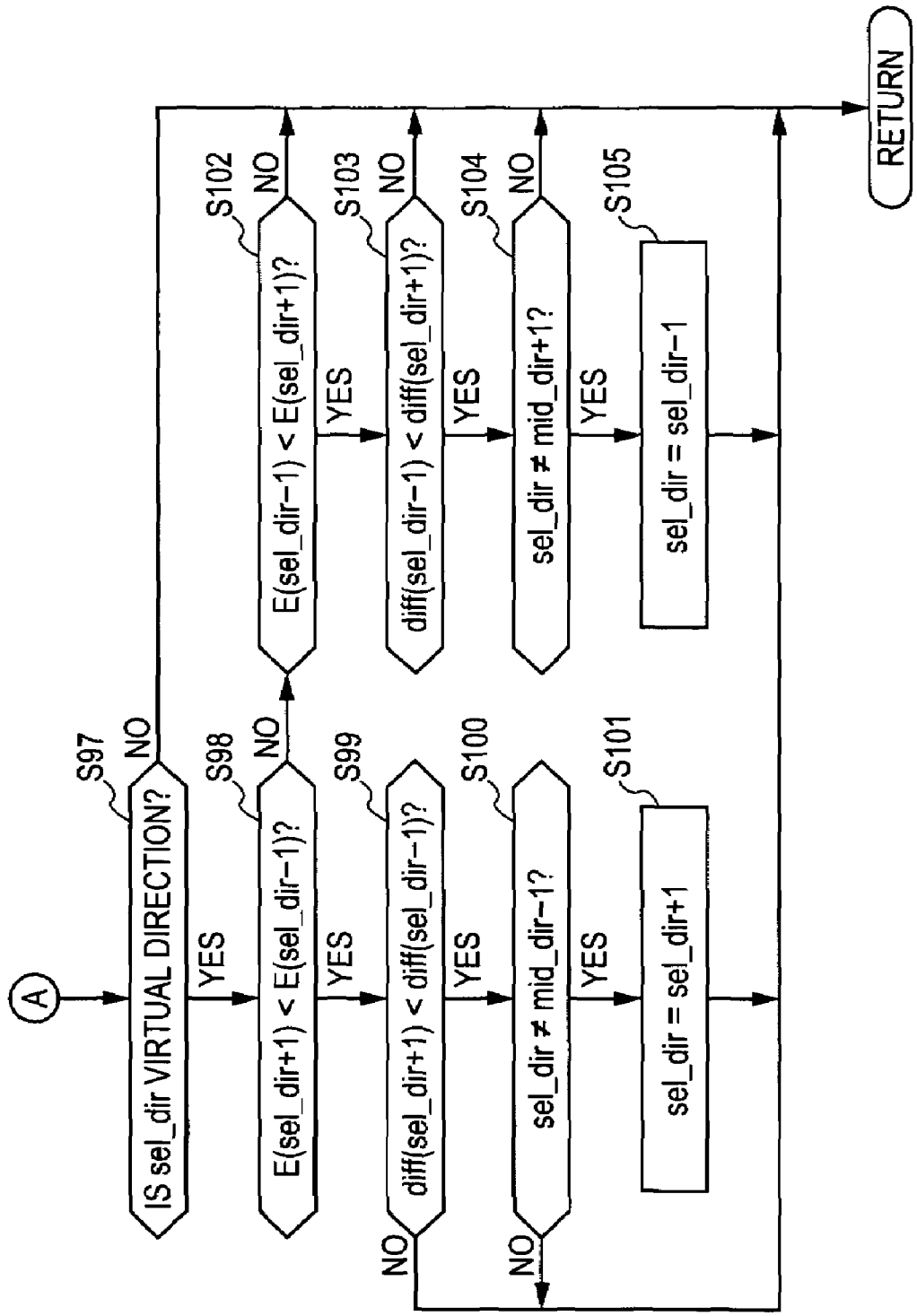
FIG. 10 is a flow chart of the direction determination process at step S55 shown in FIG. 6.

The direction determination process is described next with reference to FIGS. 9 and 10.

At step S81, the (max_dir) direction selection process is carried out. The term "(max_dir) direction" refers to a direction perpendicular to a direction of a local edge along which is a pixel of interest. That is, the (max_dir) direction is a direction of a diagonal line passing through the pixel of interest and two pixels, one of which is located on the right side of a vertical line and the other of which is located on the left side of the vertical line, and having the highest energy E(dir) (dir=mid_dir−N/2, . . . mid_dir+N/2).

Figure 11:
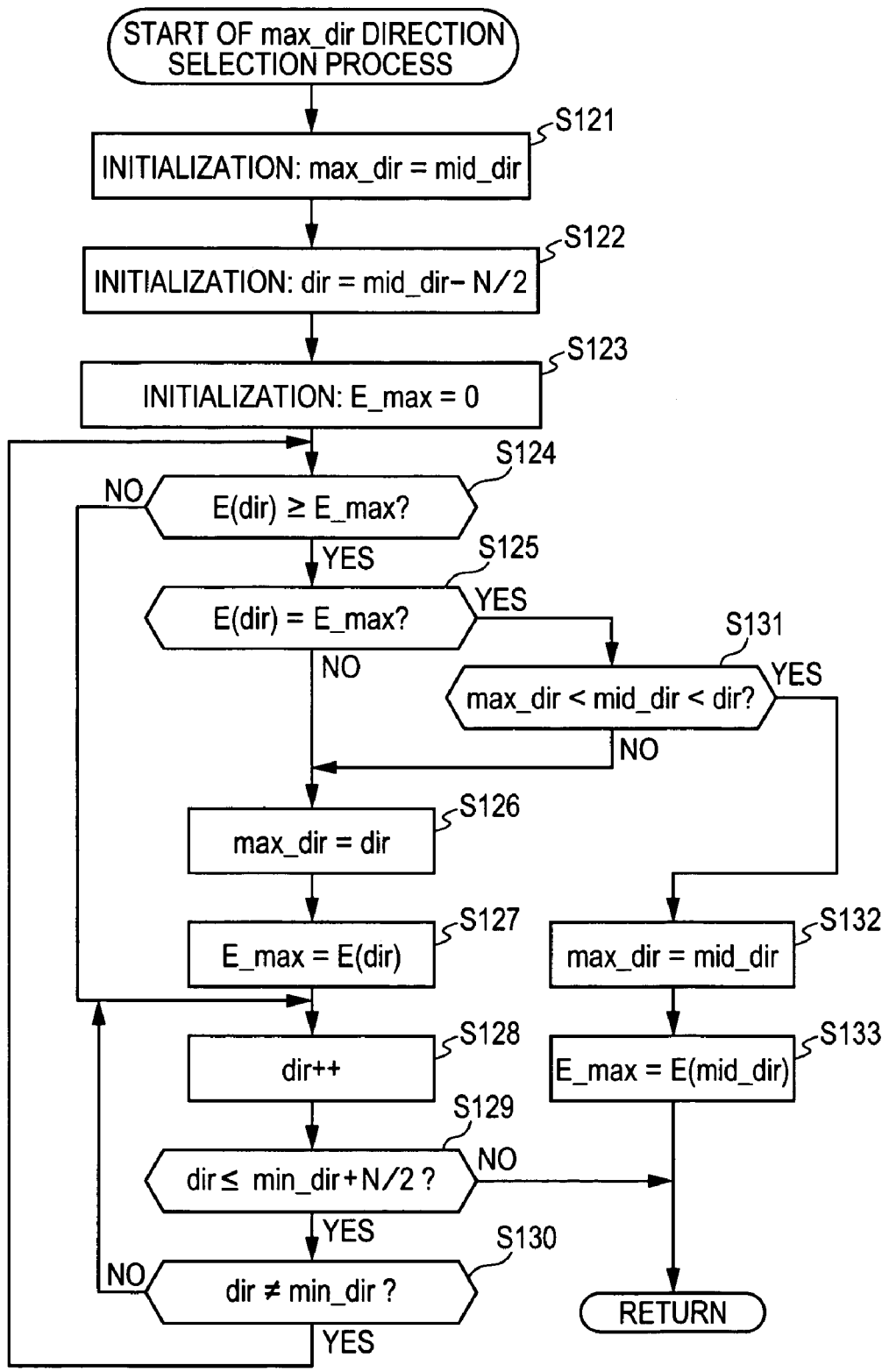
FIG. 11 is a flow chart of a max_dir direction selection process at step S81 shown in FIG. 9.

The process of selecting the (max_dir) direction, which is perpendicular to a local edge direction, is described next with reference to FIG. 11.

At step S121, to start a process for selecting a (max_dir) direction, which is perpendicular to a direction of a local edge along which is a pixel of interest, the direction determination unit 123 initializes a direction (max_dir) perpendicular to a local edge along which is a pixel of interest to be a vertical direction (mid_dir). The process then proceeds to step S122. That is, the direction determination unit 123 initializes the direction (max_dir) perpendicular to a local edge along which is a pixel of interest to be a vertical direction (mid_dir) corresponding to a direction L4 shown in FIG. 18.

At step S122, to start the process for selecting the (max_dir) direction, which is perpendicular to a direction of a local edge along which is a pixel of interest, the direction determination unit 123 initializes a direction to be compared (dir) to be a direction positioned at (mid_dir−N/2), which is a direction sloping upward when going from right to left. The process then proceeds to step S123. That is, the direction determination unit 123 initializes the direction to be compared (dir) to be a direction corresponding to a direction L0 shown in FIG. 18.

At step S123, to start the process for selecting the (max_dir) direction, which is perpendicular to a direction of a local edge along which is a pixel of interest, the direction determination unit 123 initializes the highest energy E_max among energy E(dir) (dir=mid dir−N/2 . . . mid_dir+N/2) computed using equation (6) to be zero (0). The process then proceeds to step S124.

At step S124, the direction determination unit 123 determines whether the energy E(dir) of the direction to be compared (dir) computed using equation (6) is greater than or equal to the maximum energy E_max. If it is determined at step S124 that the energy E(dir) is greater than or equal to the maximum energy E_max, the process proceeds to step S125. In contrast, If it is determined that the energy E(dir) is less than the maximum energy E_max, the process proceeds to step S128, where the direction to be compared (dir) is changed to the next right direction to be compared (dir+1). That is, when the current direction to be compared (dir) is sloping upward when going from right to left, the current direction is changed to the neighboring direction to be compared closer to the vertical direction, whereas, when the current direction of a candidate to be compared (dir) is sloping upward when going from left to right, the current direction is changed to the neighboring direction to be compared closer to the horizontal direction. For example, when the current direction of a candidate to be compared (dir) is the direction L0 shown in FIG. 18 described below, the direction determination unit 123 changes the current direction to be compared (dir) to a direction L1.

At step S125, the direction determination unit 123 determines whether the energy E(dir) of the direction to be compared (dir) computed using equation (6) is equal to the maximum energy E_max in order to determine the (max_dir) direction which is perpendicular to a direction of a local edge along which is a pixel of interest. If it is determined at step S125 that the energy E(dir) is equal to the maximum energy E_max, the process proceeds to step S131. However, if it is determined at step S125 that the energy E(dir) is not equal to the maximum energy E_max, the direction of a diagonal line between the two pixels is considered to be the (max_dir) direction which is perpendicular to a direction of a local edge along which is a pixel of interest. Thus, the direction to be compared (dir) is selected as a direction perpendicular to a direction of a local edge along which is a pixel of interest. The process then proceeds to step S126.

At step S126, the direction determination unit 123 stores the current variable dir as a (max_dir) direction.

At step S127, the direction determination unit 123 replaces the highest energy E_max with the energy E(dir) of the direction to be compared (dir) computed using equation (6).

At step S128, the direction determination unit 123 changes the direction to be compared (dir) to the right neighboring direction to be compared (dir+1). That is, for example, when the direction to be compared (dir) is the direction L0 shown in FIG. 18, the direction determination unit 123 changes the direction to be compared (dir) to the direction L1.

As used herein, for example, a direction (dir+1) generated by incrementing the variable dir which represents a predetermined direction (dir) by one is referred to as a right direction, that is, a direction on the right side of the predetermined direction (dir). On the other hand, a direction (dir−1) generated by decrementing the variable dir by one is referred to as a left direction, that is, a direction on the left side of the predetermined direction (dir). That is, for example, the right direction generated by incrementing the variable dir of the direction L0 shown in FIG. 18 described below is the direction L1. Conversely, the left direction generated by decrementing the variable dir of the direction L1 is the direction L0. In other words, as shown in FIG. 18, this naming is the same as that in a positional relationship among straight lines between pixels in the upper line and the lower line along which is the pixel of interest in the first quadrant and the second quadrant.

At step S129, the direction determination unit 123 determines whether the direction to be compared (dir) is one of the directions on the right side of (mid_dir+N/2). That is, if the direction to be compared (dir) is greater than the direction (mid_dir+N/2), it is determined that the process is completed for all the directions. Therefore, the process for selecting the (max_dir) direction, which is perpendicular to a direction of a local edge along which is a pixel of interest, is completed. In contrast, if the direction to be compared (dir) is less than or equal to the direction (mid_dir+N/2), it is determined that an unprocessed direction exists. Therefore, the process proceeds to step S130.

At step S130, the direction determination unit 123 determines whether the direction to be compared (dir) is the vertical direction (mid_dir). For example, if it is determined that the direction to be compared (dir) is the vertical direction (mid_dir), the process returns to step S128, where the direction determination unit 123 increments the variable dir by one to change the direction to be compared (dir) to the right neighboring direction to be compared (dir+1). That is, the vertical direction is not considered to be a direction to be compared.

In contrast, if it is determined at step S130 that the direction to be compared (dir) is the vertical direction (mid_dir), the process returns to step S124.

At step S131, the direction determination unit 123 determines whether the vertical direction (mid_dir) is greater than the direction (max_dir), which is perpendicular to a direction of a local edge along which is a pixel of interest, and is less than the direction to be compared (dir). For example, if it is determined at step S131 that the vertical direction (mid_dir) is greater than the direction (max_dir) which is perpendicular to a direction of a local edge along which is a pixel of interest and is less than the direction to be compared (dir), the process proceeds to step S132. At step S132, the direction determination unit 123 selects the vertical direction (mid_dir). Thus, the direction of the diagonal line between the two pixels is considered to be the direction (max_dir) which is perpendicular to a direction of a local edge along which is a pixel of interest.

At step S133, the direction determination unit 123 replaces the maximum energy E_max with the energy E(mid_dir) of the vertical direction (mid_dir) computed using equation (6). Thereafter, a process for selecting the (max_dir) direction, which is perpendicular to a direction of a local edge along which is a pixel of interest, is completed.

If it is determined that the vertical direction (mid_dir) is less than or equal to the direction (max_dir), which is perpendicular to a direction of a local edge along which is a pixel of interest, or is greater than or equal to the direction to be compared (dir), the direction determination unit 123, at step S126, selects the direction to be compared (dir) as the direction (max_dir) which is perpendicular to a direction of a local edge along which is a pixel of interest. Thus, the direction of the diagonal line between the two pixels is considered to be the direction (max_dir) which is perpendicular to a direction of a local edge along which is a pixel of interest.

At step S127, the direction determination unit 123 replaces the highest energy E_max with the energy E(dir) of the direction to be compared (dir) computed using equation (6). At step S128, the direction determination unit 123 changes the direction to be compared (dir) to the right neighboring direction to be compared (dir+1).

Thus, a direction (max_dir) that remains after the above-described operations is selected as the direction (max_dir) which is perpendicular to a direction of a local edge along which is a pixel of interest.

Referring back to FIG. 9, the description of the flow chart continues.

At step S82, the process for selecting a (left_dir) direction is performed. The term "(left_dir) direction" refers to a local edge direction which is a left up direction along which is a pixel of interest or a vertical direction. That is, among left up directions and a vertical direction, a direction passing through diagonal two pixels between which is a pixel of interest and having the lowest energy E(dir) among energy E(dir) (dir=mid_dir−1, . . . 0) computed using equation (6) is the (left_dir) direction.

Figure 12:
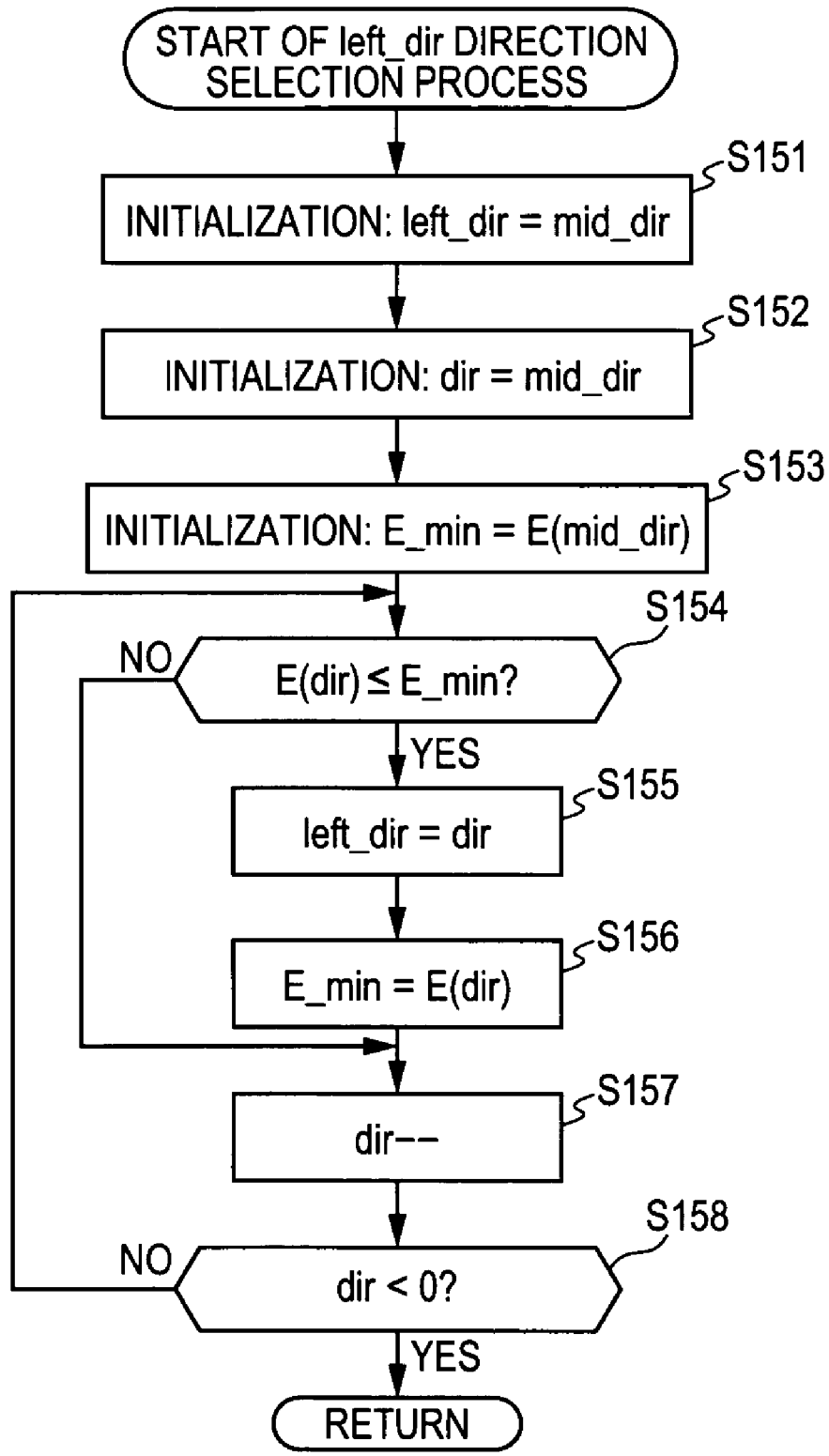
FIG. 12 is a flow chart of a left_dir direction selection process at step S82 shown in FIG. 9.

The process for selecting a (left_dir) direction, which is a left up local edge direction along which is a pixel of interest, is described next with reference to a flow chart shown in FIG. 12.

At step S151, to start the process for selecting a direction of a left up local edge along which is a pixel of interest, the direction determination unit 123 initializes a (left_dir) direction, which is a direction of a left up local edge along which is a pixel of interest, to be a vertical direction (mid_dir). The process then proceeds to step S152.

At step S152, to start the process for selecting a direction of a left up local edge along which is a pixel of interest, the direction determination unit 123 initializes a direction to be compared (dir) to be the vertical direction (mid_dir). The process then proceeds to step S153.

At step S153, to start the process for selecting a direction of a left up local edge along which is a pixel of interest, the direction determination unit 123 initializes the minimum energy E_min among energy E(dir) computed using equation (6) to be the energy E(mid_dir) of the vertical direction (mid_dir) computed using equation (6). The process then proceeds to step S154.

At step S154, the direction determination unit 123 determines whether the energy E(dir) of the direction to be compared (dir) computed using equation (6) is less than or equal to the lowest energy E_min. That is, if the energy E(dir) of the direction to be compared (dir) computed using equation (6) is less than or equal to the minimum energy E_min, the direction to be compared (dir) has the minimum energy E_min. Accordingly, the direction determination unit 123 determines whether the direction to be compared (dir) is the direction (left_dir) of a left up local edge along which is a pixel of interest on the basis of the determination.

If it is determined at step S154 that the energy E(dir) is less than or equal to the minimum energy E_min, the direction determination unit 123, at step S155, selects the direction of the diagonal line between the two pixels in the direction to be compared (dir) as the direction (left_dir) of a left up local edge along which is a pixel of interest.

At step S156, the direction determination unit 123 replaces the value of the minimum energy E_min with the energy E(dir) of the direction to be compared (dir) computed using equation (6).

At step S157, the direction determination unit 123 changes the compared direction (dir) to the left neighboring direction of a candidate to be compared (dir−1). The process then proceeds to step S158.

In contrast, if it is determined at step S154 that the energy E(dir) is greater than the minimum energy E_min, the direction determination unit 123, at step S157, changes the compared direction (dir) to the left neighboring direction to be compared (dir−1), that is, the direction determination unit 123 decrements the variable dir by one. The process then proceeds to step S158.

At step S158, the direction determination unit 123 determines whether the variable dir is less than or equal to 0, that is, whether the direction to be compared (dir) is located to the left of dir 0, which is also to the left of the vertical direction (mid_dir). If dir is less than 0, that is, if the direction to be compared (dir) is located to the left of the direction L0 in FIG. 18 described below, the direction determination unit 123 terminates the process for selecting a direction (left_dir) of a left up local edge along which is a pixel of interest. In contrast, if it is determined at step S158 that the direction to be compared (dir) is greater than or equal to 0, that is, it is determined that the direction of a candidate to be compared (dir) is one of the directions L0 to L4 shown in FIG. 18, the process returns to step S154. That is, the processes from steps S154 through S158 are repeated in the range of the direction to be compared (dir) of from L0 to L4. When all the processes are completed, the energy set to the energy E_min is considered to be the minimum energy. Thus, the direction for the minimum energy is selected as the direction (left_dir).

Referring back to FIG. 9, the description of the flow chart continues.

After the (left_dir) direction selection process at step S82 is completed, the process for selecting a (right_dir) direction is performed at step S83. The term "(right_dir) direction" refers to the right up direction of a local edge along which is a pixel of interest or a vertical direction. That is, among right up directions and a vertical direction, a direction passing through diagonal two pixels between which is a pixel of interest and having the lowest energy E(dir) among energy E(dir) (dir=mid_dir+1, . . . 2N−2) computed using equation (6) is the (right_dir) direction.

Figure 13:
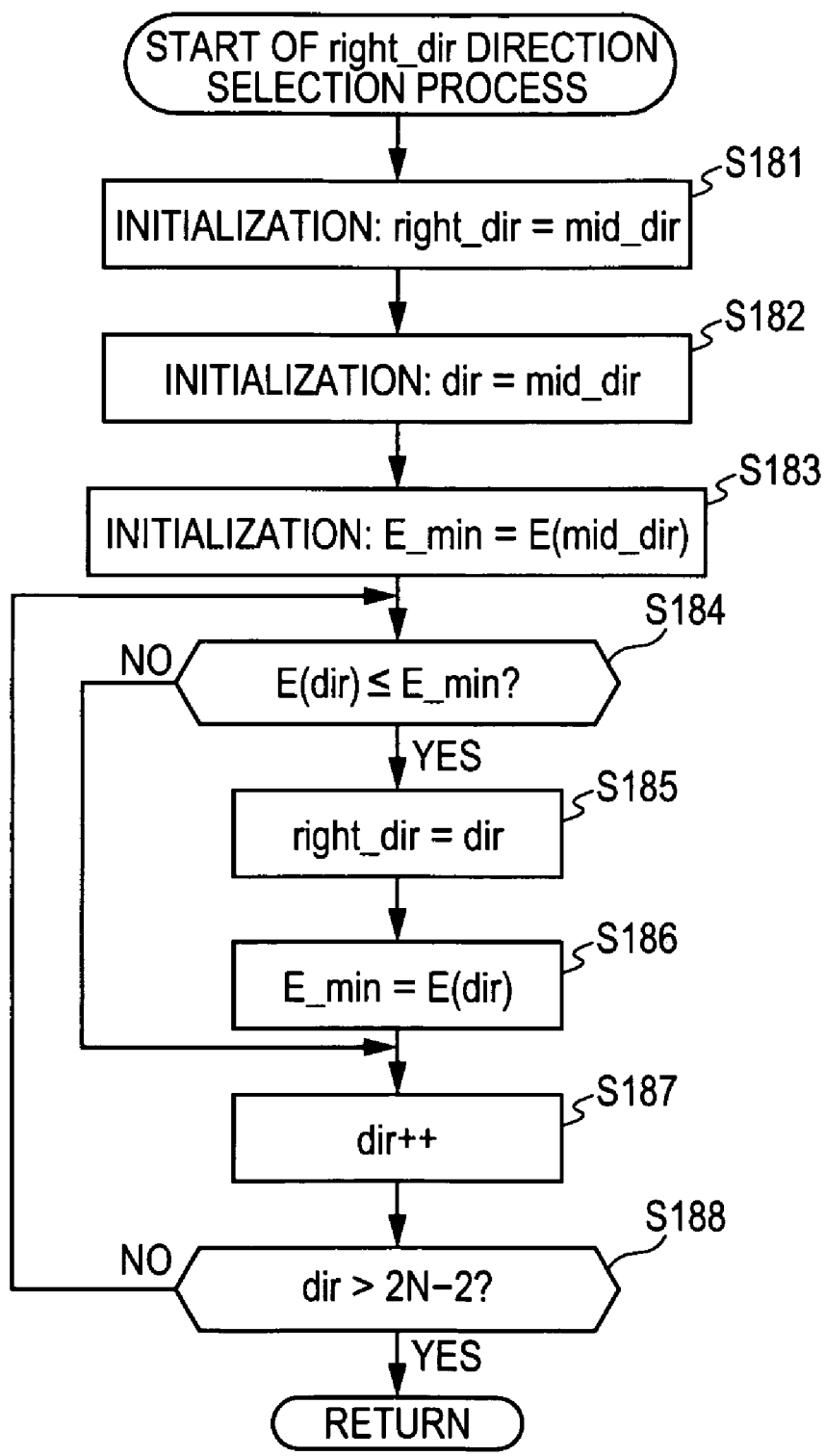
FIG. 13 is a flow chart of a right_dir direction selection process at step S83 shown in FIG. 9.

The process for selecting a (right_dir) direction of a right up local edge along which is a pixel of interest, is described next with reference to a flow chart shown in FIG. 13.

At step S181, to start the process for selecting a direction of a right up local edge along which is a pixel of interest, the direction determination unit 123 initializes a (right_dir) direction, which is a direction of a right up local edge along which is a pixel of interest to be a vertical direction (mid_dir). The process then proceeds to step S182.

At step S182, to start the process for selecting a direction of a right up local edge along which is a pixel of interest, the direction determination unit 123 initializes a direction to be compared (dir) to be the vertical direction (mid_dir). The process then proceeds to step S183.

At step S183, to start the process for selecting a direction of a right up local edge along which is a pixel of interest, the direction determination unit 123 initializes the minimum energy E_min among energy E(dir) computed using equation (6) to be the energy E(mid_dir) of the vertical direction (mid_dir) computed using equation (6). The process then proceeds to step S184.

At step S184, the direction determination unit 123 determines whether the energy E(dir) of the direction to be compared (dir) computed using equation (6) is less than or equal to the lowest energy E_min. That is, if the energy E(dir) of the direction to be compared (dir) computed using equation (6) is less than or equal to the minimum energy E_min, the direction to be compared (dir) has the minimum energy E_min. Accordingly, the direction determination unit 123 determines whether the direction to be compared (dir) is the direction (right_dir) of a right up local edge along which is a pixel of interest on the basis of the determination.

If it is determined at step S184 that the energy E(dir) is less than or equal to the minimum energy E_min, the direction determination unit 123, at step S185, selects the direction of the diagonal line between the two pixels in the direction to be compared (dir) as the direction (right_dir) of a right up local edge along which is a pixel of interest.

At step S186, the direction determination unit 123 replaces the value of the minimum energy E_min with the energy E(dir) of the direction to be compared (dir) computed using equation (6).

At step S187, the direction determination unit 123 changes the compared direction (dir) to the right neighboring direction of a candidate to be compared (dir+1). The process then proceeds to step S188.

In contrast, if it is determined at step S184 that the energy E(dir) is greater than the minimum energy E_min, the direction determination unit 123, at step S157, changes the compared direction (dir) to the right neighboring direction to be compared (dir+1), that is, the direction determination unit 123 increments the variable dir by one. The process then proceeds to step S188.

At step S188, the direction determination unit 123 determines whether the variable dir is less than or equal to 0, that is, whether the direction to be compared (dir) is located to the right of dir 2N−2, which is also to the right of the vertical direction (mid_dir). If dir is greater than 2N−2, that is, if the direction to be compared (dir) is located to the right of the direction L8 in FIG. 18 described below, the direction determination unit 123 terminates the process for selecting a direction (right_dir) of a right up local edge along which is a pixel of interest. In contrast, if it is determined that the direction to be compared (dir) is less than or equal to 2N−2, that is, it is determined that the direction of a candidate to be compared (dir) is one of the directions L4 to L8 shown in FIG. 18, the process returns to step S184. That is, the processes from steps S184 through S188 are repeated in the range of the direction to be compared (dir) of from L4 to L8. When all the processes are completed, the energy set to the energy E_min is considered to be the minimum energy. Thus, the direction for the minimum energy is selected as the direction (right_dir).

Referring back to FIG. 9, the description of the flow chart continues.

At step S84, the direction determination unit 123 determines whether an absolute value |angle(max_dir,right_dir)| of an angle between the (right_dir) direction, which is a direction of a right up local edge along which is a pixel of interest, and the direction (max_dir) perpendicular to the local edge is greater than |angle(max_dir,left_dir)| of an angle between the (left_dir) direction, which is a direction of a left up local edge along which is the pixel of interest, and the direction (max_dir) perpendicular to the local edge.

For example, if it is determined at step S84 that |angle (max_dir,left_dir)| is greater than |angle(max_dir,right_dir)| (in the range from 0° to 90° since these values are absolute), the direction determination unit 123, at step S85, considers a diagonal line between the two pixels in the (left_dir) direction, which is a direction of a left up local edge along which is the pixel of interest, to be the direction of the local edge. The direction determination unit 123 sets a selected direction (sel_dir) to the direction (left_dir). The process proceeds to step S97 shown in FIG. 10.

In contrast, if it is determined at step S84 that |angle (max_dir, left_dir)| is less than or equal to |angle(max_dir, right_dir)|, the process proceeds to step S86.

At step S86, the direction determination unit 123 determines whether an absolute value |angle(max_dir, right_dir)| of an angle between the (right_dir) direction, which is a direction of a right up local edge along which is a pixel of interest, and the direction (max_dir) perpendicular to the local edge is greater than |angle(max_dir, left_dir)| of an angle between the (left_dir) direction, which is a direction of a left up local edge along which is the pixel of interest, and the direction (max_dir) perpendicular to the local edge.

For example, if it is determined at step S86 that |angle (max_dir, right_dir)| is greater than |angle(max_dir, left_dir) |, the direction determination unit 123, at step S87, considers a diagonal line between the two pixels in the (right_dir) direction, which is a direction of a right up local edge along which is the pixel of interest, to be the direction of the local edge. The direction determination unit 123 sets a selected direction (sel_dir) to the direction (right_dir). The process proceeds to step S97 shown in FIG. 10.

That is, since the direction (max_dir) is perpendicular to a direction passing through two pixels having the maximum energy, the angle with respect to the direction (left_dir) or the direction (right_dir) is large. That is, the direction having the value closer to the vertical direction is more probably the edge.

Accordingly, the direction determination unit 123 compares |angle(max_dir, left_dir)| with |angle(max_dir, right_dir)| and selects the one that has a larger angle with respect to max dir as the direction of the edge.

In contrast, if it is determined at step S86 that |angle (max_dir, right_dir)| is not greater than |angle(max_dir, left_dir)|, that is, if it is determined that both are the same, the process proceeds to step S88.

At step S88, the direction determination unit 123 determines whether the angle (max_dir,mid_dir) between the direction (max_dir) perpendicular to the local edge and the vertical direction (mid_dir) is greater than or equal to 0, that is, whether the direction (max_dir) is inclined to the left with respect to the vertical direction (mid_dir) shown in FIG. 18.

For example, if it is determined at step S88 that the angle (max_dir, mid_dir) is greater than 0, that is, if it is determined that the direction (max_dir) is inclined to the left, the direction determination unit 123, at step S89, considers a diagonal line between the two pixels in the (left_dir) direction, which is a direction of a left up local edge along which is the pixel of interest, to be the direction of the local edge. The direction determination unit 123 sets a selected direction (sel_dir) to the direction (left_dir). The process proceeds to step S97 shown in FIG. 10.

In contrast, if it is determined at step S88 that the angle (max_dir, mid_dir) is not greater than zero, the direction determination unit 123, at step S90, determines whether the angle(max_dir, mid_dir) between the direction (max_dir) perpendicular to the local edge and the vertical direction (mid_dir) is less than 0.

For example, if it is determined at step S90 that the angle (max_dir, mid_dir) is less than 0, the direction determination unit 123, at step S91, considers a diagonal line between the two pixels in the (right_dir) direction, which is a direction of a right up local edge along which is the pixel of interest, to be the direction of the local edge. The direction determination unit 123 sets a selected direction (sel_dir) to the direction (right_dir). The process proceeds to step S97 shown in FIG. 10.

In contrast, if it is determined at step S90 that the angle (max_dir, mid_dir) is not less than 0, that is, if it is determined that the angle(max_dir, mid_dir) is 0, the process proceeds to step S92.

At step S92, the direction determination unit 123 determines whether the energy E(right_dir) of the direction (right_dir) of the right up local edge computed using equation (6) is higher than the energy E(left_dir) of the direction (left_dir) of the left up local edge computed using equation (6).

For example, if it is determined at step S92 that the energy E(right_dir) is higher than the energy E(left_dir), the direction determination unit 123, at step S93, considers a diagonal line between the two pixels in the (left_dir) direction, which is a direction of a left up local edge along which is the pixel of interest, to be the direction of the local edge. The direction determination unit 123 sets a selected direction (sel_dir) to the direction (left_dir). The process proceeds to step S97 shown in FIG. 10.

In contrast, if it is determined at step S92 that the energy E(right_dir) is lower than or equal to the energy E(left_dir), the process proceeds to step S94.

At step S94, the direction determination unit 123 determines whether the energy E(left_dir) of the direction (left_dir) of the left up local edge computed using equation (6) is lower than the energy E(right_dir) of the direction (right_dir) of the right up local edge computed using equation (6).

For example, if it is determined at step S94 that the energy E(left_dir) is higher than the energy E(right_dir), the direction determination unit 123, at step S95, considers a diagonal line between the two pixels in the (right_dir) direction, which is a direction of a right up local edge along which is the pixel of interest, to be the direction of the local edge. The direction determination unit 123 sets a selected direction (sel_dir) to the direction (right_dir). The process proceeds to step S97 shown in FIG. 10.

If it is determined at step S94 that the energy E(left_dir) is not higher than the energy E(right_dir), that is, if it is determined that both are the same, the direction determination unit 123, at step S96, sets the selected direction (sel_dir) to the vertical direction (mid_dir) and considers the vertical line between the two pixels to be the direction of the local edge.

At step S97 shown in FIG. 10, the direction determination unit 123 determines whether the direction (sel_dir) of the local edge selected at the previous stage is a direction computed from a pixel value of a pixel interpolated using the real pixels, namely, a virtual direction (e.g., the directions L1, L3, L5, and L7 in FIG. 18, as described below).

For example, at step S97, if the variable dir for the selected direction sel_dir is an even number, that is, if sel_dir=2n (e.g., the directions L0, L2, L4, L6, and L8 in FIG. 18, as described below), the direction determination unit 123 determines that sel_dir is a real direction and terminates the direction determination process. The direction determination unit 123 then outputs directional information indicating the local edge direction sel_dir (i.e., Lsel_dir in FIG. 18, as described below) to the directional interpolation unit 131, the confidence level rating unit 124, and the directional distribution generation unit 125. The process proceeds to step S56 shown in FIG. 6.

In contrast, for example, if, at step S97, the variable dir for the selected direction sel_dir is an odd number, that is, if sel_dir=2n+1 (e.g., the directions L1, L3, L5, and L7 in FIG. 18, as described below), the direction determination unit 123 determines that sel_dir is a virtual direction and the process proceeds to step S98.

At step S98, the direction determination unit 123 determines whether the energy E(sel_dir+1) of a real direction (sel_dir+1) immediately to the right of the selected local edge direction (sel_dir) computed using equation (6) is lower than the energy E(sel_dir−1) of a real direction (sel_dir−1) immediately to the left of the selected local edge direction (sel_dir) computed using equation (6).

For example, if it is determined at step S98 that the energy E(sel_dir+1) is lower than the energy E(sel_dir−1), the process proceeds to step S99. However, if it is determined at step S98 that the energy E(sel_dir+1) is higher than or equal to the energy E(sel_dir−1), the process proceeds to step S102.

At step S99, the direction determination unit 123 determines whether energy diff(sel_dir+1) of the real direction (sel_dir+1) immediately to the right of the selected local edge direction (sel_dir) computed using equation (7) is lower than energy diff(sel_dir−1) of a real direction (sel_dir−1) immediately to the left of the selected local edge direction (sel_dir) computed using equation (7).

If it is determined at step S99 that the energy diff(sel_dir+1) is lower than the energy diff(sel_dir−1), the process proceeds to step S100.

In contrast, if it is determined at step S99 that the energy diff(sel_dir+1) is higher than or equal to the energy diff (sel_dir−1), the direction determination unit 123 determines that the virtual direction cannot be replaced with the real direction (the virtual direction cannot be set as a real direction). Thus, the direction determination unit 123 determines the virtual direction to be a selected direction and terminates the direction determination process. The process then proceeds to step S56 of the flow chart shown in FIG. 6. At that time, the direction determination unit 123 outputs directional information indicating the local edge direction sel_dir (i.e., Lsel_dir in FIG. 18, as described below) to the directional interpolation unit 131, the confidence level rating unit 124, and the directional distribution generation unit 125.

At step S100, the direction determination unit 123 determines whether the selected virtual local edge direction (sel_dir) is identical to a virtual direction (mid_dir−1) immediately to the left of the virtual direction.

For example, at step S100, if it is determined that (sel_dir) is identical to (mid_dir−1), the direction determination unit 123 determines that the virtual direction cannot be replaced with the real direction (the virtual direction cannot be set as a real direction). Thus, the direction determination unit 123 determines the virtual direction to be a selected direction and terminates the direction determination process. The process then proceeds to step S56 of the flow chart shown in FIG. 6. At that time, the direction determination unit 123 outputs directional information indicating the local edge direction sel_dir (i.e., Lsel_dir in FIG. 18, as described below) to the directional interpolation unit 131, the confidence level rating unit 124, and the directional distribution generation unit 125.

If it is determined at step S100 that (sel_dir) is not identical to (mid_dir−1), the direction determination unit 123, at step S101, determines that the virtual direction can be replaced with the real direction (the virtual direction can be set as a real direction). Thus, the direction determination unit 123 replaces the selected direction (sel_dir) with the real direction (sel_dir+1) immediately to the right of the selected virtual local edge direction (sel_dir).

At step S102, the direction determination unit 123 determines whether the energy E(sel_dir−1) of a real direction (sel_dir−1) immediately to the left of the selected virtual local edge direction (sel_dir) computed using equation (6) is lower than the energy E(sel_dir+1) of a real direction (sel_dir+1) immediately to the right of the selected local edge direction (sel_dir) computed using equation (6).

For example, if it is determined at step S102 that the energy E(sel_dir−1) is lower than the energy E(sel_dir+1), the process proceeds to step S103.

However, if it is determined at step S102 that the energy E(sel_dir−1) is higher than or equal to the energy E(sel_dir+1), the direction determination unit 123 determines that the virtual direction cannot be replaced with the real direction (the virtual direction cannot be set as a real direction). Thus, the direction determination unit 123 sets the virtual direction to be a selected direction and terminates the direction determination process. The process then proceeds to step S56 of the flow chart shown in FIG. 6. At that time, the direction determination unit 123 outputs directional information indicating the local edge direction sel_dir (i.e., Lsel_dir in FIG. 18, as described below) to the directional interpolation unit 131, the confidence level rating unit 124, and the directional distribution generation unit 125.

At step S103, the direction determination unit 123 determines whether energy diff(sel_dir−1) of the real direction (sel_dir−1) immediately to the left of the selected virtual local edge direction (sel_dir) computed using equation (7) is lower than energy diff(sel_dir+1) of a real direction (sel_dir+1) immediately to the right of the selected local edge direction (sel_dir) computed using equation (7).

For example, if it is determined at step S103 that the energy diff(sel_dir−1) is lower than the energy diff(sel_dir+1), the process proceeds to step S104.

In contrast, for example, if it is determined at step S103 that the energy diff(sel_dir−1) is lower than or equal to the energy diff(sel_dir+1), that is, if it is determined that the both are the same, the direction determination unit 123 determines that the virtual direction cannot be replaced with the real direction (the virtual direction cannot be set as a real direction). Thus, the direction determination unit 123 sets the virtual direction to be a selected direction and terminates the direction determination process. The process then proceeds to step S56 of the flow chart shown in FIG. 6. At that time, the direction determination unit 123 outputs directional information indicating the local edge direction sel_dir (i.e., Lsel_dir in FIG. 18, as described below) to the directional interpolation unit 131, the confidence level rating unit 124, and the directional distribution generation unit 125.

At step S104, the direction determination unit 123 determines whether the selected virtual local edge direction (sel_dir) is identical to a virtual direction (mid_dir+1) immediately to the left of the vertical direction.

For example, at step S104, if it is determined that the selected direction (sel_dir) is identical to (mid_dir+1), the direction determination unit 123 determines that the virtual direction cannot be replaced with the real direction (the virtual direction cannot be set as a real direction). Thus, the direction determination unit 123 sets the virtual direction to be a selected direction and terminates the direction determination process. The process then proceeds to step S56 of the flow chart shown in FIG. 6. At that time, the direction determination unit 123 outputs directional information indicating the local edge direction sel_dir (i.e., Lsel_dir in FIG. 18, as described below) to the directional interpolation unit 131, the confidence level rating unit 124, and the directional distribution generation unit 125.

However, if it is determined at step S104 that (sel_dir) is not identical to (mid_dir+1), the direction determination unit 123, at step S105, determines that the virtual direction can be replaced with the real direction (the virtual direction can be set as a real direction). Thus, the direction determination unit 123 replaces the selected virtual local edge direction (sel_dir) with the real direction (sel_dir−1) immediately to the left of the selected local edge direction (sel_dir) and terminates the direction determination process. The process then proceeds to step S56 of the flow chart shown in FIG. 6. At that time, the direction determination unit 123 outputs directional information indicating the local edge direction sel_dir (i.e., Lsel_dir in FIG. 18, as described below) to the directional interpolation unit 131, the confidence level rating unit 124, and the directional distribution generation unit 125.

Figure 14:
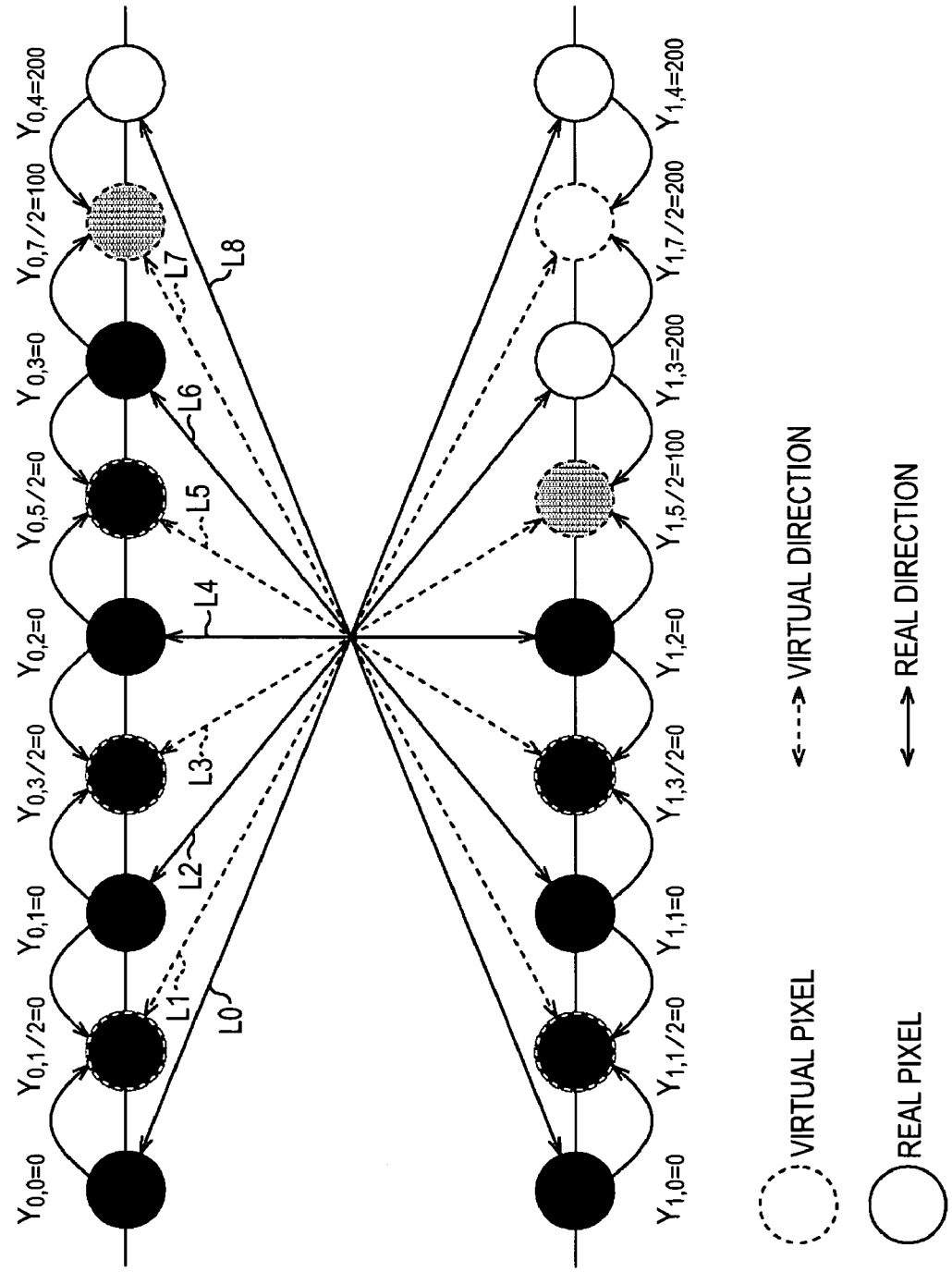
FIG. 14 is a diagram for illustrating an edge direction determination process at step S55 shown in FIG. 6.

FIG. 14 illustrates a specific example of the direction determination process. In the example shown in FIG. 14, the following values are computed: the difference between a pixel value 0 of a real pixel $Y_{0,0}$ and a pixel value 200 of a real pixel $Y_{1,4}$, the difference between a pixel value 0 of a virtual pixel $Y_{0,1/2}$ and a pixel value 200 of a virtual pixel $Y_{1,7/2}$, the difference between a pixel value 0 of a real pixel $Y_{0,1}$ and a pixel value 200 of a real pixel $Y_{1,3}$, the difference between a pixel value 0 of a virtual pixel $Y_{0,3/2}$ and a pixel value 100 of a virtual pixel $Y_{1,5/2}$, the difference between a pixel value 0 of a real pixel $Y_{0,2}$ and a pixel value 200 of a real pixel $Y_{1,2}$, the difference between a pixel value 0 of a virtual pixel $Y_{0,5/2}$ and a pixel value 100 of a virtual pixel $Y_{1,3/2}$, the difference between a pixel value 0 of a real pixel $Y_{0,3}$ and a pixel value 0 of a real pixel $Y_{1,1}$, the difference between a pixel value 100 of a virtual pixel $Y_{0,7/2}$ and a pixel value 0 of a virtual pixel $Y_{1,1/2}$, and the difference between a pixel value 200 of a real pixel $Y_{0,4}$ and a pixel value 0 of a real pixel $Y_{1,0}$.

Hereinafter, a direction passing through the real pixel $Y_{0,0}$ and the real pixel $Y_{1,4}$ is referred to as a direction L0. A direction passing through the virtual pixel $Y_{0,1/2}$ and the virtual pixel $Y_{1,7/2}$ is referred to as a direction L1. A direction passing through the real pixel $Y_{0,1}$ and the real pixel $Y_{1,3}$ is referred to as a direction L2. A direction passing through the virtual pixel $Y_{0,3/2}$ and the virtual pixel $Y_{1,5/2}$ is referred to as a direction L3. A direction passing through the real pixel $Y_{0,2}$ and the real pixel $Y_{1,2}$ is referred to as a direction L4. A direction passing through the virtual pixel $Y_{0,5/2}$ and the virtual pixel $Y_{1,3/2}$ is referred to as a direction L5. A direction passing through the real pixel $Y_{0,3}$ and the real pixel $Y_{1,1}$ is referred to as a direction L6. A direction passing through the virtual pixel $Y_{0,7/2}$ and the virtual pixel $Y_{1,1/2}$ is referred to as a direction L7. A direction passing through the real pixel $Y_{0,4}$ and the real pixel $Y_{1,0}$ is referred to as a direction L8.

In FIG. 14, a real pixel is shown by a circle with a solid line, and a virtual pixel, which is interpolated and generated from the real pixels, is shown by a circle with a dotted line. In addition, an arrow indicating a direction passing through the real pixels is shown by a solid line, and an arrow indicating a direction passing through the virtual pixels is shown by a dotted line.

In the max_dir direction selection process at step S81, a direction along which is the pixel of interest and which has the highest energy E(dir) is selected from among the right up and left up directions of energy E(dir) (dir=2, 3, 5, and 6) computed using equation (6). In this example, the direction L2 passing through the pixel $Y_{0,1}$ and the pixel $Y_{1,3}$ is selected. This diagonal direction passing through the two pixels is selected as the direction (max_dir) perpendicular to the local edge along which is the pixel of interest.

Additionally, in the left_dir direction selection process at step S82, a left up direction along which is the pixel of interest and which has the lowest energy E(dir) among E(dir) (dir=0, 1, 2, 3, and 4) computed using equation (6) is selected as a left up local edge direction (left_dir). In this example, the direction L4 passing through the pixel $Y_{0,2}$ and the pixel $Y_{1,2}$ is selected.

Furthermore, in the right_dir direction selecting process at step S83, a right up direction along which is the pixel of interest and which has the lowest energy E(dir) among E(dir) (dir=4, 5, 6, 7, and 8) computed using equation (6) is selected as a right up local edge direction (right_dir). In this example, the direction L6 passing through the pixel $Y_{0,3}$ and the pixel $Y_{1,1}$ is selected.

At step S84, it is determined whether |angle(max_dir, right_dir)| is less than |angle(max_dir,left_dir)|. Here, |angle (max_dir, right_dir)| is an absolute value of the angle between the right up local edge direction L6 (right_dir=6) along which is the pixel of interest and the direction L2 (max_dir=2) perpendicular to the local edge direction. |angle(max_dir, left_dir)| is an absolute value of the angle between the left up local edge direction L4 (left_dir=4) along which is the pixel of interest and the direction L2 (max_dir=2) perpendicular to the local edge direction.

In FIG. 14, when |angle(max_dir, right_dir)|=|max_dir−right_dir|=|2−6|=4 and |angle(max_dir, left_dir)|=|max_dir−left_dir|=|2−4|=2, |angle(max_dir, left_dir)|=2 is less than |angle(max_dir, right_dir)|=4. Therefore, the process proceeds to step S86.

Additionally, at step S86, it is determined whether |angle (max_dir, right_dir)| is greater than |angle(max_dir, left_dir) |. Here, |angle(max_dir, right_dir)| is an absolute value of the angle between the right up local edge direction L6 (right_dir=6) along which is the pixel of interest and a direction L2 (max_dir=2) perpendicular to the local edge direction. |angle (max_dir, left_dir)| is an absolute value of the angle between the left up local edge direction L4 (left_dir=4) along which is the pixel of interest and a direction L4 (max_dir=4) perpendicular to the local edge direction.

In the example shown in FIG. 14, since |angle(max_dir, right_dir)|(=4) is greater than |angle(max_dir, left_dir)|(=2), the process proceeds to step S87. At step S87, the right up local edge direction L6 (right_dir=6) along which is the pixel of interest is selected and the direction L6 of the diagonal line passing through the two pixels is considered to be the direction of the local edge. The process then proceeds to step S97.

At step S97, it is determined whether or not the local edge direction L6 (sel_dir) selected in the previous stage is a virtual direction.

In the example shown in FIG. 14, since the selected sel_dir (=6) is an even number, that is, since sel_dir=2n, sel_dir is considered to be a real direction. Thus, the direction selecting process is completed.

As a result, the process proceeds to step S56. At step S56, the direction determination unit 123 outputs directional information indicating the local edge direction L6 to the directional interpolation unit 131, the confidence level rating unit 124, and the directional distribution generation unit 125.

FIG. 14 also illustrates an example in which a local edge is estimated from the differences between five pixels (real pixels) in the upper line and five pixels (real pixels) in the lower line of the original image I_Image. In the example shown in FIG. 14, N is 5. However, by using N greater than 5, more precise and the larger number of directions can be detected.

Figure 6:
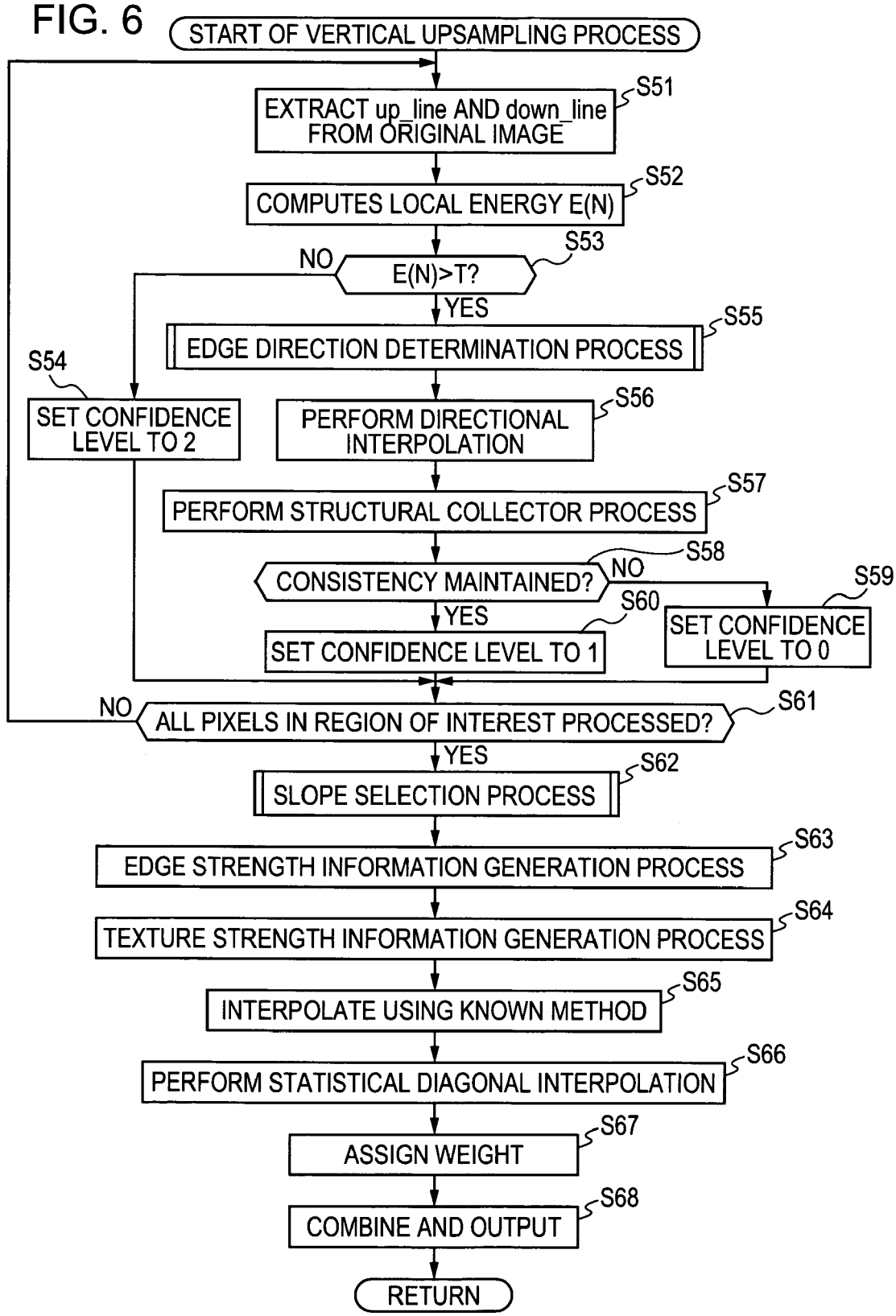
FIG. 6 is a flow chart of a vertical upsampling process at step S21 shown in FIG. 5.

Referring back to the flow chart of FIG. 6, the description continues.

When the edge direction is determined by the edge direction determination process at step S55, the directional interpolation unit 131, at step S56, performs an interpolation process (directional interpolation process) using pixels in the determined edge direction. In the directional interpolation process, the pixel value of a pixel between two pixels corresponding to the edge direction is interpolated. For example, in the example shown in FIG. 14, the average value (0) of pixel values of the pixels $Y_{0,3}$ and $Y_{1,1}$ is considered to be the pixel value of a pixel between the two pixels.

At step S57, the confidence level rating unit 124 performs a structural collector process. In the structural collector process, the consistency of the updated local structure (a pixel generated by the directional interpolation process at step S56, and its upper, lower, and diagonal neighboring pixels) is examined by analyzing a relationship between a pixel I_Image(X+N/2,Y+0.5) interpolated at coordinates (X+N/2,Y+0.5) and neighboring pixels in the vertical direction and diagonal direction, that is, by analyzing a relationship between coordinates up_line(N/2), up_line(N/2−1), and up_line(N/2+1) and coordinates down_line(N/2), down_line (N/2−1), and down_line(N/2+1).

That is, in the structural collector process, the updated pixel is subtracted from a central pixel in the upper line. In addition, a central pixel in the lower line is subtracted from the updated pixel. The two resultant values are multiplied together to obtain a value V(N/2) representing a change in the vertical direction. That is, at step S57, the following equation (8) is computed.

$$V(N/2)=(\mathrm{up\_line}(N/2)-I\_\mathrm{Image}(X+N/2,Y+0.5))\times \\ (I\_\mathrm{Image}(X+N/2,Y+0.5)-\mathrm{down\_line}(N/2)) \quad (8)$$

Here, I_Image(X+N/2,Y+0.5) is a pixel value of the updated pixel which is generated by interpolation.

Additionally, in the structural collector process, the pixel immediately to the right of the central pixel in the upper line is subtracted from the central pixel. Furthermore, the central pixel in the upper line is subtracted from the pixel immediately to the left of the central pixel. The two resultant values are multiplied together to obtain a value H_up(N/2) representing a change in the horizontal direction in the upper line. That is, at step S57, the following equation (9) is computed.

$$H\_\mathrm{up}(N/2)=(\mathrm{up\_line}(N/2)-\mathrm{up\_line}(N/2+1))\times(\mathrm{up\_line} \\ (N/2-1)-\mathrm{up\_line}(N/2)) \quad (9)$$

Furthermore, in the structural collector process, the pixel immediately to the right of the central pixel in the lower line is subtracted from the central pixel. Also, the central pixel in the lower line is subtracted from the pixel immediately to the left of the central pixel. The two resultant values are multiplied together to obtain a value H_down(N/2) representing a change in the horizontal direction in the lower line. That is, at step S57, the following equation (10) is computed.

$$H\_\mathrm{down}(N/2)=(\mathrm{down\_line}(N/2)-\mathrm{down\_line}(N/2+1))\times \\ (\mathrm{down\_line}(N/2-1)-\mathrm{down\_line}(N/2)) \quad (10)$$

At step S58, the confidence level rating unit 124 determines whether the consistency of the updated local structure is maintained or not on the basis of the computation result at step S57. The determination is made on the basis of whether each of the values V(N/2), H_up(N/2), and H_down(N/2) is positive or not.

It is determined that the consistency is not maintained if the value V(N/2) is negative, the value H_up(N/2) is negative, and the value H_down(N/2) is negative and if an absolute value of subtraction result (up_line(N/2)−I_Image(X+N/2, Y+0.5) is greater than a predetermined threshold value, an absolute value of subtraction result up_line(N/2)−up_line(N/2+1) is greater than a predetermined threshold value, an absolute value of subtraction result up_line(N/2−1)−up_line(N/2) is greater than a predetermined threshold value, an absolute value of subtraction result down_line(N/2)−down_line(N/2+1) is greater than a predetermined threshold value, and an absolute value of subtraction result down_line(N/2−1)−down_line(N/2) is greater than a predetermined threshold value.

That is, it is determined that a pixel value generated at step S56 using an erroneous direction is inappropriate. In this case, the confidence level rating unit 124, at step S59, determines the confidence level of the interpolated pixel to be 0 and outputs it to the directional distribution generation unit 125.

That is, at step S59, the confidence level rating unit 124 determines the confidence level of the interpolated pixel to be 0 and outputs it to the directional distribution generation unit 125.

In contrast, if at least one unsatisfied condition among the above-described conditions is found at step S58, the confidence level rating unit 124 determines that the consistency is maintained. At step S60, the confidence level rating unit 124 sets the confidence level of the interpolated pixel to 1 and outputs it to the directional distribution generation unit 125.

Figure 15:
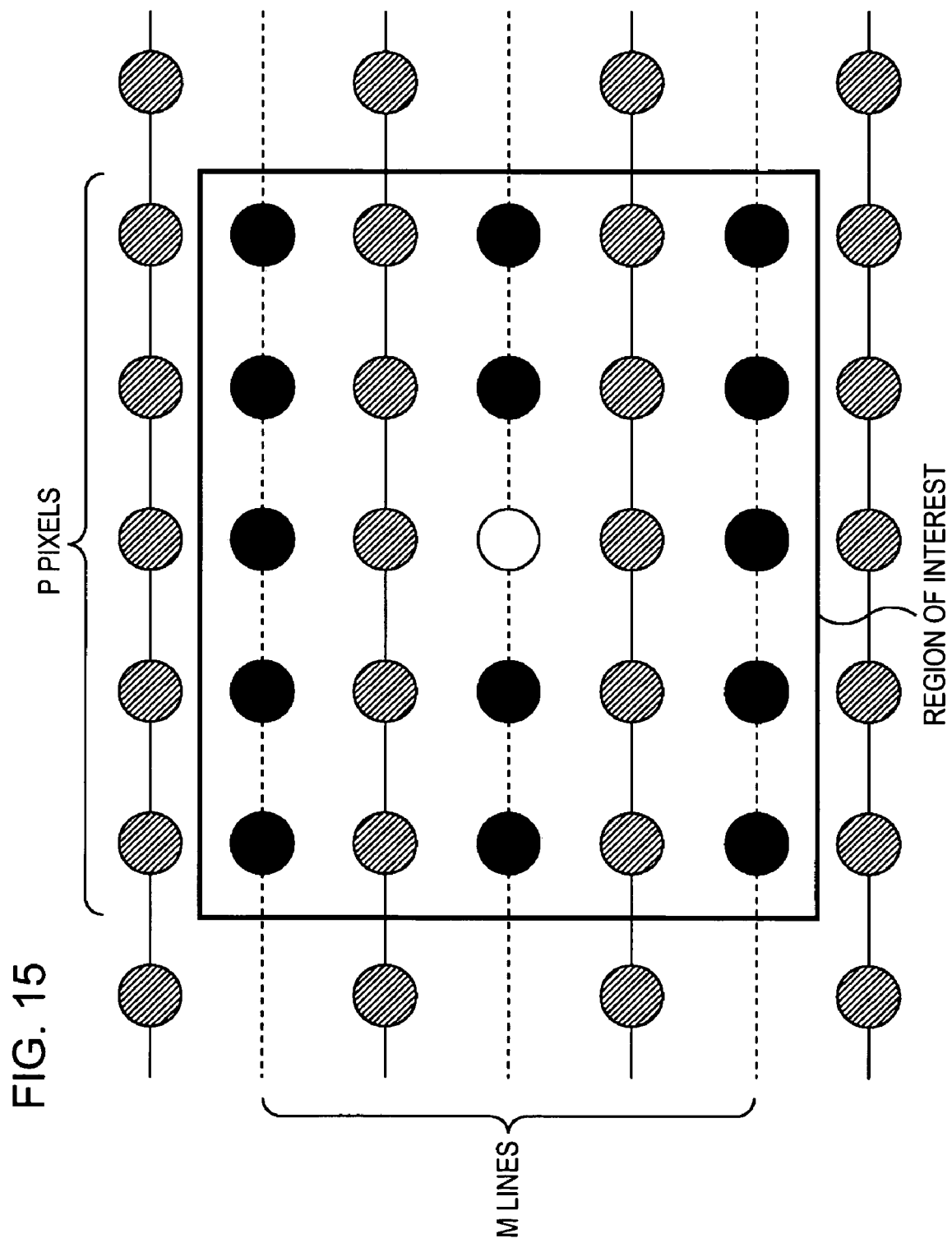
FIG. 15 is a diagram for illustrating a region of interest in a slope selection process at step S62 shown in FIG. 6.

At step S61, it is determined whether all of the interpolated pixels in a region of interest corresponding to the pixel of interest are generated. If it is determined that all of the interpolated pixels are not generated, the process returns to step S51, where the processes from steps S51 through S61 are repeated until all of the interpolated pixels are generated. If it is determined at step S61 that all of the interpolated pixels are generated, the process proceeds to step S62. As used herein, the term "region of interest corresponding to a pixel of interest" is referred to as interpolated pixels, for example, in the range of P (the number of pixels) by M (the number of lines) shown in FIG. 15. In FIG. 15, a white circle represents a pixel of interest (interpolated pixel), a black circle represents an interpolated pixel, and a circle with hatching represents a pixel of an original image (originally existing pixel). If all of the interpolated pixels are generated at step S51, all of the pixels indicated by the black circles are generated in the drawing and the process proceeds to step S62.

At step S62, a slope selection process is performed.

Figure 16:
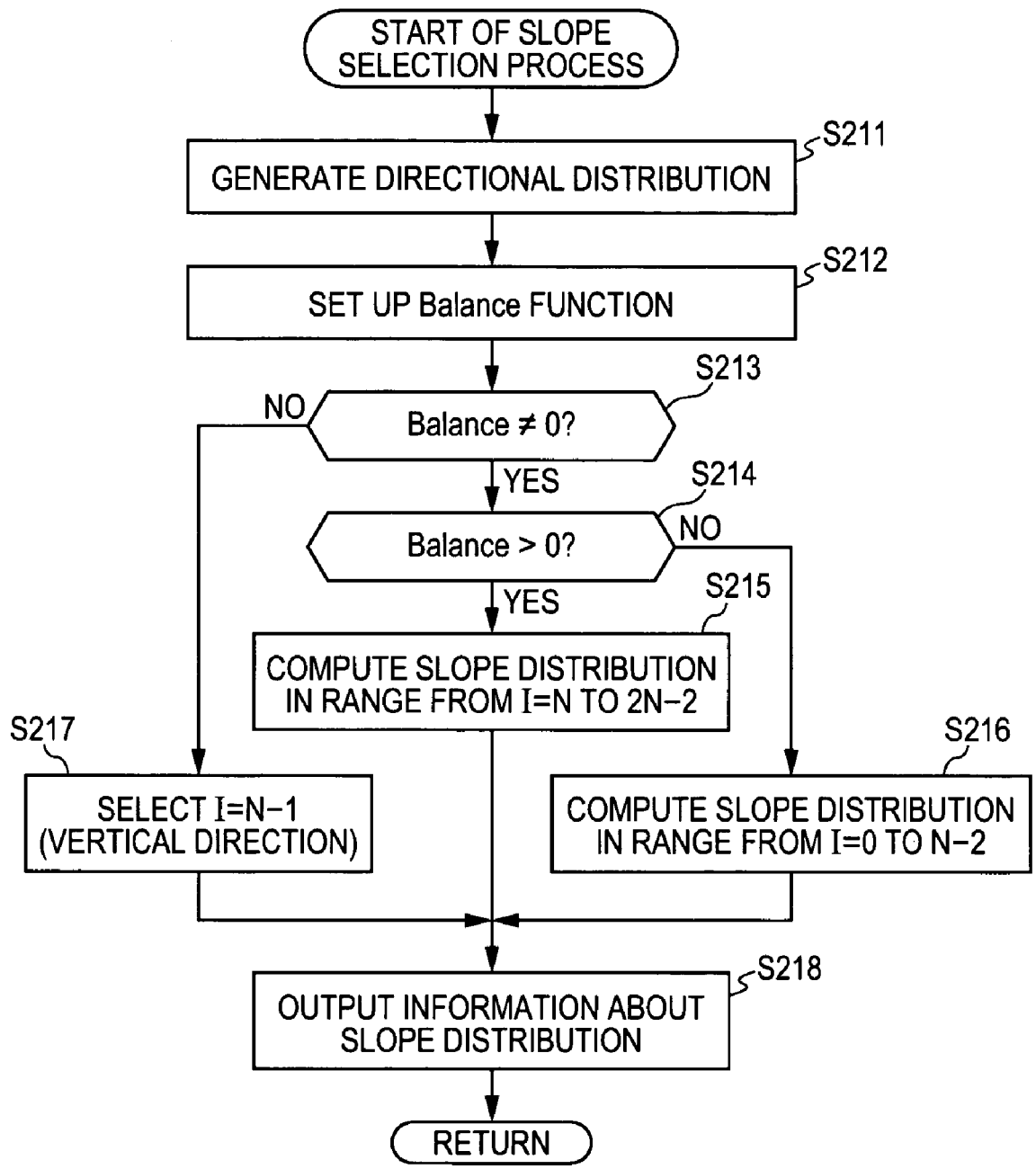
FIG. 16 is a flow chart of the slope selection process at step S62 shown in FIG. 6.

The slope selection process is described next with reference to a flow chart in FIG. 16.

At step S211, the directional distribution generation unit 125 generates a directional distribution. That is, the directional distribution generation unit 125 generates a directional distribution on the basis of the input edge directions and information about the confidence levels thereof. That is, as shown in FIG. 17, a direction of interpolation and information about the confidence level for each position of interpolated pixel have been input to the directional distribution generation unit 125.

Figure 17:
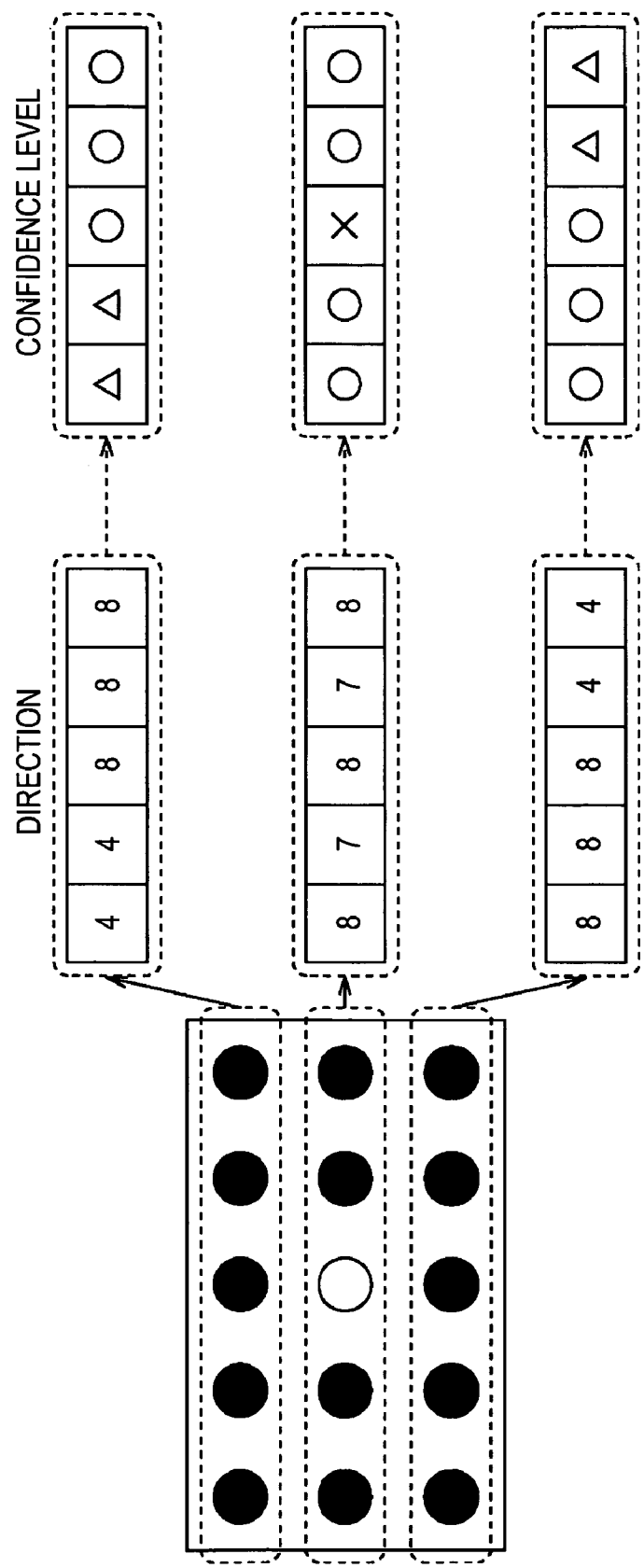
FIG. 17 is a diagram for illustrating an example of a direction and confidence level in the slope selection process at step S62 shown in FIG. 6.

For the five pixels and three lines are shown in FIG. 15, the corresponding fifteen positions of interpolated pixels are shown on the left side of FIG. 17. Additionally, at the center of FIG. 17, the direction of interpolation for each interpolated pixel is shown. As shown in FIG. 18, a reference numeral is assigned to a direction of the interpolated pixel, which is a direction passing through two pixels symmetrically disposed either side of a pixel of interest. A real direction L0 is a direction passing through an upper leftmost real pixel and a lower rightmost real pixel. A virtual direction L1 is a direction passing through an upper virtual pixel located second from the left and a lower virtual pixel located second from the right. A real direction L2 is a direction passing through an upper real pixel located third from the left and a lower real pixel located third from the right. A virtual direction L3 is a direction passing through an upper virtual pixel located fourth from the left and a lower virtual pixel located fourth from the right. A real direction L4 is a direction passing through an upper real pixel immediately above the interpolated pixel and a lower real pixel immediately underneath the interpolated pixel. A virtual direction L5 is a direction passing through an upper virtual pixel located fourth from the right and a lower virtual pixel located fourth from the left. A real direction L6 is a direction passing through an upper real pixel located third from the right and a lower real pixel located third from the left. A virtual direction L7 is a direction passing through an upper virtual pixel located second from the right and a lower virtual pixel located second from the left. A real direction L8 is a direction passing through an upper rightmost real pixel and a lower leftmost real pixel.

Additionally, on the right side in FIG. 17, the distribution of confidence levels is shown. A pixel whose confidence level is reported as 2 is indicated by "Δ". A pixel whose confidence level is reported as 1 is indicated by "O". A pixel whose confidence level is reported as 0 is indicated by "X".

That is, as shown in FIG. 17, the direction of interpolation of the interpolated pixel is "4, 4, 8, 8, 8" from the left in the upper line. The direction of interpolation of the interpolated pixel is "8, 7, 8, 7, 8" from the left in the middle line. The direction of interpolation of the interpolated pixel is "8, 8, 8, 4, 4" from the left in the lower line. The confidence level in the upper line is "Δ, Δ, O, O, O" from the left. The confidence level in the middle line is "O, O, X, O, O" from the left. The confidence level in the lower line is "O, O, O, Δ, Δ" from the left.

As a result, the directional distribution generation unit 125 can present a distribution Population_LI for each direction LI (I=0, 1, . . . 2N−2) by generating a directional distribution consisting of a histogram indicating the number of "O"s given to each direction. That is, in FIG. 17, the real direction L0 has zero "O" (Population_L0) and zero "X", the virtual direction L1 has zero "O" (Population_L1) and zero "X", the real direction L2 has zero "O" (Population_L2) and zero "X", the virtual direction L3 has zero "O" (Population_L3) and two "X"s, the real direction L4 has zero "O" (Population_L4), four "Δ"s, and zero "X", the virtual direction L5 has zero "O" (Population_L5) and zero "X", the real direction L6 has zero "O" (Population_L6) and zero "X", the virtual direction L7 has two "O"s (Population_L7) and zero "X", and the real direction L8 has eight "O"s (Population_L8) and one "X".

At step S211, the directional distribution is generated and the information about the generated directional distribution is delivered to the slope selection unit 126.

Referring back to FIG. 16, the description of the flow chart continues.

At step S212, the slope selection unit 126 sets up the following Balance function from these directional distributions (interpolation direction and the corresponding confidence level distribution).

That is, the slope selection unit 126 sets up the Balance function corresponding to the pixel of interest (X,Y) expressed by the following equation (11):

$$\text{Balance}(X,Y) = \Sigma_{I=N,\ldots 2N-2} \text{Population\_}LI - \Sigma_{I=0,\ldots N-2} \text{Population\_}LI \quad (11)$$

Here, Population_LI represents a value indicating the number of pixels whose confidence level is reported as 1 for a direction LI.

The above-described Balance function is one example of implementation of a function that enables the determination of a slope after analysis of a directional distribution around a pixel of interest. Another function may be used here.

At step S213, the slope selection unit 126 determines whether or not the value of Balance(X, Y) is zero (0). For example, if it is determined that the value of Balance(X,Y) is 0, the slope selection unit 126, at step S217, selects a direction for I=N−1 (vertical direction) from among the direction LI defined in FIG. 18 as a direction having the highest confidence level.

However, if it is determined at step S213 that the value of Balance(X, Y) is not 0, the slope selection unit 126, at step S214, determines whether or not the value of Balance (X, Y) is positive.

For example, if it is determined at step S214 that the value of Balance(X, Y) is positive, the slope selection unit 126, at step S215, selects a direction in the range of I=N+1 to 2N−2 from among the direction LI defined in FIG. 18 as a slope having the highest confidence level. The slope selection unit 126 then delivers the selected slope to the statistical diagonal interpolation unit 128.

However, if it is determined at step S214 that the value of Balance (X,Y) is not positive, the slope selection unit 126, at step S216, selects a direction in the range of I=0 to N−2 from among the direction LI defined in FIG. 18 as a slope having the highest confidence level. The slope selection unit 126 then delivers the selected slope to the statistical diagonal interpolation unit 128.

That is, when the position of the arrow-head of an arrow indicating a direction is divided into two groups: left of the direction L4 and right of the direction L4, the function shown by equation (11) indicates on which side the tendency of the confidence level falls. For example, a difference between the total confidence level of a group of the directions L0, L1, L2, and L3 and the total confidence level of a group of the directions L5, L6, L7, and L8 defined in FIG. 18 is computed at step S215. By examining the result, it is determined to which side the direction is sloped with respect to the vertical direction. The distribution of the slopes can be computed from the group indicating the confidence level tendency.

Figure 19:
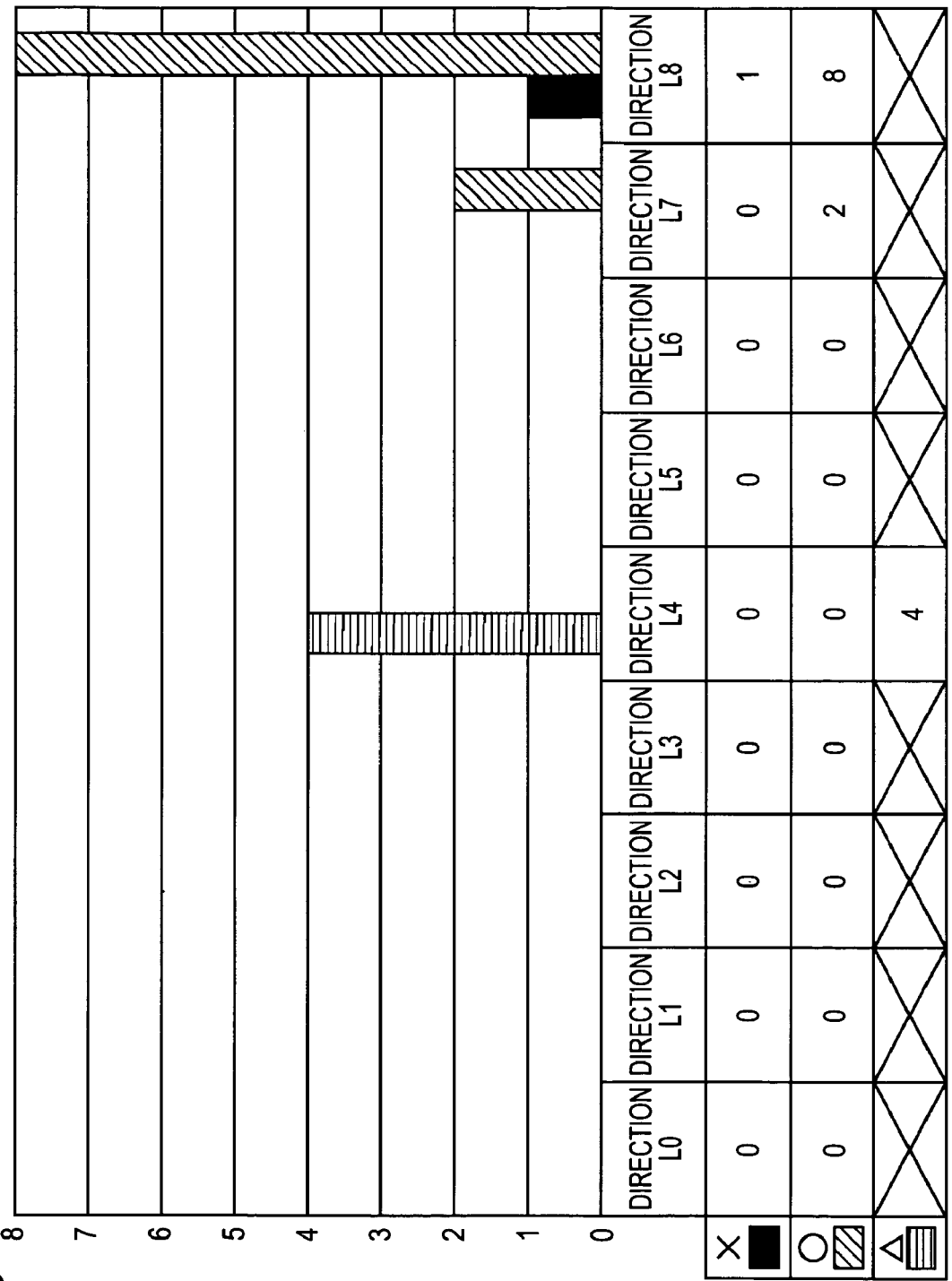
FIG. 19 is a diagram for illustrating a slope distribution and a directional distribution in the slope selection process at step S62 shown in FIG. 6.

As shown in FIG. 19, in the directional distribution, Population_L0 is 0, Population_L1 is 0, Population_L2 is 0, Population_L3 is 0, Population_L4 is 0, Population_L5 is 0, Population_L6 is 0, Population_L7 is 2, and Population_L8 is 8.

Here, since Balance=(Population_L8+Population_L7+Population_L6+Population_L5−Population_L0−Population_L1−Population_L2−Population_L3)=10, the value of the Balance function is positive (in the process of step S214). Therefore, the group of the directions L5, L6, L7, and L8 is selected as a slope having the highest confidence level.

At step S218, the slope selection unit 126 outputs information about the computed slope distribution to the statistical diagonal interpolation unit 128.

If it is determined that the value of Balance (X, Y) is zero (0), the slope selection unit 126, at step S217, selects a direction for I=N−1 (vertical direction) from among the directions LI defined in FIG. 18 as a direction having the highest confidence level.

Referring back to FIG. 6, the description of the flow chart continues.

At steps S63 and S64, a process for separating an edge from texture in a signal is performed on the basis of the information about the directional distribution generated by the slope selection unit 126. Information about the edge strength and texture strength is then generated.

That is, at step S63, the edge strength information generation unit 132 sets up a weight weight_edge(X,Y) by combining a diagonal direction and a virtual direction of the pixel of interest (X, Y) as follows and outputs it to the one-dimensional vertical image refresh processing unit 17.

$$\text{weight\_edge}(X, Y) = (ABS(\text{Balance}(X, Y)) + \text{Vertical\_population}(X,Y))/\text{Total\_population}(X,Y) \quad (12)$$

$\text{Balance}(X,Y) = \Sigma_{I=N\ldots 2N-2} \text{Population\_}LI - \Sigma_{I=0\ldots N-2} \text{Population\_}LI$ $\text{Vertical\_population}(X,Y) = \Sigma_{I=N-1} \text{Population\_}LI$ $\text{Total\_population}(X,Y) = \Sigma_{I=0\ldots 2N-2} \text{Population\_}LI$ Here, Population_LI represents a value indicating the number of pixels whose confidence level is reported as 1 for a direction LI. Vertical_population represents the number of pixels whose confidence level is reported as 1 for a vertical direction LI (I=N−1). Total_population represents the sum of the number of pixels whose confidence level is reported as 1 for directions LI (I=0, . . . 2N−2).

That is, the weight generated by combining a diagonal direction and a virtual direction is the ratio of Vertical_population added to the absolute value of the Balance function to the total confidence level.

The above-described weight_edge function is one example of a function that enables the determination of edge strength after analysis of a directional distribution around a pixel of interest. Another function may be used here. For example, a function may be used in which a direction of a pixel is compared with a direction of the neighboring pixel in the region of interest for the pixel of interest (e.g., the region of P (pixels) by M (lines) shown in FIG. 15). If the directions are the same, the function evaluates that the edge strength is high since the directions are aligned. In contrast, if the directions are not the same, the function evaluates that the edge strength is low since the directions are not aligned.

At step S64, the texture strength information generation unit 133 sets up a weight weight_texture(X,Y) by combining all the directions of the pixel of interest (X,Y) as expressed by the following equation (13) and outputs it to the one-dimensional vertical image refresh processing unit 17.

$$\text{weight\_texture}(X,Y) = \text{Total\_population}(X,Y)/(P(\text{the number of pixels}) \times M(\text{lines})) \quad (13)$$

$$\text{Total\_population}(X,Y) = \Sigma_{I=0,\ldots,2N-2} \text{Population\_}LI$$

Here, Population_LI represents a value indicating the number of pixels whose confidence level is reported as 1 for a direction LI. Total_population represents the sum of the number of pixels whose confidence level is reported as 1 for each LI (I=0, ... 2N−2).

That is, a weight weight_texture(X,Y) generated by combining all the directions of the pixel of interest (X,Y) is the ratio of all the pixels used for analyzing the directional distribution information around the pixel of interest to the number of pixels whose confidence level is reported as 1 for the directions LI (I=0, ... 2N−2).

The above-described weight_texture function is one example of a function that determines the texture strength after analysis of a directional distribution around a pixel of interest. Another function may be used here. For example, a function may be used in which a direction of a pixel is compared with a direction of the neighboring pixel in the region of interest for the pixel of interest (e.g., the region of P (pixels) by M (lines) shown in FIG. 15). If the directions are the same, the function evaluates that the texture strength is low since the directions are aligned. In contrast, if the directions are not the same, the function evaluates that the texture strength is high since the directions are not aligned.

At step S66, the statistical diagonal interpolation unit 128 computes a slope distribution.

For example, if it is determined at step S214 that the value of Balance(X,Y) is positive, the statistical diagonal interpolation unit 128 computes a slope distribution in the range of I=(N+1) to (2N−2).

That is, the statistical diagonal interpolation unit 128 selects, as a slope having the highest confidence level, a direction in the range of I=(N+1) to (2N−2) from among the direction LI defined in FIG. 18 using the directional distribution generated at step S211. The statistical diagonal interpolation unit 128 then computes a statistical diagonal interpolation pixel using the following equation (14).

$$\text{a statistical diagonal interpolation pixel}(X,Y) = \{1/\Sigma_{I=N+1,\ldots,2N-2} \text{Population\_}LI\} \times \{\Sigma_{I=N+1,\ldots,2N-2} \text{Population\_}LI \times \text{slope average pixel}(LI)\} \quad (14)$$

At that time, the statistical diagonal interpolation unit 128 computes a slope distribution in the range of I=0 to (N−2).

In contrast, if it is determined at step S214 that the value of Balance(X,Y) is not positive, the statistical diagonal interpolation unit 128 selects, as a slope having the highest confidence level, a direction in the range of I=0 to (N−2) from among the direction LI defined in FIG. 18. The statistical diagonal interpolation unit 128 then computes a statistical diagonal interpolation pixel using the following equation (15).

$$\text{a statistical diagonal interpolation pixel}(X,Y) = \{1/\Sigma_{I=0,\ldots,N-2} \text{Population\_}LI\} \times \{\Sigma_{I=0,\ldots,N-2} \text{Population\_}LI \times \text{slope average pixel}(LI)\} \quad (15)$$

That is, in the example shown in FIG. 18, the slopes L5, L6, L7, and L8 are selected. In the case of a pixel of interest shown in FIG. 18, the virtual direction L5 is a direction passing through an upper virtual pixel located fourth from the right and a lower virtual pixel located fourth from the left. A real direction L6 is a direction passing through an upper real pixel located third from the right and a lower real pixel located third from the left. A virtual direction L7 is a direction passing through an upper virtual pixel located second from the right and a lower virtual pixel located second from the left. A real direction L8 is a direction passing through an upper rightmost real pixel and a lower leftmost real pixel. Accordingly, the statistical diagonal interpolation unit 128 computes an average pixel value among pixels located in each direction LI and an average pixel value weighted by the slope distribution of the slope average pixel (LI) (i.e., statistical diagonal interpolation pixel value) as follows:

$$\text{a statistical diagonal interpolation pixel}(X,Y) = \{1/(\text{Population\_}L5+\text{Population\_}L6+\text{Population\_}L7+\text{Population\_}L8)\} \times \{\text{Population\_}L5 \times \text{slope average pixel}(L5) + \text{Population\_}L6 \times \text{slope average pixel}(L6) + \text{Population\_}L7 \times \text{slope average pixel}(L7) + \text{Population\_}L8 \times \text{slope average pixel}(L8)\} \quad (16)$$

$$\text{average pixel}(L5) = 0.5 \times (\text{virtual pixel } Y_{0,5/2} + \text{virtual pixel } Y_{1,3/2}) \quad (17)$$

$$\text{average pixel}(L6) = 0.5 \times (\text{real pixel } Y_{0,3} + \text{real pixel } Y_{1,1}) \quad (18)$$

$$\text{average pixel}(L7) = 0.5 \times (\text{virtual pixel } Y_{0,7/2} + \text{virtual pixel } Y_{1,1/2}) \quad (19)$$

$$\text{average pixel}(L8) = 0.5 \times (\text{real pixel } Y_{0,4} + \text{real pixel } Y_{1,10}) \quad (20)$$

At step S65, the linear interpolation unit 127 computes pixel values of a plurality of pixels above and under the pixel of interest in the vertical direction using a filter operation as pixel values of linear interpolation pixels, which are interpolated pixels generated by a known method. The linear interpolation unit 127 then outputs the pixel values to the combining unit 130.

At step S66, the statistical diagonal interpolation unit 128 outputs a weighted average pixel value computed using a slope distribution of an average pixel value among pixels located in each direction including the directions selected by the slope selection unit 126. The statistical diagonal interpolation unit 128 outputs this weighted average pixel value to the combining unit 130 as a statistical diagonal interpolation pixel value.

At step S67, the diagonal weighting unit 129 sets up a weight weight_slant(X,Y) of a pixel of interest (X,Y) in a diagonal direction using the following equation (21) and outputs it to the combining unit 130.

$$\text{weight\_slant}(X,Y) = ABS(ABS(\text{Balance}(X,Y)) - \text{Offset})/\text{Total\_population}(X,Y) \quad (21)$$

Balance(X,Y)=$\Sigma_{I=N+1,\ldots 2N-2}$ Population_LI−$\Sigma I=_{0,\ldots N-2}$ Population_LI Total_population(X,Y)=$\Sigma_{I=0,\ldots 2N-2}$ Population_LI Offset=threshold value That is, the weight in a diagonal direction is set as a ratio of the absolute value of the Balance function to the total confidence level.

At step S68, the combining unit 130 assigns a weight to the linear interpolation pixel received from the linear interpolation unit 127, assigns a weight to the statistical diagonal interpolation pixel, and combines the two pixels using the following equation (22). The combining unit 130 then outputs the resultant value as a combined interpolation pixel.

combined interpolation pixel(X, Y)=(1−weight_slant (X, Y))×(linear interpolation pixel(X, Y))+ weight_slant(X, Y)×(statistical diagonal interpolation pixel(X, Y)) (22)

That is, since the weight assigned to a linear interpolation pixel is expressed as (1−weight_slant(X, Y)), a pixel value obtained by linear interpolation is multiplied by (1−weight_slant(X, Y)), which is the weight associated with the linear interpolation. The statistical diagonal interpolation pixel value is multiplied by weight_slant(X,Y), which is the weight associated with the statistical diagonal interpolation. The linear sum of the two resultant values is considered to be the final combined interpolation pixel value. Thus, interpolations in a vertical direction and in a diagonal direction are combined in a balanced manner, and therefore, a precise combined interpolation pixel can be generated.

To obtain an unknown pixel I_Image(X+N/2, Y+0.5) located at individual coordinates (X+N/2, Y+0.5) in an unknown line positioned at a vertical coordinate (Y+0.5) in I_image, the same processes are repeated.

While there has been described and illustrated an interpolation for a region of interest of 5 pixels and 3 lines, it will be apparent to those skilled in the art that the region of interest can be of another pixel size.

Figure 20:
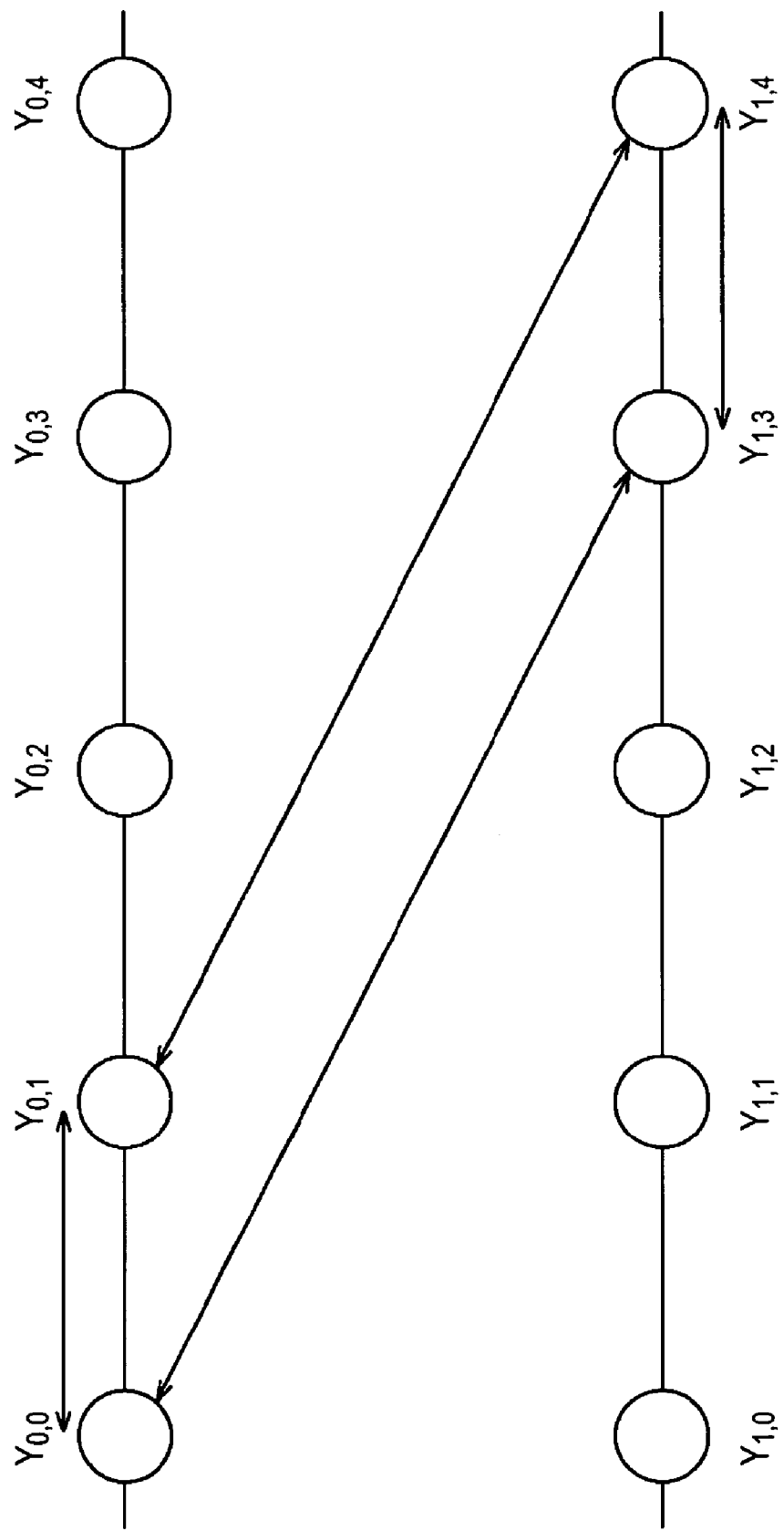
FIG. 20 is a diagram for illustrating another computing method of an edge direction.
Figure 21:
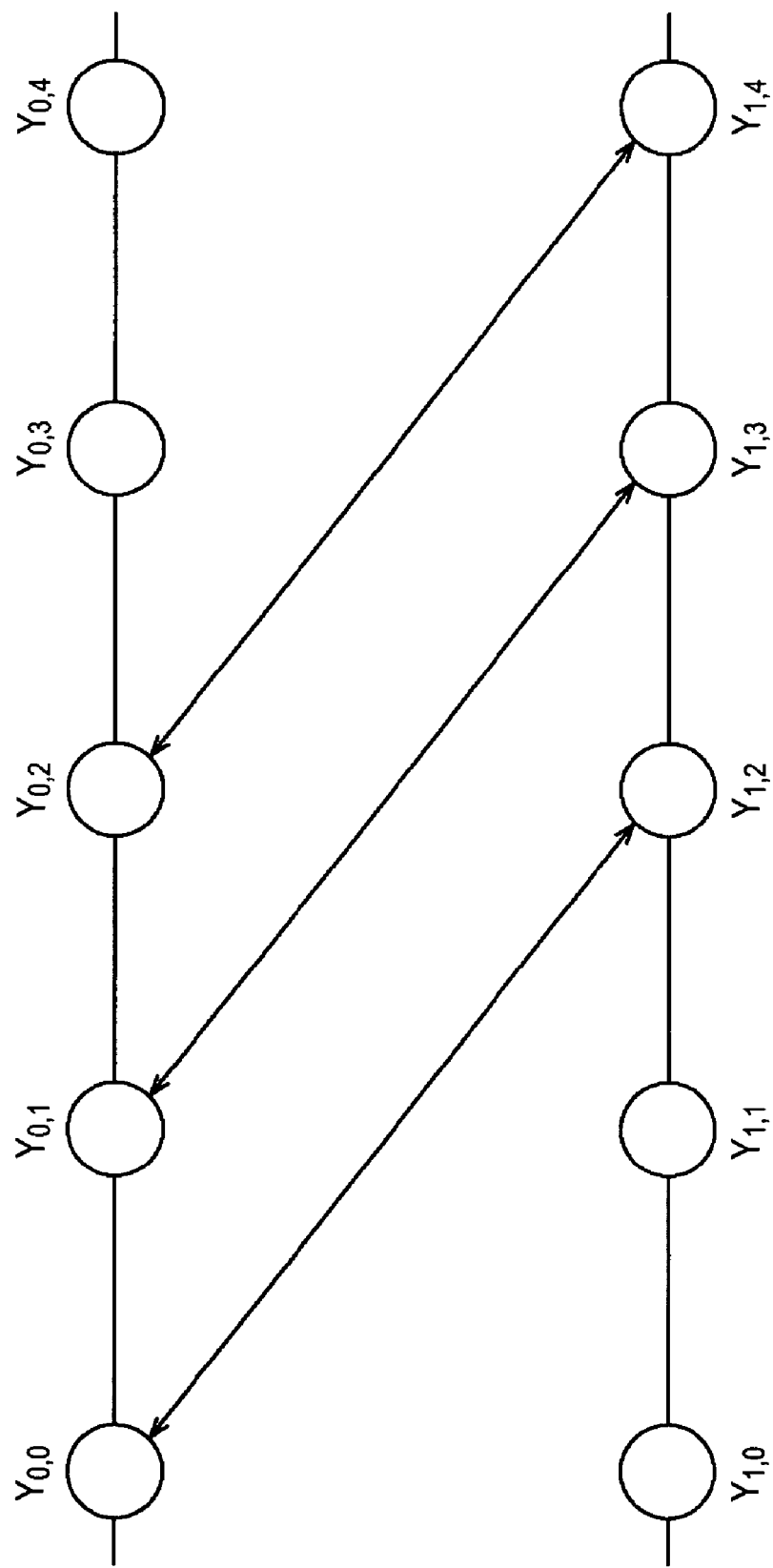
FIG. 21 is a diagram for illustrating another computing method of an edge direction.
Figure 22:
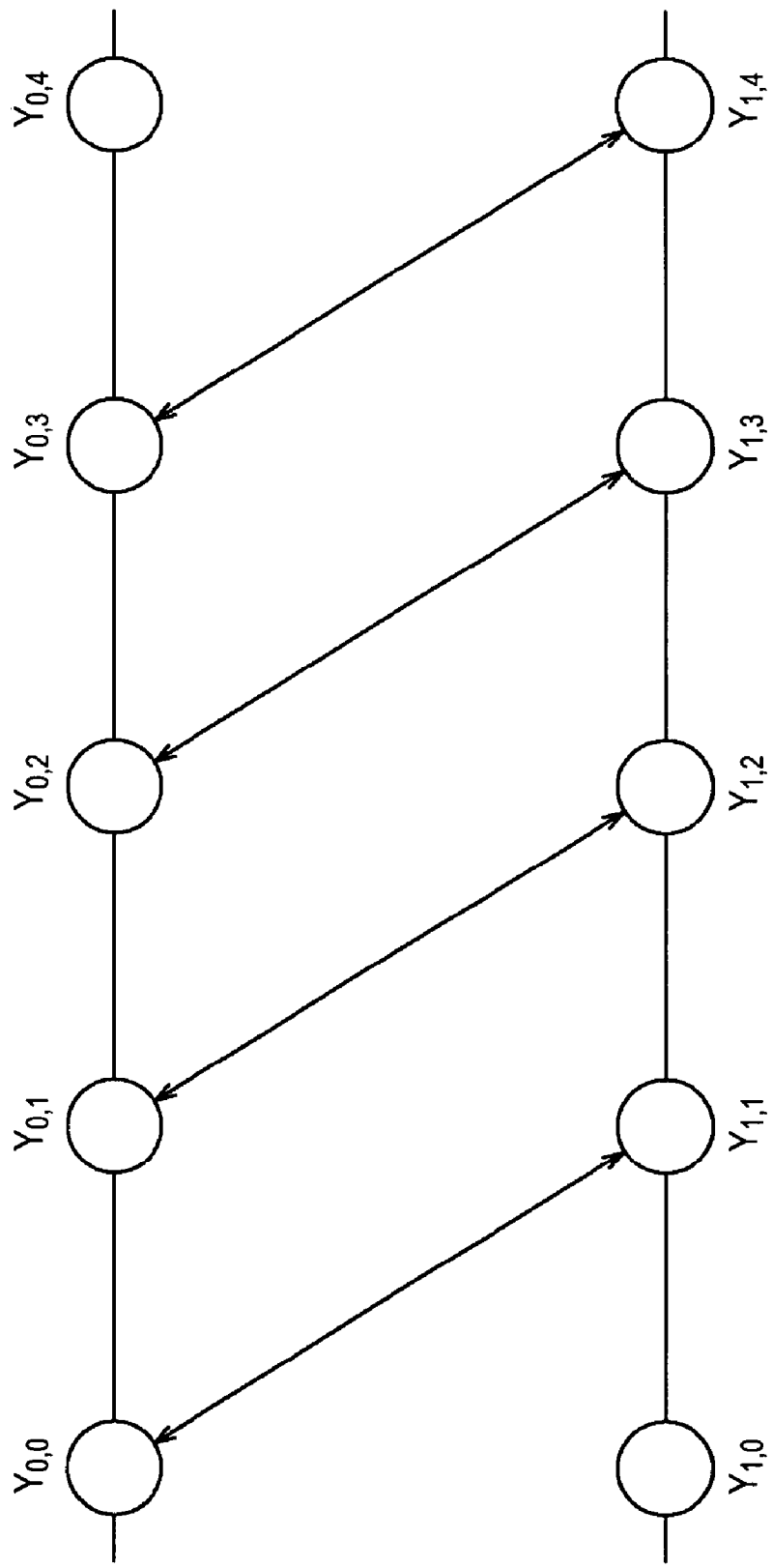
FIG. 22 is a diagram for illustrating another computing method of an edge direction.
Figure 23:
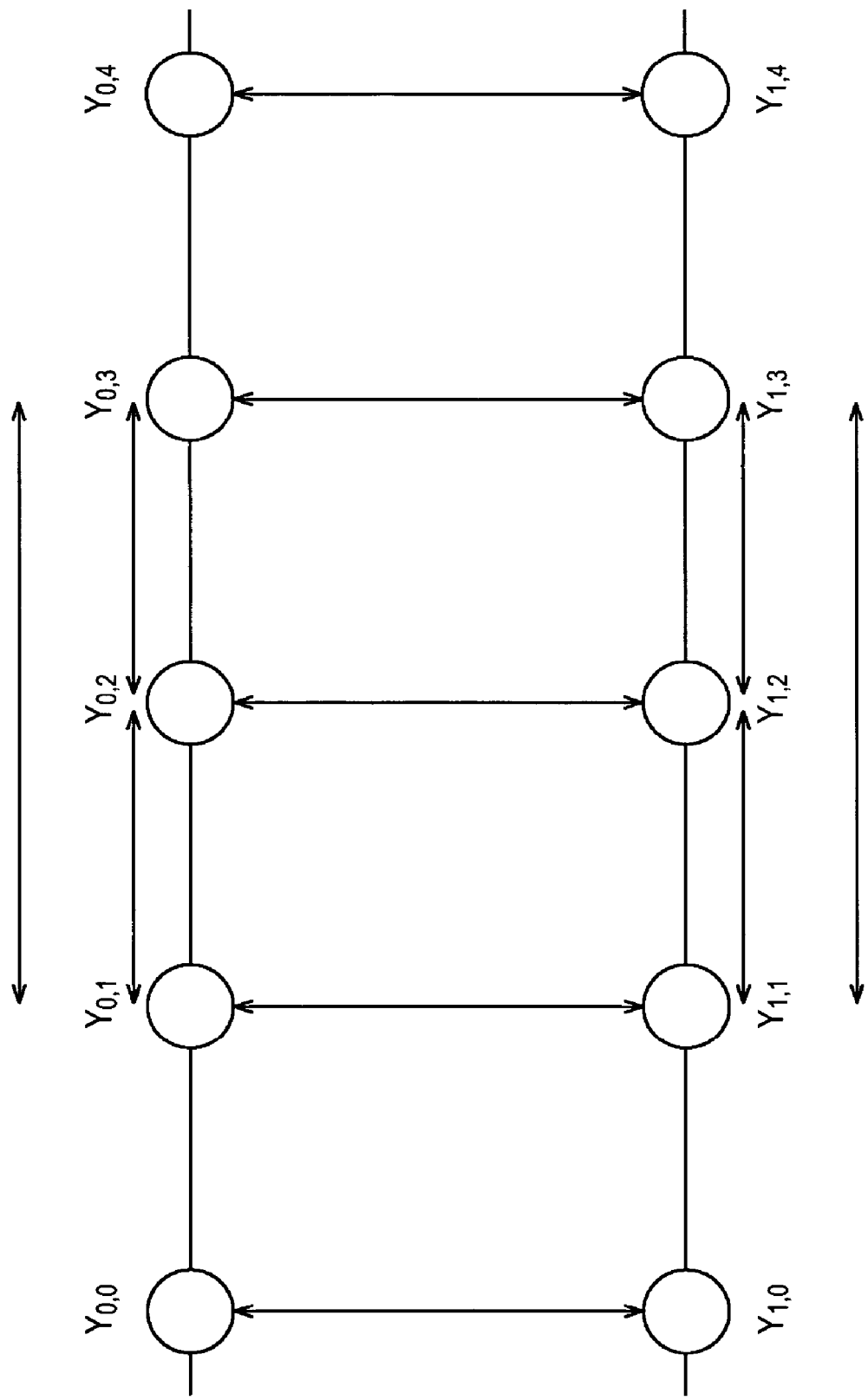
FIG. 23 is a diagram for illustrating another computing method of an edge direction.
Figure 24:
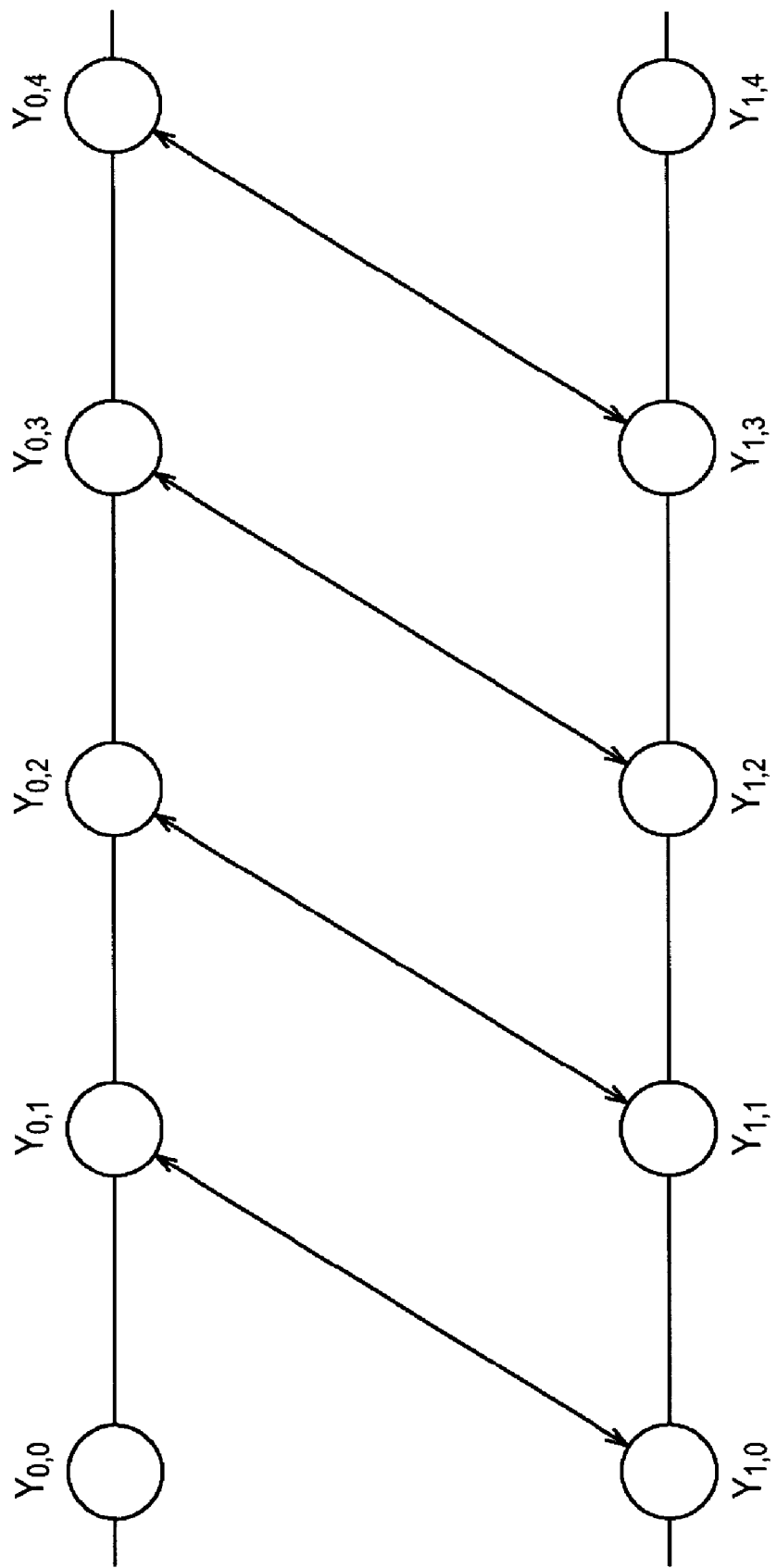
FIG. 24 is a diagram for illustrating another computing method of an edge direction.
Figure 25:
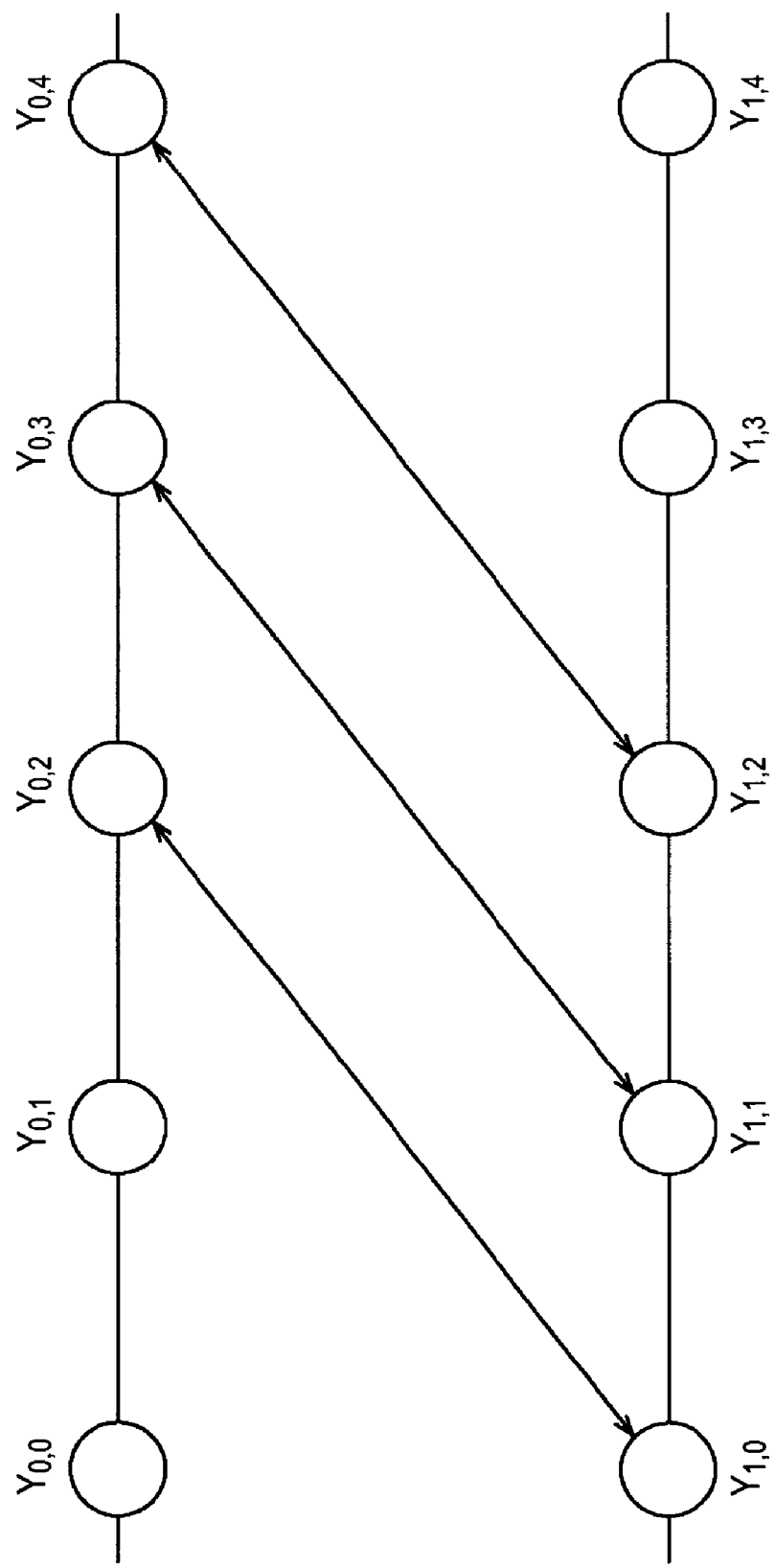
FIG. 25 is a diagram for illustrating another computing method of an edge direction.
Figure 26:
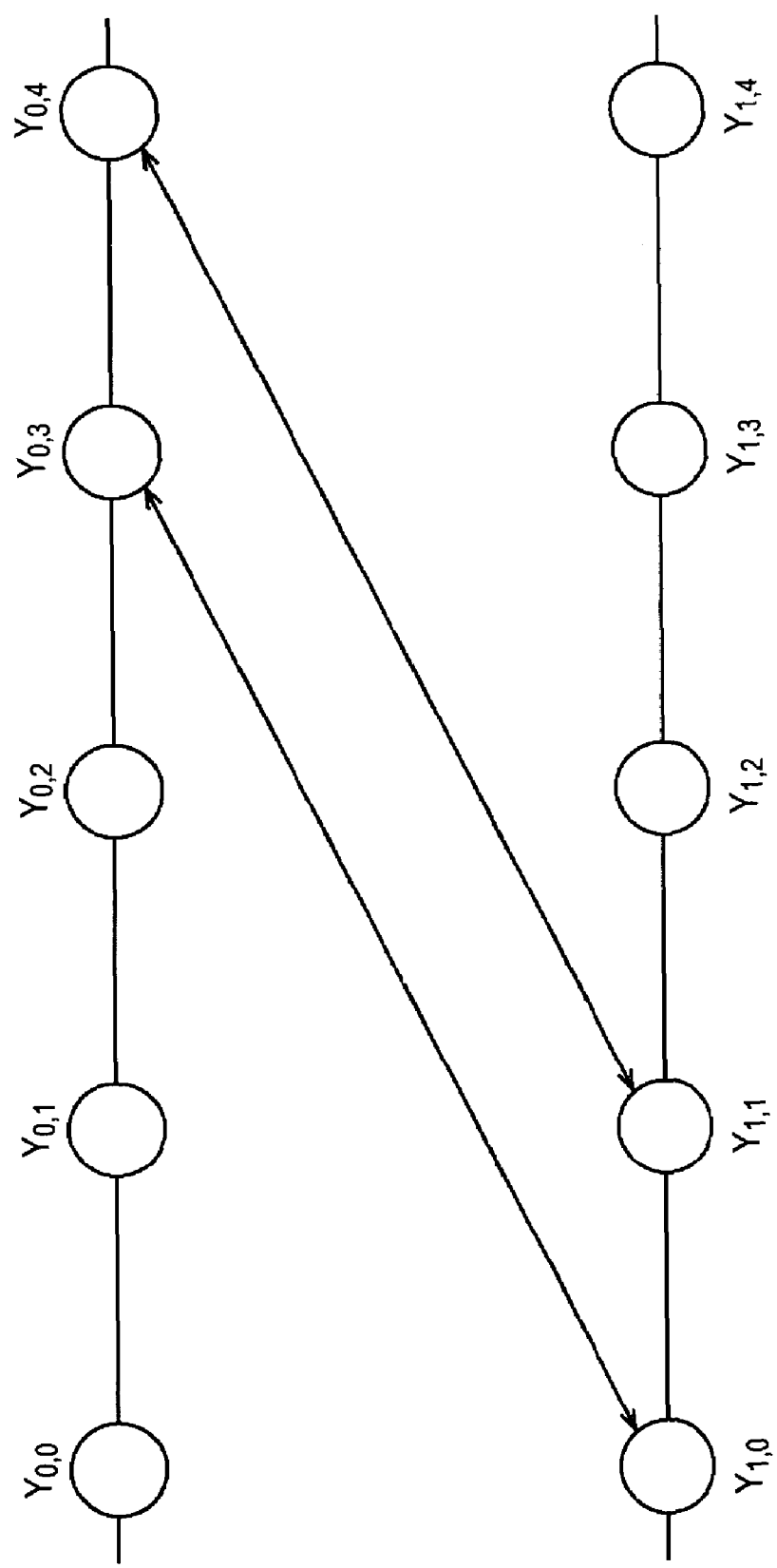
FIG. 26 is a diagram for illustrating another computing method of an edge direction.

In addition, in the foregoing description, to obtain an edge direction, a difference between two pixels in a diagonal direction along which is the pixel of interest is computed for each direction. The direction passing through two pixels having the minimum difference is considered to be the edge direction. However, differences between a plurality of pixels in each direction may be used to obtain the edge direction. For example, as shown in FIGS. 20 through 26, differences between a plurality of pixels are computed and the sum of the differences may be used. That is, as shown in FIG. 20, a weighted average of the following values is computed: a difference between pixels $Y_{0,0}$ and $Y_{1,3}$, a difference between pixels $Y_{0,1}$ and $Y_{1,4}$, a difference between pixels $Y_{0,0}$ and $Y_{0,1}$, and a difference between pixels $Y_{1,3}$ and $Y_{1,4}$. As shown in FIG. 21, an average of the following values is computed: a difference between pixels $Y_{0,0}$ and $Y_{1,2}$, a difference between pixels $Y_{0,1}$ and $Y_{1,3}$, and a difference between pixels $Y_{0,2}$ and $Y_{1,4}$. As shown in FIG. 22, an average of the following values is computed: a difference between pixels $Y_{0,0}$ and $Y_{1,1}$, a difference between pixels $Y_{0,1}$ and $Y_{1,2}$, a difference between pixels $Y_{0,2}$ and $Y_{1,3}$, and a difference between pixels $Y_{0,3}$ and $Y_{1,4}$ is computed. As shown in FIG. 23, a weighted average of the following values is computed: a difference between pixels $Y_{0,0}$ and $Y_{1,0}$, a difference between pixels $Y_{0,1}$ and $Y_{1,1}$, a difference between pixels $Y_{0,2}$ and $Y_{1,2}$, and a difference between pixels $Y_{0,3}$ and $Y_{1,3}$, a difference between pixels $Y_{0,4}$ and $Y_{1,4}$, a difference between pixels $Y_{0,1}$ and $Y_{0,2}$, a difference between pixels $Y_{0,3}$ and $Y_{0,2}$, a difference between pixels $Y_{0,1}$ and $Y_{0,3}$, a difference between pixels $Y_{1,1}$ and $Y_{1,2}$, a difference between pixels $Y_{1,3}$ and $Y_{1,2}$, and a difference between pixels $Y_{1,1}$ and $Y_{1,3}$. As shown in FIG. 24, an average of the following values is computed: a difference between pixels $Y_{0,1}$ and $Y_{1,0}$, a difference between pixels $Y_{0,2}$ and $Y_{1,1}$, a difference between pixels $Y_{0,3}$ and $Y_{1,2}$, and a difference between pixels $Y_{0,4}$ and $Y_{1,3}$. As shown in FIG. 25, an average of the following values is computed: a difference between pixels $Y_{0,2}$ and $Y_{1,0}$, a difference between pixels $Y_{0,3}$ and $Y_{1,1}$, and a difference between pixels $Y_{0,4}$ and $Y_{1,2}$. Furthermore, as shown in FIG. 26, an average of the following values is computed: a difference between pixels $Y_{0,3}$ and $Y_{1,0}$, and a difference between pixels $Y_{0,4}$ and $Y_{1,1}$. Using these average values, the direction passing through a pair of pixels selected by the above-described direction determination process may be determined to be the edge direction.

Figure 5:
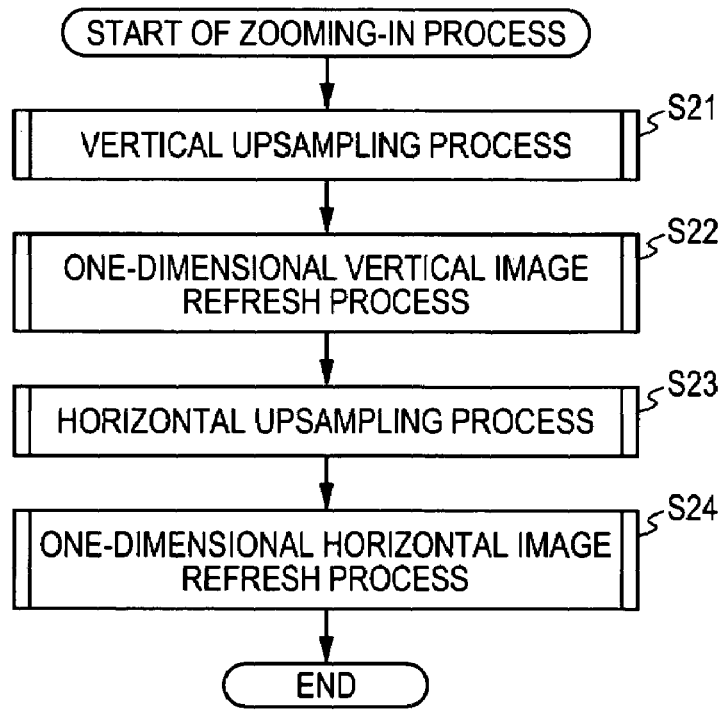
FIG. 5 is a flow chart of a zooming-in process at step S6 shown in FIG. 4.

Referring back to the flow chart shown in FIG. 5, after the upsampling process at step S21 is performed, as described above, the process proceeds to step S22. At step S22, a one-dimensional vertical image refresh process is performed by the one-dimensional vertical image refresh processing unit 17.

The one-dimensional vertical image refresh process performed by the one-dimensional vertical image refresh processing unit 17 is described next with reference to a flow chart shown in FIG. 27.

At step S241, it is determined whether an unprocessed pixel is found in the image data input from the image input unit 1. If it is determined that an unprocessed pixel is found, the process proceeds to step S242.

Figure 28:
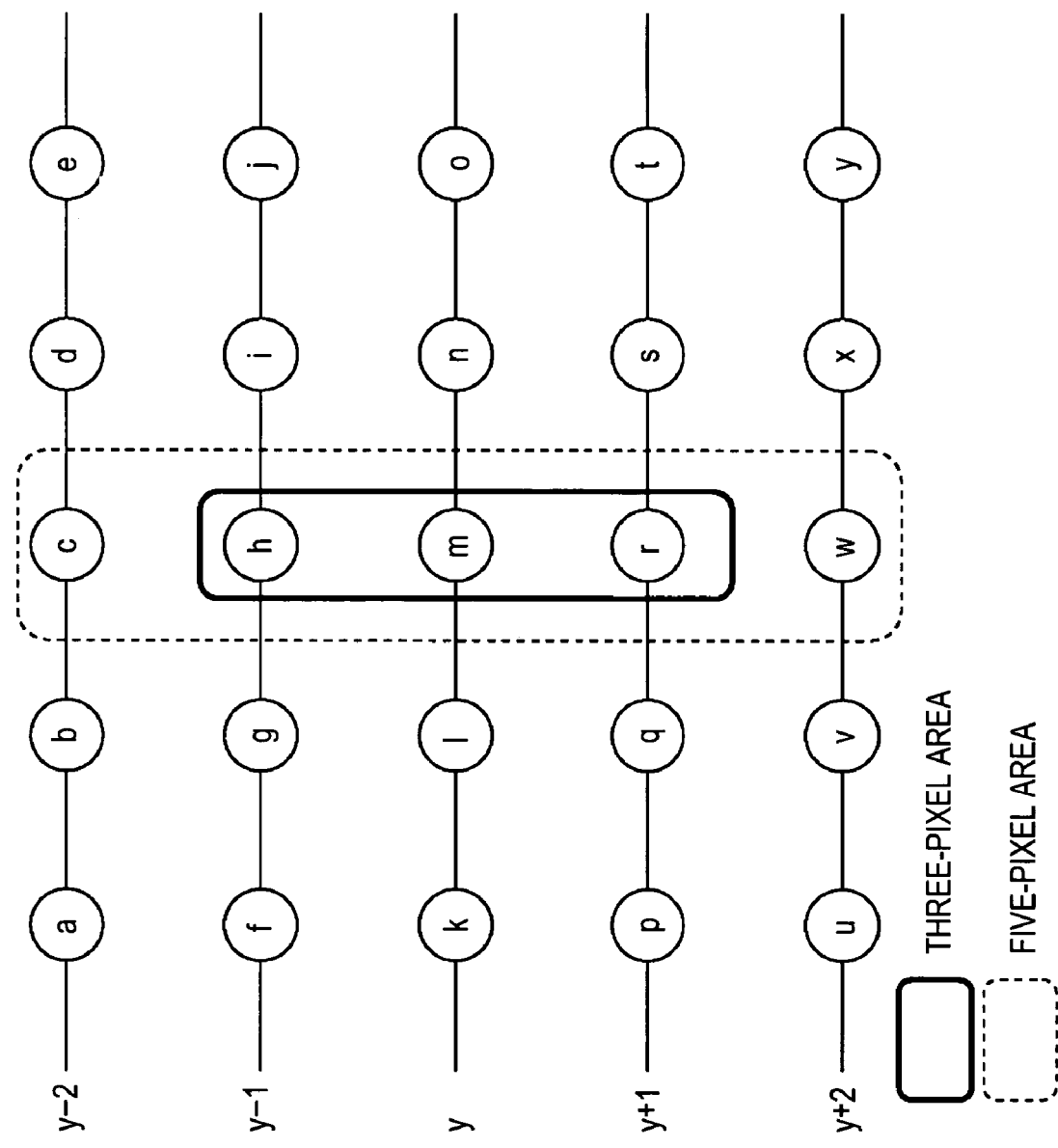
FIG. 28 is a diagram for illustrating a region of interest in the one-dimensional vertical image refresh process at step S22 shown in FIG. 5.
Figure 29:
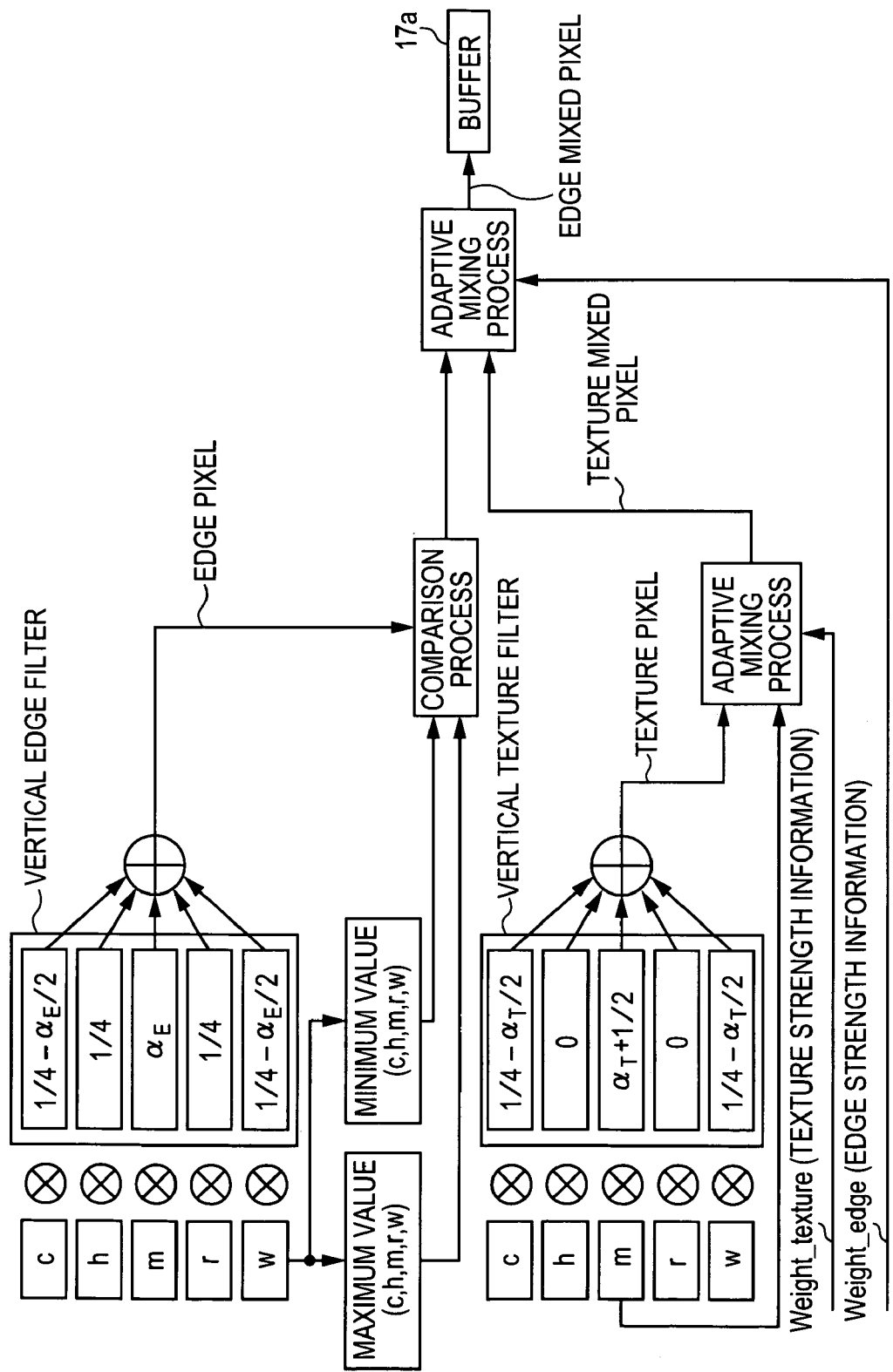
FIG. 29 is a diagram for illustrating the one-dimensional vertical image refresh process at step S22 shown in FIG. 5.

At step S242, the vertical maximum/minimum value detection unit 192 compares five vertical pixels including the unprocessed pixel to each other to obtain the maximum and minimum values. That is, for example, as shown in FIG. 28, when the unprocessed pixel is a pixel m, the pixel values of pixels above and under the unprocessed pixel including the unprocessed pixel c, h, m, r, and w (i.e., five-pixel area surrounded by a dotted line in FIG. 28) are read out. As shown in FIG. 29, the vertical maximum/minimum value detection unit 192 then obtains the maximum value (c, h, m, r, w) and the minimum value (c, h, m, r, w).

At step S243, as shown in FIG. 29, the texture filter processing unit 191 performs a one-dimensional texture filter process on the pixels c, h, m, r, and w in the five-pixel area. That is, a one-dimensional texture filter is expressed as (1/4−$\alpha_T$/2, 0, $\alpha_T$+1/2, 0, 1/4−$\alpha_T$/2) (0.5<$\alpha_T$). For example, when the texture filter is of the above-described type A, a texture pixel value, which is a pixel value after the texture filter process is performed, can be obtained using the following equation (23):

texture pixel(X,Y)=c×(1/4−$\alpha_T$/2)+m×($\alpha_T$+1/2)+w×(1/4−$\alpha_T$/2) (23)

Here, the coefficient $\alpha_T$ is a coefficient used for adjusting the texture enhancement level of the texture filter.

At step S244, as shown in FIG. 29, the edge filter processing unit 193 performs a one-dimensional edge filter process on the pixels c, h, m, r, and w in the five-pixel area. That is, a one-dimensional edge filter is expressed as (1/4−$\alpha_E$/2, 1/4, $\alpha_E$, 1/4, 1/4−$\alpha_E$/2) (0.5<$\alpha_E$). For example, when the edge filter is of the above-described type A, a pixel value "edge pixel", which is a pixel value after the edge filter process is performed, can be obtained using the following equation (24).

edge pixel(X, Y)=c×(1/4−$\alpha_E$/2)+h×1/4+m×$\alpha_E$+r×1/4+w×(1/4−$\alpha_E$/2) (24)

Here, the coefficient $\alpha_E$ is a coefficient used for adjusting the edge enhancement level of the filter.

At step S245, as shown in FIG. 29, the determination comparison unit 194 compares the pixel value "edge pixel", which is a pixel value subjected to the edge filter process, with the maximum value (c, h, m, r, w) to determine whether the pixel value "edge pixel" is greater than or equal to the maximum value (c, h, m, r, w). For example, if it is determined at step S245 that the pixel value "edge pixel" is greater than or equal to the maximum value (c, h, m, r, w), the determination comparison unit 194, at step S246, replaces the pixel value "edge pixel" with the maximum value (c, h, m, r, w). The process then proceeds to step S247.

If it is determined at step S245 that the pixel value "edge pixel" is not greater than or equal to the maximum value (c, h, m, r, w), the determination comparison unit 194, at step S250, compares the pixel value "edge pixel", which is a pixel value subjected to the edge filter process, with the minimum value (c, h, m, r, w) to determine whether the pixel value "edge pixel" is less than or equal to the minimum value (c, h, m, r, w). If it is determined that the pixel value "edge pixel" is less than or equal to the minimum value (c, h, m, r, w), the process then proceeds to step S251.

At step S251, the determination comparison unit 194 replaces the pixel value "edge pixel" with the minimum value (c, h, m, r, w). The process then proceeds to step S247.

If it is determined at step S250 that the pixel value "edge pixel" is not less than or equal to the minimum value (c, h, m, r, w), the process then proceeds to step S247.

That is, at step S244, as shown in FIG. 29, the maximum value (c, h, m, r, w) and the minimum value (c, h, m, r, w) obtained at step S244 are considered to be a maximum value and a minimum value among c, h, m, r, and w in a local area, respectively. If the pixel value obtained by the edge filter process at step S244 falls in the range between the minimum value and the maximum value, the pixel value is stored without altering the value. If the pixel value is less than or equal to the minimum value (c, h, m, r, w), the pixel value is replaced with the minimum value. If the pixel value is greater than or equal to the maximum value (c, h, m, r, w), the pixel value is replaced with the maximum value. That is, the pixel value is clipped.

Figure 30:
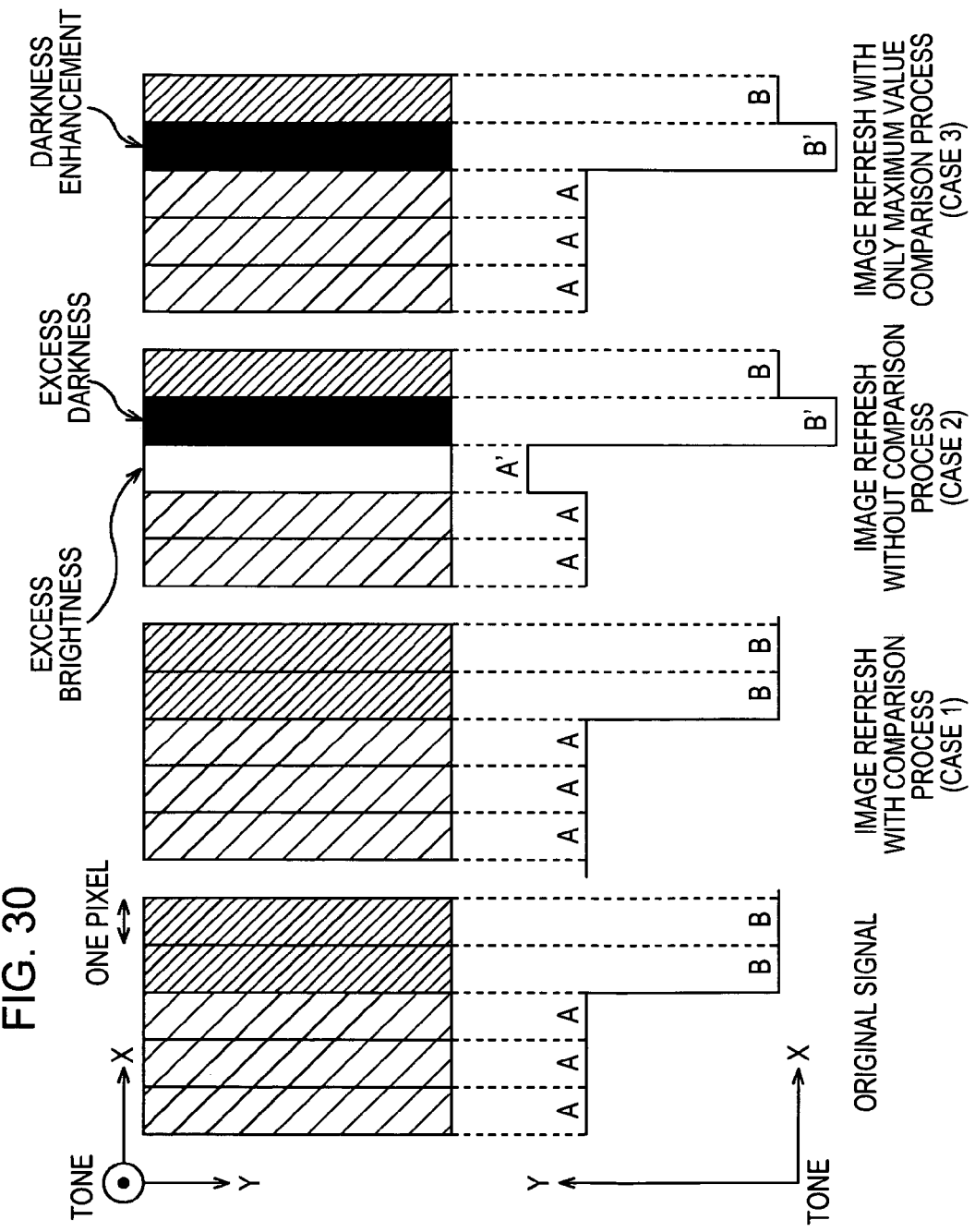
FIG. 30 is a diagram for illustrating the one-dimensional vertical image refresh process at step S22 shown in FIG. 5.

For example, in the example shown in FIG. 30, a pixel value "edge pixel" A' subjected to the edge filter process (case 2 in FIG. 30) is compared with a maximum value (c, h, m, r, w) A. Thereafter, it is determined that the pixel value "edge pixel" A' subjected to the edge filter process is greater than or equal to the maximum value (c, h, m, r, w) A. Accordingly, the pixel value "edge pixel" A' subjected to the edge filter process is replaced with the maximum value (c, h, m, r, w) A (case 1 in FIG. 30).

In contrast, it is determined that the pixel value "edge pixel" B' subjected to the edge filter process (case 2 in FIG. 30) is hot greater than or equal to the maximum value (c, h, m, r, w) A. Thereafter, the pixel value "edge pixel" B' subjected to the edge filter process is compared with a minimum value (c, h, m, r, w) B. It is then determined that the pixel value "edge pixel" B' subjected to the edge filter process is less than or equal to the minimum value (c, h, m, r, w) B. Accordingly, the pixel value "edge pixel" B' subjected to the edge filter process is replaced with the minimum value (c, h, m, r, w) B (case 1 in FIG. 30).

In the above-described process, since the pixel value subjected to the edge filter process is compared with the maximum value (c, h, m, r, w) and the minimum value (c, h, m, r, w) in the local area, excess darkness in a dark area and excess brightness in a bright area (see case 2 in FIG. 30) can be prevented, as shown by case 1 in FIG. 30.

At step S245, to further enhance the contrast near the edge, the determination comparison unit 194 determines whether the pixel value "edge pixel" subjected to the edge filter process is greater than or equal to the maximum value (c, h, m, r, w). If it is determined that the pixel value "edge pixel" is greater than or equal to the maximum value (c, h, m, r, w), the determination comparison unit 194, at step 246, replaces the pixel value "edge pixel" with the maximum value (c, h, m, r, w). However, if it is determined that the pixel value "edge pixel" subjected to the edge filter process is not greater than or equal to the maximum value (c, h, m, r, w), the determination comparison unit 194, at step S250, compares the pixel value "edge pixel" subjected to the edge filter process with a minimum value (c, h, m, r, w) to determine whether the pixel value "edge pixel" subjected to the edge filter process is less than or equal to the minimum value (c, h, m, r, w).

If it is determined at step S250 that the pixel value "edge pixel" subjected to the edge filter process is less than or equal to the minimum value (c, h, m, r, w), the process of the determination comparison unit 194 proceeds to step S247 without replacing the pixel value "edge pixel" subjected to the edge filter process with the minimum value (c, h, m, r, w) at step S251. In such a process, since the pixel value "edge pixel" is only compared with the maximum value (c, h, m, r, w), appropriate enhancement in the dark area can be obtained while preventing excess brightness in the bright area.

That is, as shown in FIG. 29, the maximum value (c, h, m, r, w) obtained at step S244 is considered to be a maximum value among the pixel values of s c, h, m, r, and w in the local area. The pixel value obtained by the edge filter process at step S244 is stored without altering the value if the value is less than or equal to the maximum value. The pixel value is substituted with the maximum value if the value is greater than the minimum value (c, h, m, r, w) (i.e., the pixel value is clipped at one end).

For example, in the example shown in FIG. 30, a pixel value "edge pixel" A' subjected to the edge filter process (case 2 in FIG. 30) is compared with a maximum value (c, h, m, r, w) A. Thereafter, it is determined that the pixel value "edge pixel" A' subjected to the edge filter process is greater than or equal to the maximum value (c, h, m, r, w) A. Accordingly, the pixel value "edge pixel" A' subjected to the edge filter process (case 2 in FIG. 30) is substituted with the maximum value (c, h, m, r, w) A, as shown by case 3 in FIG. 30.

In contrast, it is determined that the pixel value "edge pixel" B' subjected to the edge filter process (case 2 in FIG. 30) is not greater than or equal to the maximum value (c, h, m, r, w) A. Thereafter, the pixel value "edge pixel" B' subjected to the edge filter process is compared with a minimum value (c, h, m, r, w) B. It is then determined that the pixel value "edge pixel" B' subjected to the edge filter process is less than or equal to the minimum value (c, h, m, r, w) B. Accordingly, the pixel value "edge pixel" B' subjected to the edge filter process is not substituted with the minimum value (c, h, m, r, w) B, as shown by case 3 in FIG. 30.

In the above-described process, since the pixel value subjected to the edge filter process is compared with only the maximum value (c, h, m, r, w) in the local area, appropriate enhancement in the dark area can be obtained while preventing excess brightness (case 2 in FIG. 30) in the bright area, as shown by case 3 in FIG. 30.

As stated above, there are two types of one-dimensional texture filter and edge filter: A type shown in FIG. 29 and B type shown in FIG. 31. That is, in the A type, the texture filter process and the edge filter process are performed according to equations (23) and (24). In contrast, in the B type, the texture filter process and the edge filter process are performed according to the following equations (25) and (26).

$$\text{texture pixel}(X, Y)(\text{Type } B) = h \times (1/4 - \alpha_T/2) + m \times (1/2 + \alpha_T) + r \times (1/4 - \alpha_T/2) \quad (25)$$

$$\text{edge pixel}(X, Y)(\text{Type } B) = h \times (1/4 - \alpha_E/2) + m \times (1/2 + \alpha_E) + r \times (1/4 - \alpha_E/2) \quad (26)$$

At step S247, the texture-adaptive mixing processing unit 196 assigns a weight to the interpolated pixel delivered from the vertical upsampling processing unit 11, assigns a weight to the texture pixel value delivered from the texture filter processing unit 191, and combines the two values. The texture-adaptive mixing processing unit 196 then outputs the combined value as a texture mixed pixel using the following equation (27).

$$\text{texture mixed pixel}(X, Y) = (1 - \text{weight\_texture}) \times (\text{interpolation pixel}(X, Y)) + \text{weight\_texture} \times (\text{texture pixel}(X, Y)) \quad (27)$$

That is, since the weight assigned to an interpolated pixel is expressed as (1−weight_texture), a pixel value obtained by interpolation is multiplied by (1−weight_texture), which is the weight associated with the interpolation pixel. The texture pixel is multiplied by weight_texture, which is the weight associated with the texture pixel. The combined interpolation pixel, which is a linear sum of the two resultant values, is considered to be the final texture pixel. Thus, the interpolation process and the texture filter process are combined using the weights in a balanced manner, and therefore, a precise texture mixed pixel can be generated.

At step S248, the edge-adaptive mixing processing unit 197 assigns a weight to the texture mixed pixel delivered from the texture-adaptive mixing processing unit 196, assigns a weight to the pixel value "edge pixel" delivered from the determination comparison unit 194, and combines the two values. The edge-adaptive mixing processing unit 197 then outputs the combined value as an edge mixed pixel using the following equation (28).

$$\text{edge mixed pixel}(X, Y) = (1 - \text{weight\_edge}) \times (\text{texture mixed pixel}(X, Y)) + \text{weight\_edge} \times (\text{edge pixel}(X, Y)) \quad (28)$$

That is, since the weight assigned to a texture mixed pixel is expressed as (1−weight_edge), a pixel value obtained by a texture-adaptive mixing process is multiplied by (1−weight_edge), which is the weight associated with the texture mixed pixel. The edge pixel is multiplied by weight_edge, which is the weight associated with the edge pixel. The combined interpolation pixel, which is a linear sum of the two resultant values, is considered to be the final edge mixed pixel. Thus, the texture-adaptive mixing process and the edge filter process are combined using the weights in a balanced manner, and therefore, a precise edge mixed pixel can be generated.

At step S249, the determination comparison unit 194 stores the pixel value, which is substituted with the maximum value (c, h, m, r, w), in the buffer 17a as a pixel value of a pixel h. The process then returns to step S241. The same processes are repeated until the one-dimensional vertical edge enhancement processes are performed for all the pixels.

A one-dimensional refresh process is described next with reference to a flow chart shown in FIG. 27 when the one-dimensional texture filter and the edge filter are of the B type. The same processes as those for the above-described type A are not repeated here.

Figure 31:
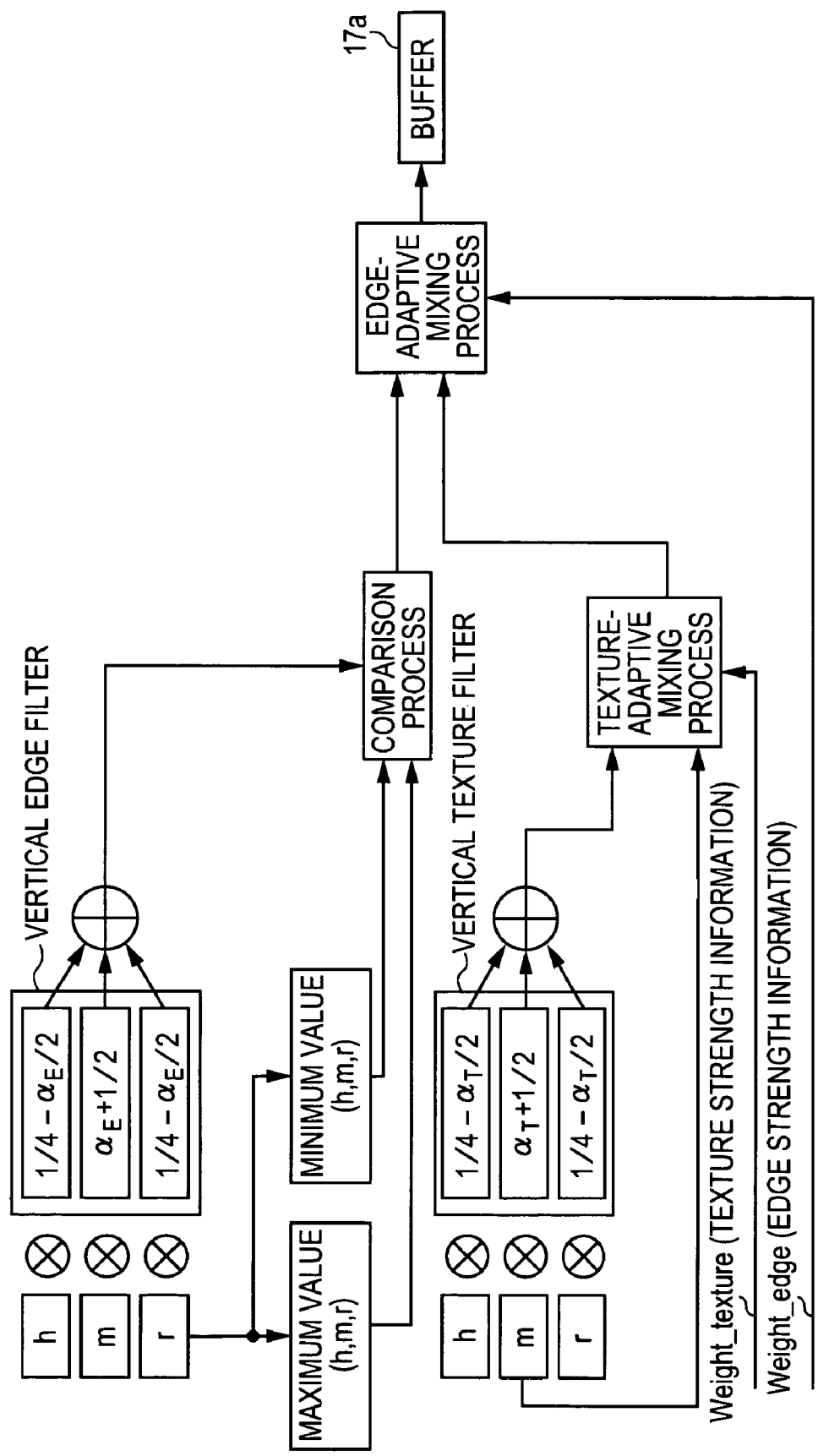
FIG. 31 is a diagram for illustrating the one-dimensional vertical image refresh process at step S22 shown in FIG. 5.

At step S242, the vertical maximum/minimum value detection unit 192 compares three vertical pixels including the unprocessed pixel with each other to obtain the maximum and minimum values. That is, for example, as shown in FIG. 28, when the unprocessed pixel is a pixel m, the pixel values of pixels above and under the unprocessed pixel including the unprocessed pixel h, m, and r (i.e., three-pixel area surrounded by a solid line in FIG. 28) are read out. As shown in FIG. 31, the vertical maximum/minimum value detection unit 192 then obtains the maximum value (h, m, r) and the minimum value (h, m, r).

At step S243, as shown in FIG. 31, the texture filter processing unit 191 performs a one-dimensional texture filter process on the pixels h, m, and r in the three-pixel area. That is, a one-dimensional texture filter is expressed as $(1/4 - \alpha_T/2, \alpha_T + 1/2, 1/4 - \alpha_T/2)$ $(0.5 < \alpha_T)$. For example, when the texture filter is of the above-described type B, a texture pixel, which is a pixel value after the texture filter process is performed, can be obtained using the following equation (29):

$$\text{texture pixel}(X, Y) = h \times (1/4 - \alpha_T/2) + m \times (\alpha_T + 1/2) + r \times (1/4 - \alpha_T/2) \quad (29)$$

Here, the coefficient $\alpha_T$ is a coefficient used for adjusting the texture enhancement level of the texture filter.

At step S244, as shown in FIG. 31, the edge filter processing unit 193 performs a one-dimensional edge filter process on the pixels h, m, and r in the three-pixel area. That is, a one-dimensional edge filter is expressed as $(1/4 - \alpha_E/2, \alpha_E + 1/2, 1/4 - \alpha_E/2)$ $(0.5 < \alpha_E)$. For example, when the edge filter is of the above-described type B, an edge pixel, which is a pixel value after the edge filter process is performed, can be obtained using the following equation (30).

$$\text{edge pixel}(X, Y) = h \times (1/4 - \alpha_E/2) + m \times (\alpha_E + 1/2) + r \times (1/4 - \alpha_E/2) \quad (30)$$

Here, the coefficient $\alpha_E$ is a coefficient used for adjusting the edge enhancement level of the edge filter.

At step S245, as shown in FIG. 31, the determination comparison unit 194 compares the pixel value "edge pixel", which is a pixel value subjected to the edge filter process, with the maximum value (h, m, r) to determine whether the pixel value "edge pixel" is greater than or equal to the maximum value (h, m, r). If it is determined that the pixel value "edge pixel" is greater than or equal to the maximum value (h, m, r), the determination comparison unit 194, at step S246, replaces the pixel value "edge pixel" with the maximum value (h, m, r). The process then proceeds to step S247.

If it is determined at step S245 that the pixel value "edge pixel" is not greater than or equal to the maximum value (h, m, r), the determination comparison unit 194, at step S250, compares the pixel value "edge pixel", which is a pixel value subjected to the edge filter process, with the minimum value (h, m, r) to determine whether the pixel value "edge pixel" is less than or equal to the minimum value (h, m, r). If it is determined that the pixel value "edge pixel" is less than or equal to the minimum value (h, m, r), the determination comparison unit 194, at step S251, replaces the pixel value "edge pixel" with the minimum value (h, m, r). The process then proceeds to step S247.

If it is determined at step S250 that the pixel value "edge pixel" is not less than or equal to the minimum value (h, m, r), the process then proceeds to step S247.

That is, at step S244, as shown in FIG. 31, the maximum value (h, m, r) and the minimum value (h, m, r) obtained at step S244 are considered to be a maximum value and a minimum value among h, m, and r in a local area, respectively. If the pixel value obtained by the edge filter process at step S244 falls in the range between the minimum value and the maximum value, the pixel value is stored without altering the value. If the pixel value is less than or equal to the minimum value (h, m, r), the pixel value is substituted with the minimum value. If the pixel value is greater than or equal to the maximum value (h, m, r), the pixel value is substituted with the maximum value. That is, the pixel value is clipped.

For example, in the example shown in FIG. 30, a pixel value "edge pixel" A' subjected to the edge filter process (case 2 in FIG. 30) is compared with a maximum value (h, m, r) A. Thereafter, it is determined that the pixel value "edge pixel" A' subjected to the edge filter process is greater than or equal to the maximum value (h, m, r) A. Accordingly, the pixel value "edge pixel" A' subjected to the edge filter process is substituted with the maximum value (h, m, r) A, as shown by case 1 in FIG. 30.

In contrast, it is determined that the pixel value "edge pixel" B' subjected to the edge filter process (case 2 in FIG. 30) is not greater than or equal to the maximum value (h, m, r) A. Thereafter, the pixel value "edge pixel" B' subjected to the edge filter process is compared with a minimum value (h, m, r) B. It is then determined that the pixel value "edge pixel" B' subjected to the edge filter process is less than or equal to the minimum value (h, m, r) B. Accordingly, the pixel value "edge pixel" B' subjected to the edge filter process is substituted with the minimum value (h, m, r) B as shown by case 1 in FIG. 30.

In the above-described process, since the pixel value subjected to the edge filter process is compared with the maximum value (h, m, r) and the minimum value (h, m, r) in the local area, excess darkness in a dark area and excess brightness in a bright area (see case 2 in FIG. 30) can be prevented.

At step S245, to further enhance the contrast near the edge, the determination comparison unit 194 determines whether the pixel value "edge pixel" subjected to the edge filter process is greater than or equal to the maximum value (h, m, r). If it is determined that the pixel value "edge pixel" is greater than or equal to the maximum value (h, m, r), the determination comparison unit 194, at step 246, replaces the pixel value "edge pixel" with the maximum value (h, m, r). However, if it is determined that the pixel value "edge pixel" subjected to the edge filter process is not greater than or equal to the maximum value (h, m, r), the determination comparison unit 194, at step S250, compares the pixel value "edge pixel" subjected to the edge filter process with a minimum value (h, m, r) to determine whether the pixel value "edge pixel" subjected to the edge filter process is less than or equal to the minimum value (h, m, r). Even when it is determined at step S250 that the pixel value "edge pixel" subjected to the edge filter process is less than or equal to the minimum value (h, m, r), the process of the determination comparison unit 194 proceeds to step S247 without replacing the pixel value "edge pixel" subjected to the edge filter process with the minimum value (h, m, r) at step S251.

In such a process, since the pixel value "edge pixel" is only compared with the maximum value (h, m, r), appropriate enhancement in the dark area can be obtained while preventing excess brightness in the bright area.

That is, as shown in FIG. 31, the maximum value (h, m, r) obtained at step S244 is considered to be a maximum value among the pixels h, m, and r in the local area. If the pixel value obtained by the edge filter process at step S244 is less than or equal to the maximum value, the pixel value is stored without altering the value. The pixel value is replaced with the maximum value if the pixel value is greater than or equal to the minimum value (h, m, r) (i.e., the pixel value is clipped at one end).

For example, in the example shown in FIG. 30, a pixel value "edge pixel" A' subjected to the edge filter process (case 2 in FIG. 30) is compared with a maximum value (h, m, r) A. Thereafter, it is determined that the pixel value "edge pixel" A' subjected to the edge filter process is greater than or equal to the maximum value (h, m, r) A. Accordingly, the pixel value "edge pixel" A' subjected to the edge filter process (case 2 in FIG. 30) is replaced with the maximum value (h, m, r) A (case 3 in FIG. 30).

In contrast, it is determined that the pixel value "edge pixel" B' subjected to the edge filter process (case 2 in FIG. 30) is not greater than or equal to the maximum value (h, m, r) A. Thereafter, the pixel value "edge pixel" B' subjected to the edge filter process is compared with a minimum value (h, m, r) B. It is then determined that the pixel value "edge pixel" B' subjected to the edge filter process is less than or equal to the minimum value (h, m, r) B. Accordingly, the pixel value "edge pixel" B' subjected to the edge filter process is not substituted with the minimum value (h, m, r) B (case 3 in FIG. 30).

In the above-described process, since the pixel value subjected to the edge filter process is compared with only the maximum value (h, m, r) in the local area, appropriate enhancement in the dark area can be obtained while preventing excess brightness (see case 2 in FIG. 30) in the bright area, as shown by case 3 in FIG. 30.

Referring back to FIG. 5, the description of the flow chart continues.

After the one-dimensional vertical image refresh process is carried out at step S22, a horizontal upsampling process is carried out at step S23. Subsequently, a one-dimensional horizontal image refresh process is carried out at step S24. The horizontal upsampling process at step S23 and the one-dimensional horizontal image refresh process at step S24 are identical to the vertical upsampling process at step S21 and the one-dimensional vertical image refresh process at step S22 except that the processing direction is changed from the vertical direction to the horizontal direction. Accordingly, the descriptions are not repeated.

As stated above, the resolution of an image can be changed by any scale factor. In this case, for example, to enlarge an image by a factor of 6, the upsampling process is repeated twice to obtain an image enlarged by a factor of 4. Subsequently, the image may be enlarged by a factor of 3/2. Alternatively, the upsampling process is repeated three times to obtain an image enlarged by a factor of 8. Subsequently, the image may be reduced by a factor of 3/4 using a known method.

As described with reference to the flow chart shown in FIG. 27, in the one-dimensional image refresh process, an edge and texture can be recognized on the basis of directional distribution information of the edge and texture. Consequently, appropriate processing can be performed for each of the edge and texture. For example, a filter process and a clipping process (or one-end clipping process) can be performed on the edge and only filter process can be performed on the texture. Additionally, as shown by the example in FIG. 30, the one-end clipping process can properly improve contrast near the edge since appropriate enhancement of a dark portion can be obtained while preventing excess brightness in the bright portion.

Furthermore, as described with reference to the flow chart shown in FIG. 6, by using a directional distribution and a distribution of directions of interpolation, the direction of interpolation can be precisely determined. Also, a pixel value obtained from a directional distribution and an oblique interpolation based on the directional distribution and a pixel value obtained from a linear interpolation are assigned weights based on the directional distribution. An interpolation pixel is generated by combining the two pixels, that is, by obtaining the linear sum of the two pixel values. Consequently, the pixel value can be precisely interpolated.

Figure 32:
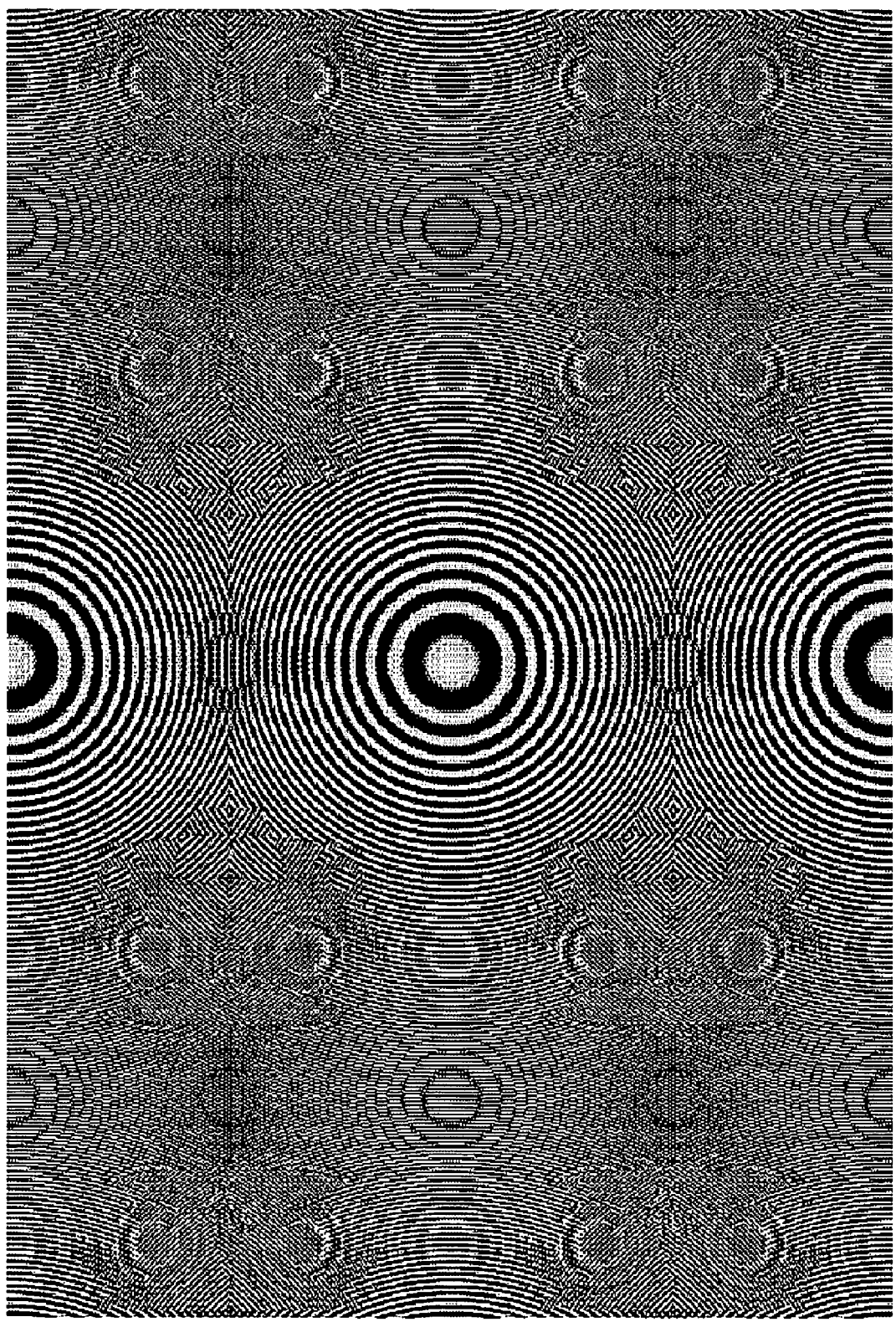
FIG. 32 is an example of an image zoomed in by using a known method.
Figure 33:
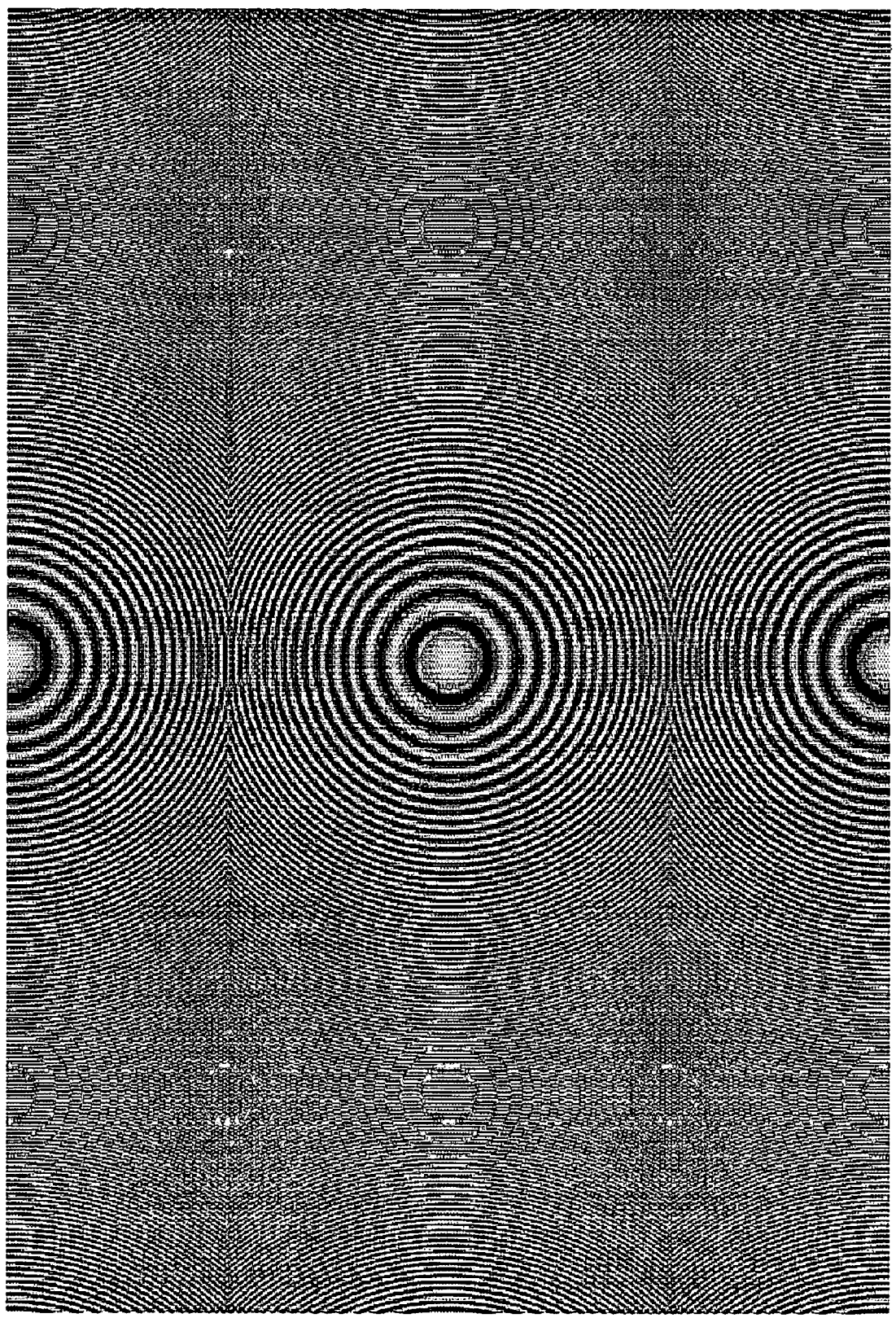
FIG. 33 is an example of an image zoomed in by using a method according to an embodiment of the present invention.

FIG. 32 illustrates an image generated by a known method, whereas FIG. 33 illustrates an image generated by the method according to an embodiment of the present invention. In the middle section of the drawings, three concentric patterns are shown in the horizontal direction. As can be seen from the portions in which lines passing through the center of the concentric pattern at an angle of 45 degrees relative to the horizontal or vertical direction in the drawing intersect, concentric patterns in the portions of the image according to this embodiment are precisely displayed without loosing the details. That is, by generating an image using the method according to this embodiment of the present invention, a clear image can be obtained.

As a result, an error in an image caused by converting the resolution of the image can be reduced, and therefore, a clear converted image can be generated.

Although enlargement of an image only in the vertical direction has been described, other enlargements are also applicable. For example, an image may be enlarged in both horizontal and vertical directions or in either one of a horizontal direction and a vertical direction. In this case, the process for enlarging the image only in the vertical direction is identical to the process known as an IP conversion in which an interlace image is converted to a progressive image. Consequently, this embodiment of the present invention can be applied to the IP conversion. This conversion can be achieved by determining the scale factor to be one in either horizontal direction or vertical direction in the above-described process. Alternatively, this conversion can be achieved by removing a process in either horizontal direction or vertical direction. Therefore, the description is not repeated here.

In addition, although the horizontal upsampling process is performed after the vertical upsampling process is performed, an image may be enlarged by performing the horizontal upsampling process first and subsequently performing the vertical upsampling process.

Figure 4:
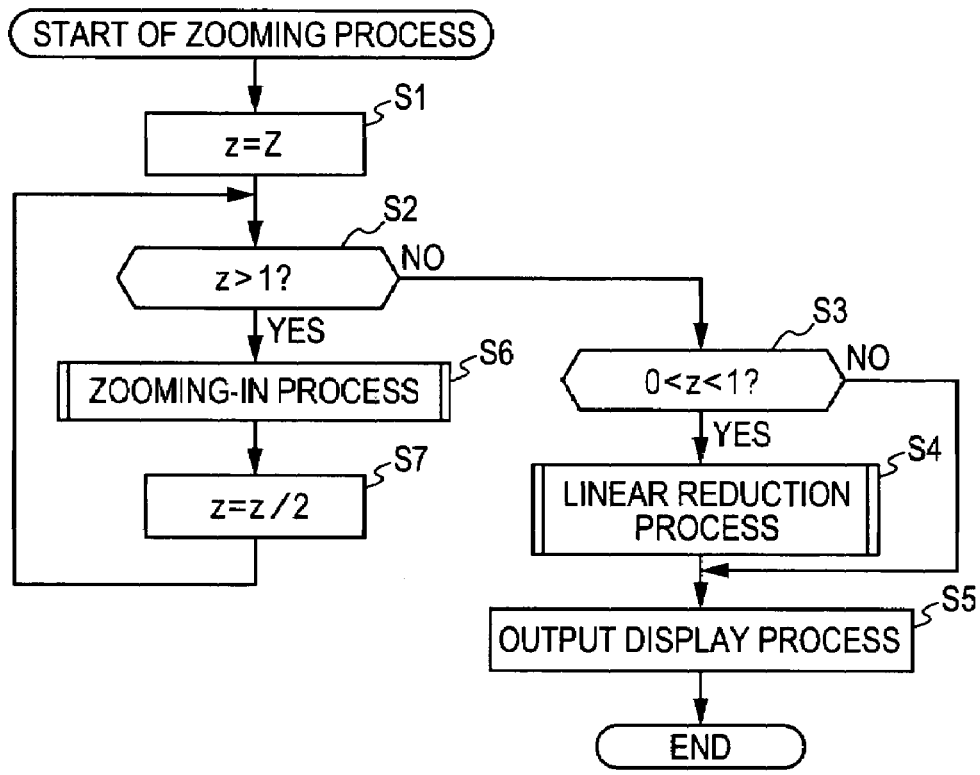
FIG. 4 is a flow chart of a zooming process of the image processing apparatus shown in FIG. 1.

Furthermore, in the above-described embodiment, as shown in FIG. 4 or 5, the one-dimensional vertical image refresh process is performed after the upsampling process is performed to zoom an image or zoom-in the image. By performing the one-dimensional vertical image refresh process before performing the vertical upsampling process, the one-dimensional vertical image refresh process can be performed for only the pixels in an original image before the number of pixels increases. Thus, the amount of computation can be reduced, and therefore, the process can be simplified.

Although a combination of the upsampling and image refresh processes has been described, only the upsampling process or the image refresh process is applicable. For example, when the number of pixels in a high-definition television (HDTV) signal is not required to fit to a panel size, only an edge and texture adaptive resolution improving process using an analysis result of computed directional distribution information and an image refresh process may be performed without performing the upsampling process.

Still furthermore, although an example using a linear interpolation as a known interpolation has been described, the known interpolation is not limited to the linear interpolation. For example, the Spline interpolation using four pixels or more, Lanczos interpolation, or cubic interpolation may be applicable.

The above-described series of processes can be carried out by software as well as hardware. To carry out the series of processes by software, the software program is installed, via a network or a recording medium, in a computer incorporating dedicated hardware or in a general-purpose computer that can execute a variety of functions by installing a variety of programs therein, such as a personal computer.

FIG. 34 is a block diagram of an exemplary hardware configuration of the image processing unit 2 having functional blocks shown in FIG. 1. A central processing unit (CPU) 311 carries out a variety of processing in accordance with a program stored in a read only memory (ROM) 312 or in accordance with a program loaded from a storage unit 318 to a random access memory (RAM) 313. The RAM 313 also stores data necessary for the CPU 311 to carry out the variety of processing as needed.

The CPU 311, the ROM 312, and the RAM 313 are connected to each other via a bus 314. An input/output interface 315 is also connected to the bus 314.

Also connected to the input/output interface 315 are an input unit 316 including a keyboard and a mouse, an output unit 317 including a display (e.g., a CRT or an LCD) and a speaker, the storage unit 318 including a hard disk, and a communication unit 319 including a modem or a terminal adaptor. The communication unit 319 carries out communication via a network, such as the Internet.

A drive 320 is also connected to the input/output interface 315 as needed. A magnetic disk 331, an optical disk 332, a magneto optical disk 333, or a semiconductor memory 334 is mounted to the drive 320 as needed. A computer program read out of these recording media is installed in the storage unit 318 as needed.

In the apparatus shown in FIG. 34, examples of these recording media include not only package media which provide a program to a user separately from a computer (e.g., the magnetic disk 331 including a flexible disk, the optical disk 332 including a compact disk-read only memory (CD-ROM), a digital versatile disk (DVD), the magneto optical disk 333 including mini-disk (MD), or the semiconductor memory 334), but also the ROM 312 and a hard disk in the storage unit 318 which prestore a program supplied to a user.

In the present specification, the steps described with reference to the above-described flow charts are not necessarily executed in the above-described sequence, but may be executed in parallel or independently.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for converting a spatial resolution of an original image by multiplying the spatial resolution by a factor of a real number Z in one of a vertical direction and a horizontal direction or in both of the directions, comprising:

a diagonal weight setting means for setting a weight for a statistical diagonal interpolation pixel generated by interpolation on the basis of a slope at a position of a pixel of interest having the statistically highest confidence level;

a combining interpolation means for combining the statistical diagonal interpolation pixel with a different pixel interpolated by a different interpolation to generate a combined interpolated pixel as a pixel at the position of a pixel of interest on the basis of the weight of the statistical diagonal interpolation pixel set by the diagonal weight setting means;

an edge strength information generation means for generating information used for quantitatively evaluating the strength of an edge at the position of the pixel of interest;

a texture strength information generation means for generating information used for quantitatively evaluating the strength of texture at the position of the pixel of interest;

a texture-adaptive mixing means for generating a texture mixed pixel by combining the combined interpolated pixel at the position of the pixel of interest with a texture pixel generated by performing texture filtering on the pixel of interest on the basis of the texture strength information generated by the texture strength information generation means;

an edge-adaptive mixing means for generating an edge mixed pixel as a pixel at the position of the pixel of interest by combining an edge pixel generated by performing filtering on the pixel of interest with the generated texture mixed pixel on the basis of the edge strength information generated by the edge strength information generation means;

a slope selection means for selecting a slope at the position of the pixel of interest having the highest confidence level on the basis of a directional distribution of slopes of a plurality of pixels corresponding to the position of the pixel of interest and the confidence level; and a statistical diagonal interpolation means for generating the statistical diagonal interpolation pixel at the position of the pixel of interest by interpolation on the basis of the slope selected by the slope selection means;

wherein the diagonal weight setting means sets a weight of the statistical diagonal interpolation pixel generated by the statistical diagonal interpolation means on the basis of a slope having the statistically highest confidence level at the position of the pixel of interest; and wherein the combining interpolation means generates a combined interpolated pixel as the pixel of interest by computing a linear sum of the pixel generated by the different interpolation and the statistical diagonal interpolation pixel generated by the statistical diagonal interpolation means using a coefficient corresponding to the weight set by the diagonal weight setting means.

2. The image processing apparatus according to claim 1, wherein, in the different interpolation, a pixel is generated by interpolating a pixel at the position of the pixel of interest using pixels above and beneath the position of the pixel of interest or at the left and right of the position of the pixel of interest.

3. The image processing apparatus according to claim 1, further comprising:

a direction determination means for determining edge directions at a plurality of pixel positions including and corresponding to the position of the pixel of interest on the basis of the presence of the edge; and an edge direction interpolation means for generating edge direction interpolated pixels at a plurality of pixel positions corresponding to the position of the pixel of interest on the basis of the edge directions at the plurality of pixel positions corresponding to the position of the pixel of interest.

4. The image processing apparatus according to claim 3, further comprising:

a confidence level rating means for rating confidence levels of the edge direction interpolated pixels generated by the edge direction interpolation means;

wherein the edge strength information generation means generates information for quantitatively evaluating the strength of an edge at the position of the pixel of interest on the basis of the confidence level rated by the confidence level rating means, and wherein the texture strength information generation means generates information used for quantitatively evaluating the strength of texture at the position of the pixel of interest on the basis of the confidence level rated by the confidence level rating means.

5. The image processing apparatus according to claim 3, wherein the confidence level rating means determines the consistency of the local structure of the edge direction interpolated pixels interpolated by the edge direction interpolation means and rates the confidence levels of the edge direction interpolated pixels interpolated by the edge direction interpolation means on the basis of the determination result of the consistency.

6. An image processing method in an image processing apparatus for converting a spatial resolution of an original image by multiplying the spatial resolution by a factor of a real value Z in one of a vertical direction and a horizontal direction or in both of the directions, the method comprising:

setting a weight for a statistical diagonal interpolation pixel generated by interpolation on the basis of a slope at a position of a pixel of interest having the statistically highest confidence level;

combining the statistical diagonal interpolation pixel with a different pixel interpolated by a different interpolation so as to generate a combined interpolated pixel as a pixel at the position of a pixel of interest on the basis of the weight of the statistical diagonal interpolation pixel;

generating information used for quantitatively evaluating the strength of an edge at the position of the pixel of interest;

generating information used for quantitatively evaluating the strength of texture at the position of the pixel of interest;

generating a texture mixed pixel by combining the combined interpolated pixel at the position of the pixel of interest with a texture pixel generated by performing texture filtering on the pixel of interest on the basis of the texture strength information;

generating an edge mixed pixel as the pixel at the position of the pixel of interest by combining an edge pixel generated by performing filtering on the pixel of interest with the generated texture mixed pixel on the basis of the edge strength information;

selecting a slope at the position of the pixel of interest having the highest confidence level on the basis of a directional distribution of slopes of a plurality of pixels corresponding to the position of the pixel of interest and the confidence level; and generating the statistical diagonal interpolation pixel at the position of the pixel of interest by interpolation on the basis of the selected slope;

wherein setting a weight for a statistical diagonal interpolation pixel sets a weight of the statistical diagonal interpolation pixel generated at the position of the pixel of interest by interpolation on the basis of a slope having the statistically highest confidence level at the position of the pixel of interest; and wherein combining the statistical interpolation pixel includes generating a combined interpolated pixel as the pixel of interest by computing a linear sum of the pixel generated by the different interpolation and the statistical diagonal interpolation pixel using a coefficient corresponding to the weight for the statistical diagonal interpolation pixel.

7. A computer-readable storage medium storing a program for causing a computer to execute a method for converting a spatial resolution of an original image by multiplying the spatial resolution by a factor of a real value Z in one of a vertical direction and a horizontal direction or in both of the directions, the method comprising:

setting a weight for a statistical diagonal interpolation pixel generated by interpolation on the basis of a slope at a position of a pixel of interest having the statistically highest confidence level;

combining the statistical diagonal interpolation pixel with a different pixel interpolated by a different interpolation so as to generate a combined interpolated pixel as a pixel at the position of a pixel of interest on the basis of the weight of the statistical diagonal interpolation;

generating information used for quantitatively evaluating the strength of an edge at the position of the pixel of interest;

generating information used for quantitatively evaluating the strength of texture at the position of the pixel of interest;

generating a texture mixed pixel by combining the combined interpolated pixel at the position of the pixel of interest with a texture pixel generated by performing texture filtering on the pixel of interest on the basis of the texture strength information;

generating an edge mixed pixel as the pixel at the position of the pixel of interest by combining an edge pixel generated by performing filtering on the pixel of interest with the generated texture mixed pixel on the basis of the edge strength information;

selecting a slope at the position of the pixel of interest having the highest confidence level on the basis of a directional distribution of slopes of a plurality of pixels corresponding to the position of the pixel of interest and the confidence level; and generating the statistical diagonal interpolation pixel at the position of the pixel of interest by interpolation on the basis of the selected slope;

wherein setting a weight for a statistical diagonal interpolation pixel sets a weight of the statistical diagonal interpolation pixel generated at the position of the pixel of interest by interpolation on the basis of a slope having the statistically highest confidence level at the position of the pixel of interest; and wherein combining the statistical interpolation pixel includes generating a combined interpolated pixel as the pixel of interest by computing a linear sum of the pixel generated by the different interpolation and the statistical diagonal interpolation pixel using a coefficient corresponding to the weight for the statistical diagonal interpolation pixel.

8. An image processing apparatus for converting a spatial resolution of an original image by multiplying the spatial resolution by a factor of a real number Z in one of a vertical direction and a horizontal direction or in both of the directions, comprising:

a diagonal weight setting unit configured to set a weight for a statistical diagonal interpolation pixel generated by interpolation on the basis of a slope at a position of a pixel of interest having the statistically highest confidence level;

a combining interpolation unit configured to combine the statistical diagonal interpolation pixel with a different pixel interpolated by a different interpolation so as to generate a combined interpolated pixel as a pixel at the position of a pixel of interest on the basis of the weight of the statistical diagonal interpolation pixel set by the diagonal weight setting unit;

an edge strength information generation unit configured to generate information used for quantitatively evaluating the strength of an edge at the position of the pixel of interest;

a texture strength information generation unit configured to generate information used for quantitatively evaluating the strength of texture at the position of the pixel of interest;

a texture-adaptive mixing unit configured to generate a texture mixed pixel by combining the combined interpolated pixel at the position of the pixel of interest with a texture pixel generated by performing texture filtering on the pixel of interest on the basis of the texture strength information generated by the texture strength information generation unit;

an edge-adaptive mixing unit configured to generate an edge mixed pixel as a pixel at the position of the pixel of interest by combining an edge pixel generated by performing filtering on the pixel of interest with the generated texture mixed pixel on the basis of the edge strength information generated by the edge strength information generation unit;

a slope selection unit configured to select a slope at the position of the pixel of interest having the highest confidence level on the basis of a directional distribution of slopes of a plurality of pixels corresponding to the position of the pixel of interest and the confidence level; and a statistical diagonal interpolation unit configured to generate the statistical diagonal interpolation pixel at the position of the pixel of interest by interpolation on the basis of the slope selected by the slope selection unit;

wherein the diagonal weight setting unit sets a weight of the statistical diagonal interpolation pixel generated by the statistical diagonal interpolation unit on the basis of a slope having the statistically highest confidence level at the position of the pixel of interest; and wherein the combining interpolation unit generates a combined interpolated pixel as the pixel of interest by computing a linear sum of the pixel generated by the different interpolation and the statistical diagonal interpolation pixel generated by the statistical diagonal interpolation unit using a coefficient corresponding to the weight set by the diagonal weight setting unit.

* * * * *